US012621485B2

(12) United States Patent
Deng et al.

(10) Patent No.: US 12,621,485 B2
(45) Date of Patent: May 5, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Zhipin Deng, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/737,880

(22) Filed: Jun. 7, 2024

(65) Prior Publication Data

US 2024/0340445 A1     Oct. 10, 2024

Related U.S. Application Data

(63) Continuation of application No. PCT/CN2022/137207, filed on Dec. 7, 2022.

(30) Foreign Application Priority Data

Dec. 7, 2021 (WO) ................ PCT/CN2021/135943

(51) Int. Cl.
*H04N 19/577* (2014.01)
*H04N 19/105* (2014.01)
(Continued)

(52) U.S. Cl.
CPC ......... *H04N 19/577* (2014.11); *H04N 19/105* (2014.11); *H04N 19/139* (2014.11);
(Continued)

(58) Field of Classification Search
CPC .. H04N 19/105; H04N 19/139; H04N 19/159; H04N 19/176; H04N 19/52; H04N 19/577
See application file for complete search history.

(56) References Cited

U.S. PATENT DOCUMENTS

2019/0222834 A1    7/2019  Chen et al.
2020/0304805 A1*   9/2020  Li ......................... H04N 19/54
(Continued)

FOREIGN PATENT DOCUMENTS

CN       107409225 A     11/2017
CN       111316647 A      6/2020
(Continued)

OTHER PUBLICATIONS

H. Yang et al., "Subblock-Based Motion Derivation and Inter Prediction Refinement in the Versatile Video Coding Standard," in IEEE Transactions on Circuits and Systems for Video Technology, vol. 31, No. 10, pp. 3862-3877, Oct. 2021 (Year: 2021).*
(Continued)

*Primary Examiner* — Jeremiah C Hallenbeck-Huber
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a target video block of a video and a bitstream of the video, an affine prediction list of the target video block based on at least one of the following: a non-adjacent spatial candidate, or a temporal collocated candidate; and performing the conversion based on the affine prediction list.

20 Claims, 28 Drawing Sheets

3400

3402

APPLY, DURING A CONVERSION BETWEEN A TARGET VIDEO BLOCK OF A VIDEO AND A BITSTREAM OF THE VIDEO, A BI-DIRECTIONAL OPTICAL FLOW (BDOF) PROCESS TO AT LEAST ONE OF THE FOLLOWING MODES OF THE TARGET VIDEO BLOCK: A SYMMETRIC MOTION VECTOR DIFFERENCE (SMVD) MODE, AN AFFINE MODE, A COMBINED INTER AND INTRA PREDICTION (CIIP) MODE, A GEOMETRIC PARTITIONING MODE (GPM) MODE, A SUBBLOCK-BASED TEMPORAL MOTION VECTOR PREDICTION (SBTMVP) MODE, OR A MULTI-HYPOTHESIS PREDICTION (MHP) MODE

3404

PERFORM THE CONVERSION BASED ON THE APPLYING

(51) Int. Cl.

| | | |
|---|---|---|
| *H04N 19/139* | (2014.01) | |
| *H04N 19/159* | (2014.01) | |
| *H04N 19/176* | (2014.01) | |
| *H04N 19/52* | (2014.01) | |

(52) U.S. Cl.
CPC ......... *H04N 19/159* (2014.11); *H04N 19/176* (2014.11); *H04N 19/52* (2014.11)

(56) References Cited

U.S. PATENT DOCUMENTS

| | | | | |
|---|---|---|---|---|
| 2020/0374550 | A1* | 11/2020 | Huang | H04N 19/1883 |
| 2020/0382795 | A1* | 12/2020 | Zhang | H04N 19/159 |
| 2021/0006803 | A1* | 1/2021 | Zhang | H04N 19/18 |
| 2021/0076061 | A1* | 3/2021 | Lin | H04N 19/105 |
| 2021/0203946 | A1 | 7/2021 | Sethuraman et al. | |
| 2021/0266595 | A1* | 8/2021 | Su | H04N 19/70 |
| 2021/0392367 | A1* | 12/2021 | Zhang | G06T 7/231 |
| 2022/0210439 | A1* | 6/2022 | Lai | H04N 19/52 |
| 2022/0224911 | A1* | 7/2022 | Park | H04N 19/176 |
| 2022/0264146 | A1* | 8/2022 | Chen | H04N 19/107 |
| 2022/0385940 | A1* | 12/2022 | Kang | H04N 19/176 |

FOREIGN PATENT DOCUMENTS

| | | |
|---|---|---|
| CN | 112703740 A | 4/2021 |
| CN | 113228680 A | 8/2021 |
| WO | 2020038349 A1 | 2/2020 |
| WO | 2020069651 A1 | 4/2020 |
| WO | 2020098814 A1 | 5/2020 |

OTHER PUBLICATIONS

Chen et al., "AHG12: Non-adjacent spatial neighbors for affine merge mode", Joint Video Experts Team (JVET) of/ TU-T SG 16 WP 3 and ISO/IEC JTC 1/SC 29 24th Meeting, Document: JVET-X0151, Oct. 8, 2021, 8 pages.
International Search Report for PCT/CN2022/137207, mailed Mar. 7, 2023, 7 pages.

* cited by examiner

400

500

600

700

800

L0 Reference

850

L1 Reference

4×4 block

6×6 surrounding region samples & gradients padding prediction samples in the extended area prediction samples within the CU

900

1110

1120

1200

1300

1700

1800

4×4 block

6×6 surrounding region samples & gradients padding prediction samples in the extended area prediction samples within the CU

2100

2200

2300

| Merge index | L0 MV | L1 MV |
|:---:|:---:|:---:|
| 0 | X | |
| 1 | | X |
| 2 | X | |
| 3 | | X |
| 4 | X | |

2400

2500

2700

3100

3102

DETERMINE, DURING A CONVERSION BETWEEN A TARGET VIDEO BLOCK OF A VIDEO AND A BITSTREAM OF THE VIDEO, AN AFFINE PREDICTION LIST OF THE TARGET VIDEO BLOCK BASED ON AT LEAST ONE OF THE FOLLOWING: A NON-ADJACENT SPATIAL CANDIDATE, OR A TEMPORAL COLLOCATED CANDIDATE

3104

PERFORM THE CONVERSION BASED ON THE AFFINE PREDICTION LIST

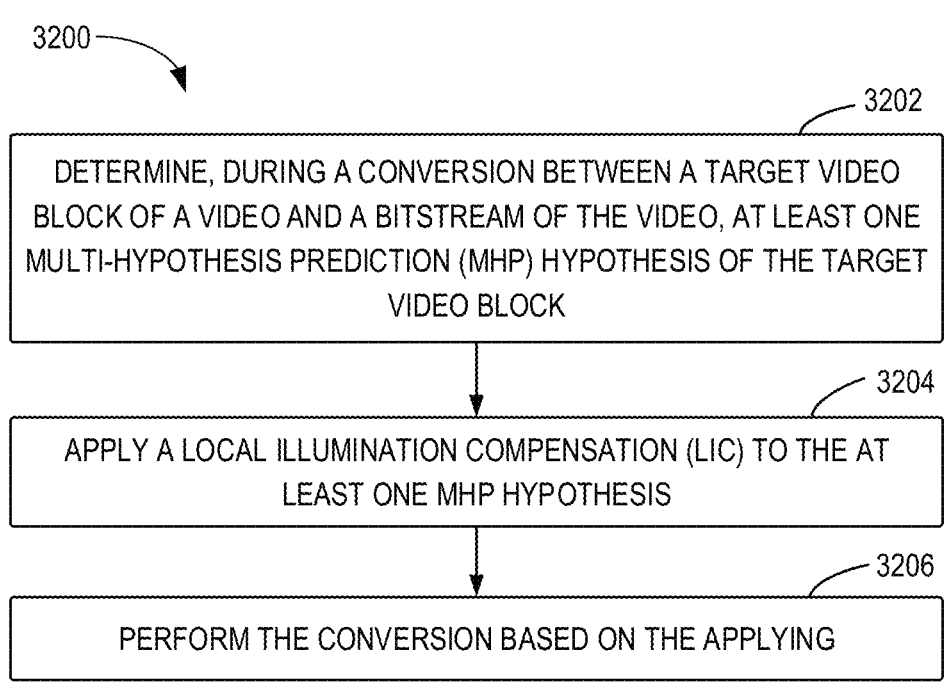

3200

3202

DETERMINE, DURING A CONVERSION BETWEEN A TARGET VIDEO BLOCK OF A VIDEO AND A BITSTREAM OF THE VIDEO, AT LEAST ONE MULTI-HYPOTHESIS PREDICTION (MHP) HYPOTHESIS OF THE TARGET VIDEO BLOCK

3204

APPLY A LOCAL ILLUMINATION COMPENSATION (LIC) TO THE AT LEAST ONE MHP HYPOTHESIS

3206

PERFORM THE CONVERSION BASED ON THE APPLYING

Fig. 32

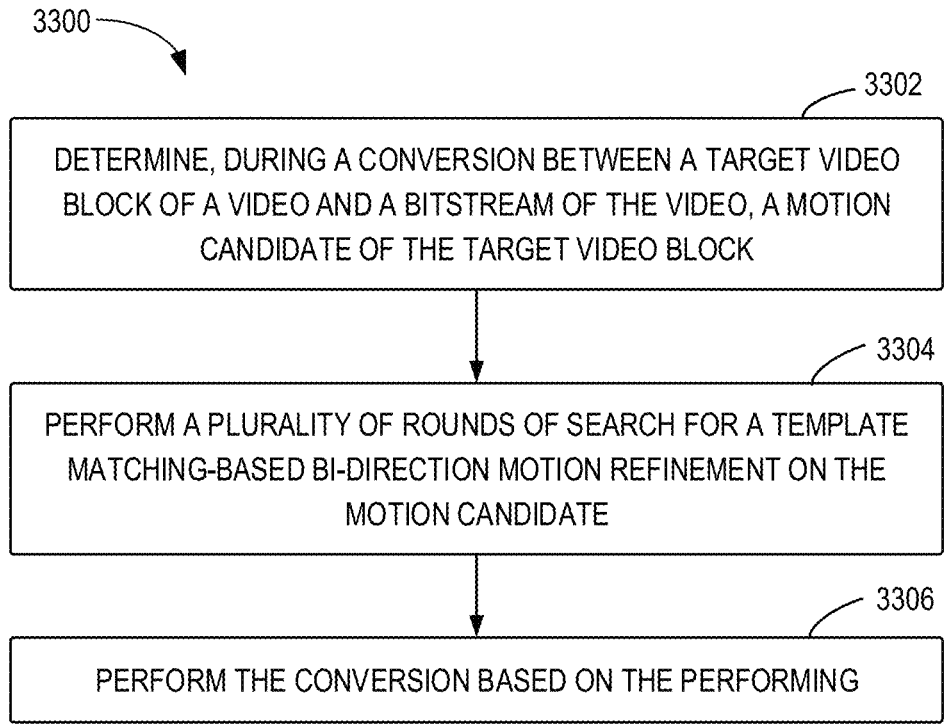

3300

3302

DETERMINE, DURING A CONVERSION BETWEEN A TARGET VIDEO BLOCK OF A VIDEO AND A BITSTREAM OF THE VIDEO, A MOTION CANDIDATE OF THE TARGET VIDEO BLOCK

3304

PERFORM A PLURALITY OF ROUNDS OF SEARCH FOR A TEMPLATE MATCHING-BASED BI-DIRECTION MOTION REFINEMENT ON THE MOTION CANDIDATE

3306

PERFORM THE CONVERSION BASED ON THE PERFORMING

APPLY, DURING A CONVERSION BETWEEN A TARGET VIDEO BLOCK OF A VIDEO AND A BITSTREAM OF THE VIDEO, A SAMPLE-BASED PREDICTION REFINEMENT WITH OPTICAL FLOW (PROF) PROCESS FOR THE TARGET VIDEO BLOCK

3604

PERFORM THE CONVERSION BASED ON THE APPLYING

3700

PROCESSING UNIT — 3710

STORAGE UNIT — 3730

MEMORY — 3720

COMMUNICATION UNIT — 3740

3725

VIDEO CODING MODULE

INPUT DEVICE — 3750

3770

OUTPUT DEVICE — 3760

3780

METHOD, APPARATUS, AND MEDIUM FOR VIDEO PROCESSING

CROSS-REFERENCE TO RELATED APPLICATIONS

This application is a continuation of International Application No. PCT/CN2022/137207, filed on Dec. 7, 2022, which claims the benefit of International Application No. PCT/CN2021/135943 filed on Dec. 7, 2021. The entire contents of these applications are hereby incorporated by reference in their entireties.

FIELD

Embodiments of the present disclosure relates generally to video coding techniques, and more particularly, to affine prediction list construction.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, an affine prediction list of the target video block based on at least one of the following: a non-adjacent spatial candidate, or a temporal collocated candidate; and performing the conversion based on the affine prediction list. The method in accordance with the first aspect of the present disclosure determines the affine prediction list based on the non-adjacent spatial candidate or the template collocated candidate, and thus improve the coding efficiency and coding effectiveness.

In a second aspect, another method for video processing is proposed. The method comprises: determining, during a conversion between a target video block of a video and a bitstream of the video, at least one multi-hypothesis prediction (MHP) hypothesis of the target video block; applying a local illumination compensation (LIC) to the at least one MHP hypothesis; and performing the conversion based on the applying. The method in accordance with the second aspect of the present disclosure applies LIC to the MHP hypothesis, and thus improve the coding efficiency and coding effectiveness.

In a third aspect, another method for video processing is proposed. The method comprises: determining, during a conversion between a target video block of a video and a bitstream of the video, a motion candidate of the target video block; performing a plurality of rounds of search for a template matching-based bi-direction motion refinement on the motion candidate; and performing the conversion based on the performing. The method in accordance with the third aspect of the present disclosure performs a plurality of rounds of search for the template matching-based bi-direction motion refinement on the motion candidate, and thus improve the coding efficiency and coding effectiveness.

In a fourth aspect, another method for video processing is proposed. The method comprises: applying, during a conversion between a target video block of a video and a bitstream of the video, a bi-directional optical flow (BDOF) process to at least one of the following modes of the target video block: a symmetric motion vector difference (SMVD) mode, an affine mode, a combined inter and intra prediction (CUP) mode, a geometric partitioning mode (GPM) mode, a subblock-based temporal motion vector prediction (SbTMVP) mode, or a multi-hypothesis prediction (MHP) mode; and performing the conversion based on the applying. The method in accordance with the fourth aspect of the present disclosure applies the BDOF process to a coding mode, and thus improve the coding efficiency and coding effectiveness.

In a fifth aspect, another method for video processing is proposed. The method comprises: applying, during a conversion between a target video block of a video and a bitstream of the video, a prediction refinement with optical flow (PROF) process to a plurality of luma predictions of the target video block; and performing the conversion based on the applying. The method in accordance with the fifth aspect of the present disclosure applies the PROF process to the luma predictions, and thus improve the coding efficiency and coding effectiveness.

In a sixth aspect, another method for video processing is proposed. The method comprises: applying, during a conversion between a target video block of a video and a bitstream of the video, a sample-based prediction refinement with optical flow (PROF) process for the target video block; and performing the conversion based on the applying. The method in accordance with the sixth aspect of the present disclosure applies the sample-based PROF process for the video block, and thus improve the coding efficiency and coding effectiveness.

In a seventh aspect, an apparatus for processing video data is proposed. The apparatus for processing video data comprises a processor and a non-transitory memory with instructions thereon. The instructions upon execution by the processor, cause the processor to perform a method in accordance with the first, second, third, fourth, fifth or sixth aspect of the present disclosure.

In an eighth aspect, a non-transitory computer-readable storage medium is proposed. The non-transitory computer-readable storage medium stores instructions that cause a processor to perform a method in accordance with the first, second, third, fourth, fifth or sixth aspect of the present disclosure.

In a ninth aspect, a non-transitory computer-readable recording medium is proposed. The non-transitory computer-readable recording medium stores a bitstream of a video which is generated by a method performed by a video processing apparatus. The method comprises: determining an affine prediction list of a target video block of the video based on at least one of the following: a non-adjacent spatial candidate, or a temporal collocated candidate; and generating the bitstream based on the affine prediction list.

In a tenth aspect, a method for storing a bitstream of a video is proposed. The method comprises: determining an affine prediction list of a target video block of the video based on at least one of the following: a non-adjacent spatial candidate, or a temporal collocated candidate; generating the bitstream based on the affine prediction list; and storing the bitstream in a non-transitory computer-readable recording medium.

In an eleventh aspect, another non-transitory computer-readable recording medium is proposed. The non-transitory computer-readable recording medium stores a bitstream of a video which is generated by a method performed by a video processing apparatus. The method comprises: determining at least one multi-hypothesis prediction (MHP) hypothesis of a target video block of the video; applying a local illumination compensation (LIC) to the at least one MHP hypothesis; and generating the bitstream based on the applying.

In a twelfth aspect, another method for storing a bitstream of a video is proposed. The method comprises: determining at least one multi-hypothesis prediction (MHP) hypothesis of a target video block of the video; applying a local illumination compensation (LIC) to the at least one MHP hypothesis; generating the bitstream based on the applying; and storing the bitstream in a non-transitory computer-readable recording medium.

In a thirteenth aspect, another non-transitory computer-readable recording medium is proposed. The non-transitory computer-readable recording medium stores a bitstream of a video which is generated by a method performed by a video processing apparatus. The method comprises: determining a motion candidate of a target video block of the video; performing a plurality of rounds of search for a template matching-based bi-direction motion refinement on the motion candidate; and generating the bitstream based on the performing.

In a fourteenth aspect, another method for storing a bitstream of a video is proposed. The method comprises: determining a motion candidate of a target video block of the video; performing a plurality of rounds of search for a template matching-based bi-direction motion refinement on the motion candidate; generating the bitstream based on the performing; and storing the bitstream in a non-transitory computer-readable recording medium.

In a fifteenth aspect, another non-transitory computer-readable recording medium is proposed. The non-transitory computer-readable recording medium stores a bitstream of a video which is generated by a method performed by a video processing apparatus. The method comprises: applying a bi-directional optical flow (BDOF) process to at least one of the following modes of a target video block of the video: a symmetric motion vector difference (SMVD) mode, an affine mode, a combined inter and intra prediction (CIIP) mode, a geometric partitioning mode (GPM) mode, a sub-block-based temporal motion vector prediction (SbTMVP) mode, or a multi-hypothesis prediction (MHP) mode; and generating the bitstream based on the applying.

In a sixteenth aspect, another method for storing a bitstream of a video is proposed. The method comprises: applying a bi-directional optical flow (BDOF) process to at least one of the following modes of a target video block of the video: a symmetric motion vector difference (SMVD) mode, an affine mode, a combined inter and intra prediction (CUP) mode, a geometric partitioning mode (GPM) mode, a subblock-based temporal motion vector prediction (SbTMVP) mode, or a multi-hypothesis prediction (MHP) mode; generating the bitstream based on the applying; and storing the bitstream in a non-transitory computer-readable recording medium.

In a seventeenth aspect, another non-transitory computer-readable recording medium is proposed. The non-transitory computer-readable recording medium stores a bitstream of a video which is generated by a method performed by a video processing apparatus. The method comprises: applying a prediction refinement with optical flow (PROF) process to a plurality of luma predictions of a target video block of the video; and generating the bitstream based on the applying.

In an eighteenth aspect, another method for storing a bitstream of a video is proposed. The method comprises: applying a prediction refinement with optical flow (PROF) process to a plurality of luma predictions of a target video block of the video; generating the bitstream based on the applying; and storing the bitstream in a non-transitory computer-readable recording medium.

In a nineteenth aspect, another non-transitory computer-readable recording medium is proposed. The non-transitory computer-readable recording medium stores a bitstream of a video which is generated by a method performed by a video processing apparatus. The method comprises: applying a sample-based prediction refinement with optical flow (PROF) process for a target video block of the video; and generating the bitstream based on the applying.

In a twentieth aspect, another method for storing a bitstream of a video is proposed. The method comprises: applying a sample-based prediction refinement with optical flow (PROF) process for a target video block of the video; generating the bitstream based on the applying; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 32 illustrates another flowchart of a method for video processing in accordance with some embodiments of the present disclosure;

FIG. 33 illustrates another flowchart of a method for video processing in accordance with some embodiments of the present disclosure;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
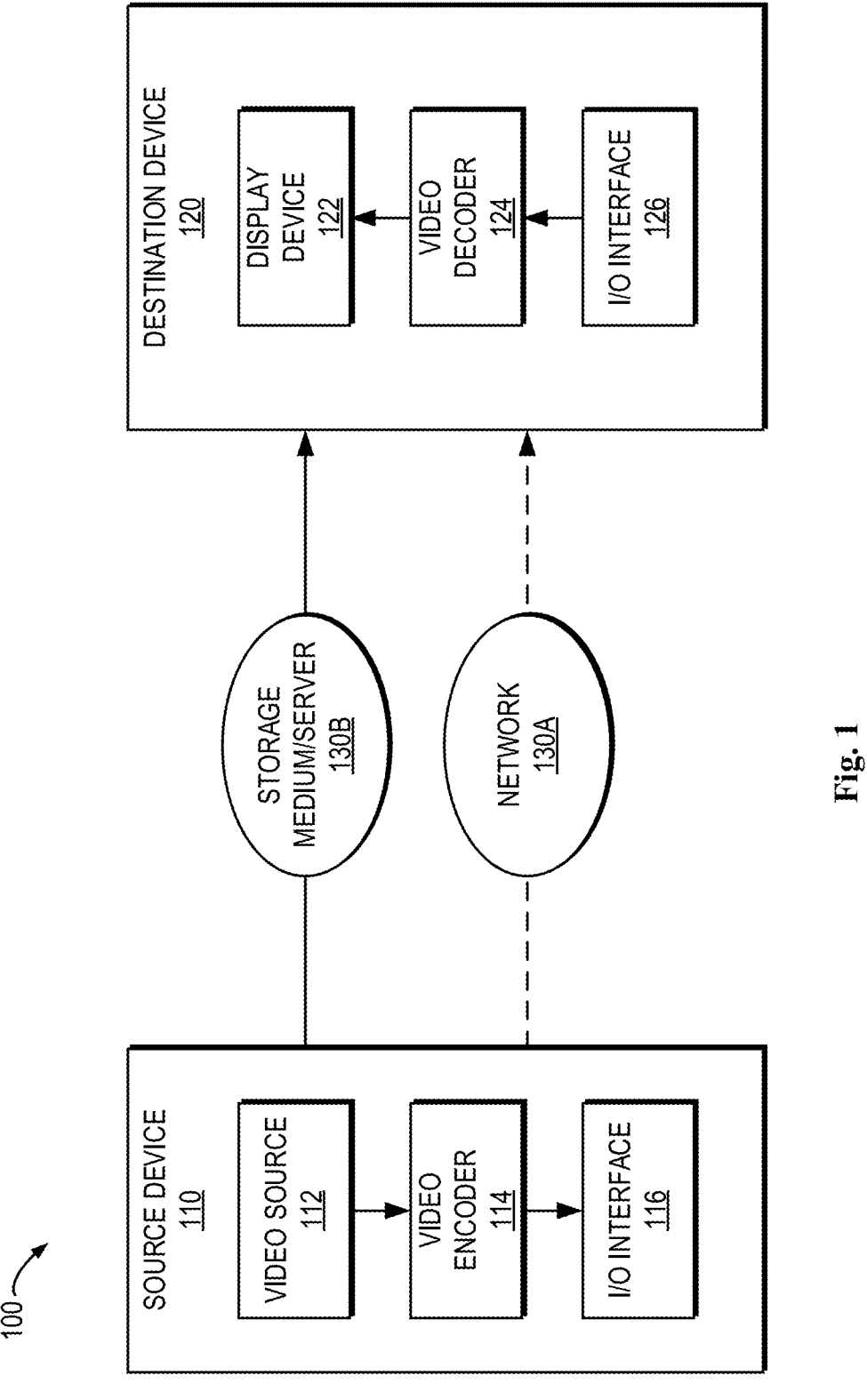
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
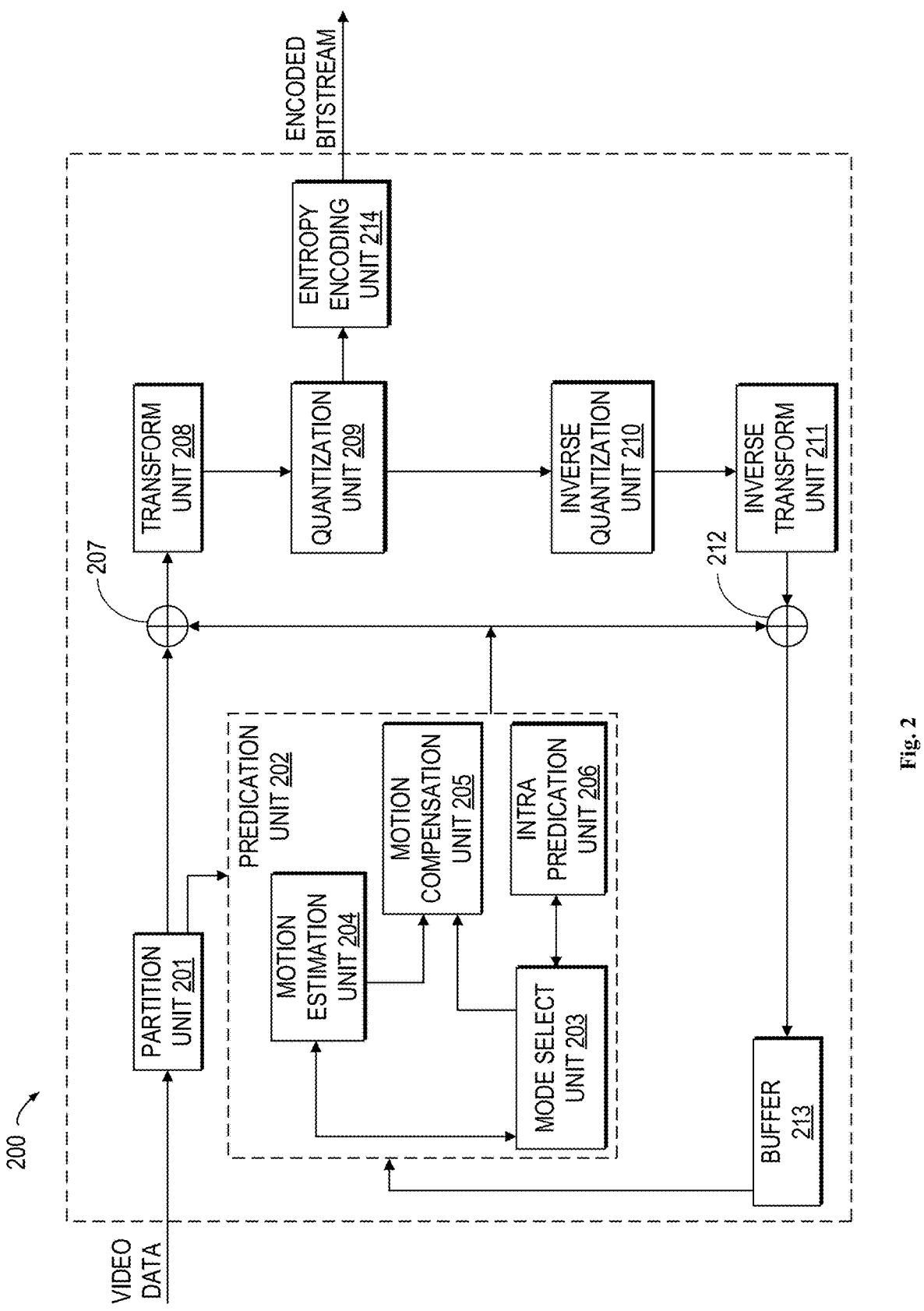
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CUP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
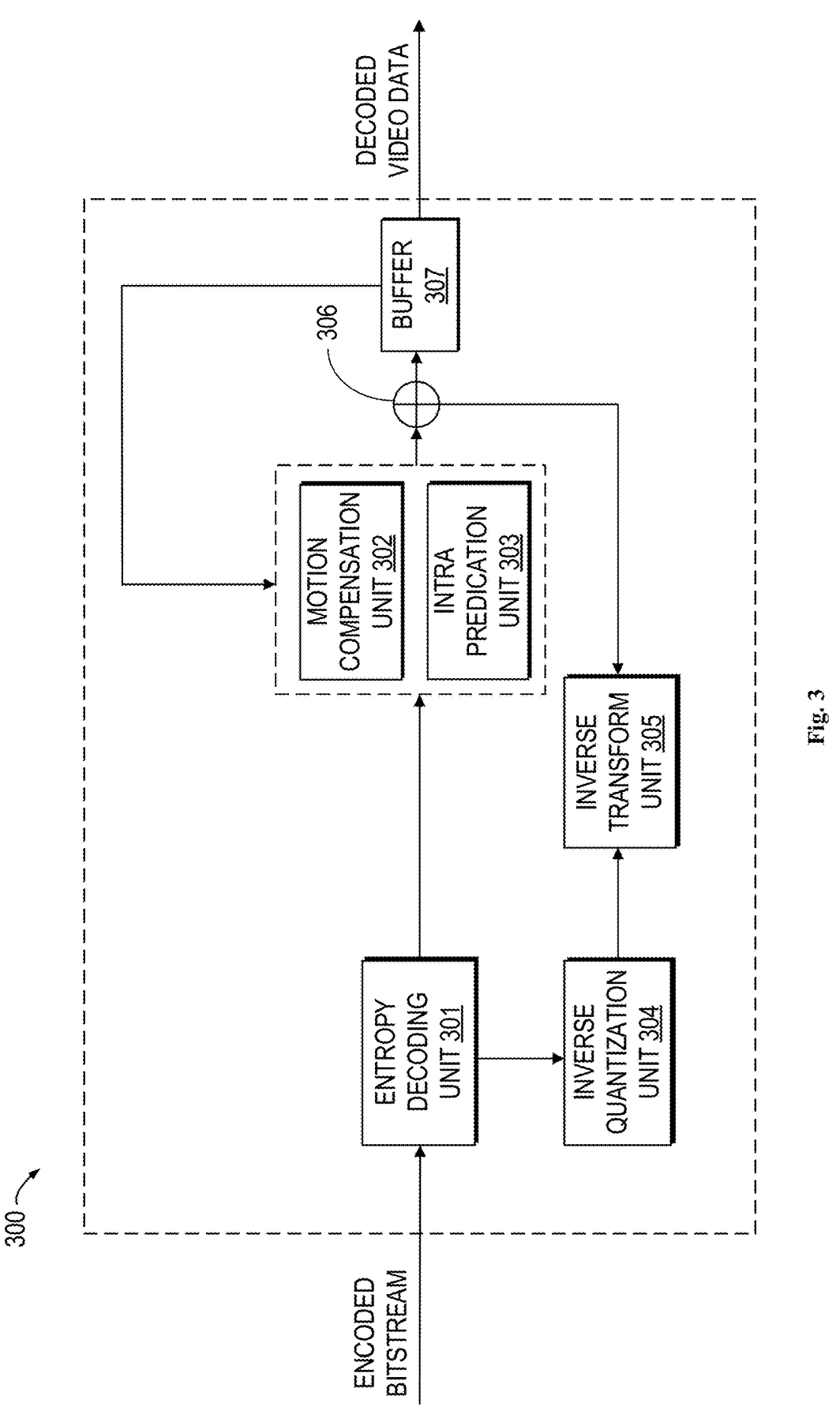
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is about inter prediction in image/video coding. It may be applied to the existing video coding standard like HEVC, VVC, and etc. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 NET meeting, and the first version of VVC test model (VTM) was released at that time. The VVC working draft and test model VTM are then updated after every meeting. The VVC project achieved technical completion (FDIS) at the July 2020 meeting.

2.1. Existing Inter Prediction Coding Tools For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction,

Merge mode with MVD (MMVD),

Symmetric MVD (SMVD) signalling,

Affine motion compensated prediction,

Subblock-based temporal motion vector prediction (SbTMVP),

Adaptive motion vector resolution (AMVR),

Motion field storage: $\frac{1}{16}^{th}$ luma sample MV storage and 8×8 motion field compression, Bi-prediction with CU-level weight (BCW), Bi-directional optical flow (BDOF), Decoder side motion vector refinement (DMVR), Geometric partitioning mode (GPM), Combined inter and intra prediction (CIIP).

The following text provides the details on those inter prediction methods specified in VVC.

2.1.1. Extended Merge Prediction

In VVC, the merge candidate list is constructed by including the following five types of candidates in order:

1) Spatial MVP from spatial neighbour CUs.

2) Temporal MVP from collocated CUs.

3) History-based MVP from an FIFO table.

4) Pairwise average MVP.

5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1.1.1. Spatial Candidates Derivation

Figure 4:
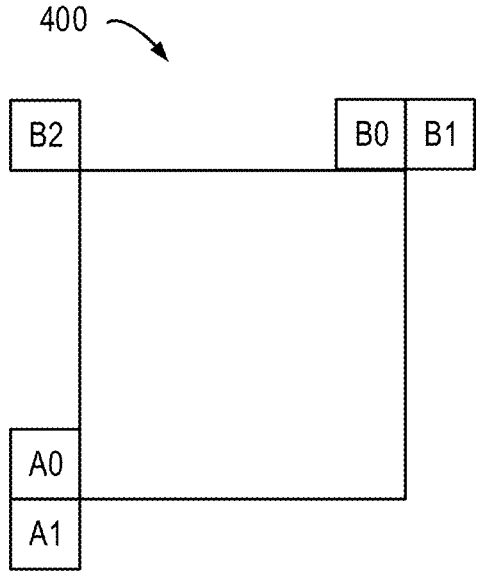
FIG. 4 illustrates an example diagram showing example positions of spatial merge candidate.
Figure 5:
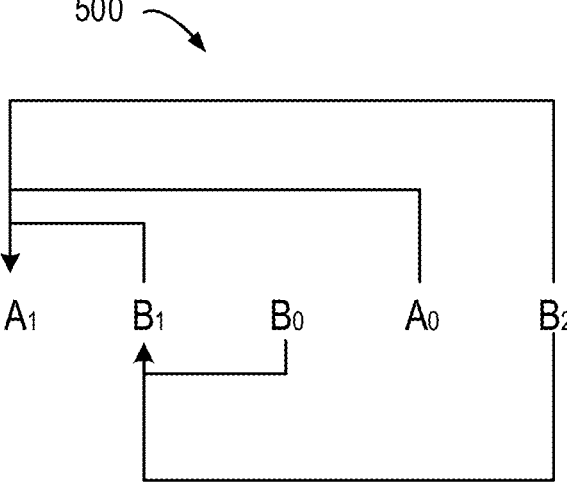
FIG. 5 illustrates an example diagram showing candidate pairs considered for redundancy check of spatial merge candidates.

The derivation of spatial merge candidates in VVC is same to that in HEVC except the positions of first two merge candidates are swapped. FIG. 4 illustrates an example diagram 400 showing example positions of spatial merge candidate. A maximum of four merge candidates are selected among candidates located in the positions depicted in FIG. 4. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. FIG. 5 illustrates an example diagram 500 showing candidate pairs considered for redundancy check of spatial merge candidates. To reduce computational complexity, not all possible candidate pairs are considered in the mentioned redundancy check. Instead, only the pairs linked with an arrow in FIG. 5 are considered and a candidate is only added to the list if the corresponding candidate used for redundancy check has not the same motion information.

2.1.1.2. Temporal Candidates Derivation

Figure 6:
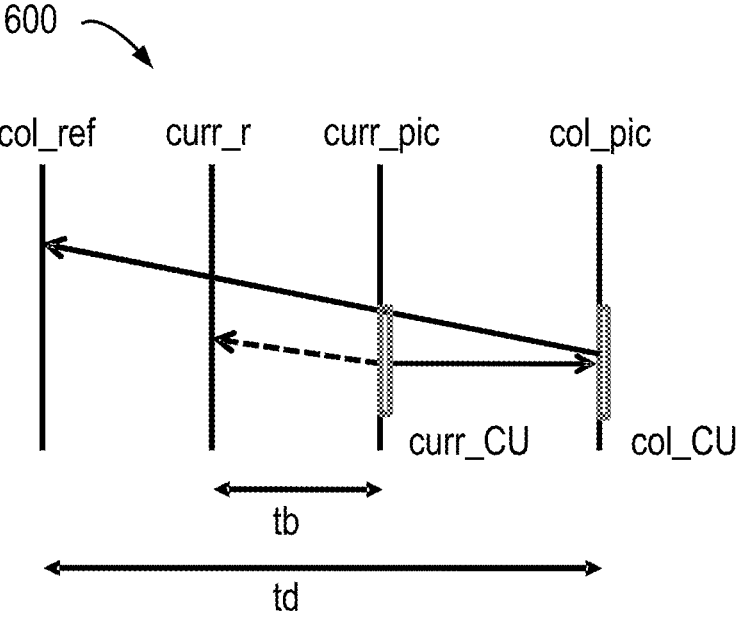
FIG. 6 illustrates an example diagram showing an example motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. FIG. 6 illustrates an example diagram 600 showing an example motion vector scaling for temporal merge candidate. The scaled motion vector for temporal merge candidate is obtained as illustrated by the dotted line in FIG. 6, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 7:
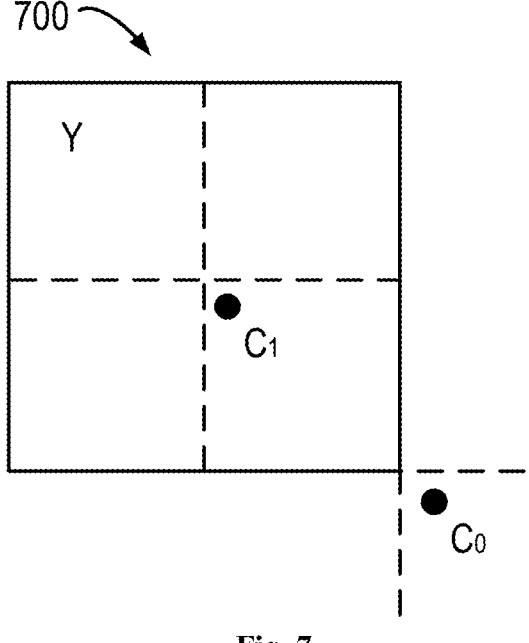
FIG. 7 illustrates an example diagram showing candidate positions for temporal merge candidate, C0 and C1.

FIG. 7 illustrates an example diagram 700 showing candidate positions for temporal merge candidate, $C_0$ and $C_1$. The position for the temporal candidate is selected between candidates $C_0$ and $C_1$, as depicted in FIG. 7. If CU at position $C_0$ is not available, is intra coded, or is outside of the current row of CTUs, position $C_1$ is used. Otherwise, position $C_0$ is used in the derivation of the temporal merge candidate.

2.1.1.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)? M: (8−N), wherein N indicates number of existing candidates in the merge list and M indicates number of available HMVP candidates in the table.

2. Once the total number of available merge candidates reaches the maximally allowed merge candidates minus 1, the merge candidate list construction process from HMVP is terminated.

2.1.1.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. When the merge list is not full after pair-wise average merge candidates are added, the zero MVPs are inserted in the end until the maximum merge candidate number is encountered.

2.1.1.5. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log2ParMrgLevel is greater than xCb>>Log2ParMrgLevel and (yCb+cbHeight) >>Log2ParMrgLevel is great than (yCb>>Log2ParMrgLevel) and where (xCb, yCb) is the top-left luma sample position of the current CU in the picture and (cbWidth, cbHeight) is the CU size. The MER size is selected at encoder side and signalled as log2_parallel_merge_level_minus2 in the sequence parameter set.

2.1.2. Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signaled MVDs information. The further information includes a merge candidate flag, an index to specify motion magnitude, and an index for indication of motion direction. In MMVD mode, one for the first two candidates in the merge list is selected to be used as MV basis. The merge candidate flag is signaled to specify which one is used.

Figure 8A:
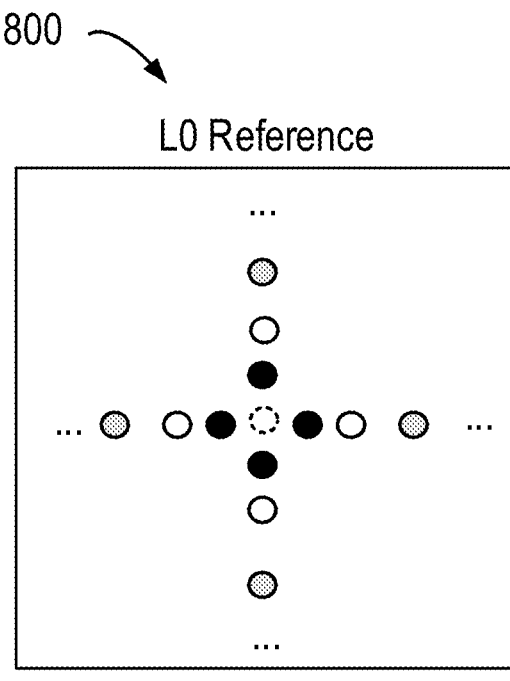
FIG. 8A and FIG. 8B illustrate example diagrams showing MMVD Search Point.
Figure 8B:
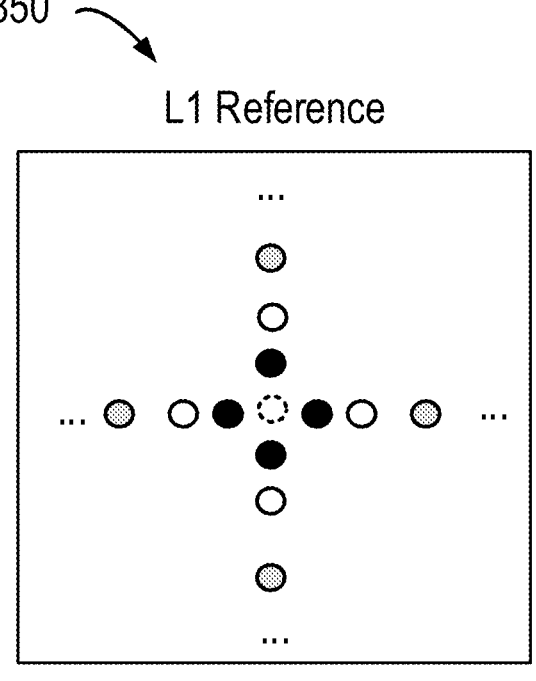

FIG. 8A and FIG. 8B illustrate MMVD Search Point. FIG. 8A illustrates an example diagram 800 showing MMVD Search Point for L0 reference. FIG. 8B illustrates an example diagram 850 showing MMVD Search Point for $L_1$ reference. Distance index specifies motion magnitude information and indicate the pre-defined offset from the starting point. As shown in FIGS. 8A and 8B, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | $\frac{1}{4}$ | $\frac{1}{2}$ | 1 | 2 | 4 | 8 | 16 | 32 |

Direction index represents the direction of the MVD relative to the starting point. The direction index can represent of the four directions as shown in Table 2. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.1.2.1. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) >> 3. \qquad (2\text{-}1)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3, 4, 5\}$) are used.

At the encoder, fast search algorithms are applied to find the weight index without significantly increasing the encoder complexity. These algorithms are summarized as follows. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e., equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV. In VVC, CIIP and BCW cannot be jointly applied for a CU. When a CU is coded with CIIP mode, the BCW index of the current CU is set to 2, e.g., equal weight.

2.1.2.2. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order.

The distances (i.e. POC difference) from two reference pictures to the current picture are same.

Both reference pictures are short-term reference pictures.

The CU is not coded using affine mode or the ATMVP merge mode.

CU has more than 64 luma samples.

Both CU height and CU width are larger than or equal to 8 luma samples.

BCW weight index indicates equal weight.

WP is not enabled for the current CU.

CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0, 1, of the two prediction signals are computed by directly calculating the difference between two neighboring samples, i.e., $$\frac{\partial I^{(k)}}{\partial x}(i, j) = \left(\left(I^{(k)}(i+1, j)\text{shift1}\right) - \left(I^{(k)}(i-1, j)\text{shift1}\right)\right) \quad (2\text{-}2)$$

$$\frac{\partial I^{(k)}}{\partial y}(i, j) = \left(\left(I^{(k)}(i, j+1)\text{shift1}\right) - \left(I^{(k)}(i, j-1)\text{shift1}\right)\right)$$

where $I^{(k)}(i,j)$ are the sample value at coordinate (i,j) of the prediction signal in list k, k=0, 1, and shift1 is calculated based on the luma bit depth, bitDepth, as shift1=max(6, bitDepth−6). Then, the auto- and cross-correlation of the gradients, $S_1$, $S_2$, $S_3$, $S_5$ and $S_6$, are calculated as $$S_1 = \Sigma_{(i,j) \in \Omega} \text{Abs}(\psi_x(i, j)), S_3 = \Sigma_{(i,j) \in \Omega} \theta(i, j) \cdot \text{Sign}(\psi_x(i, j)) \quad (2\text{-}3)$$

$$S_2 = \sum_{(i,j) \in \Omega} \psi_x(i, j) \cdot \text{Sign}(\psi_y(i, x))$$

$$S_5 = \Sigma_{(i,j) \in \Omega} \text{Abs}(\psi_x(i, j)), S_6 = \Sigma_{(i,j) \in \Omega} \theta(i, j) \cdot \text{Sign}(\psi_y(i, j))$$

where $$\psi_x(i, j) = \left(\frac{\partial I^{(1)}}{\partial x}(i, j) + \frac{\partial I^{(0)}}{\partial x}(i, j)\right) >> n_a$$

$$\psi_y(i, j) = \left(\frac{\partial I^{(1)}}{\partial y}(i, j) + \frac{\partial I^{(0)}}{\partial y}(i, j)\right) >> n_a$$

$$\theta(i, j) = \left(I^{(i)}(i, j) >> n_b\right) - \left(I^{(0)}(i, j) >> n_b\right)$$

where $\Omega$ is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0? \text{ clip3}\left(-th'_{BIO}, th'_{BIO}, -\left((S_3 \cdot 2^{n_b - n_a}) >> \lfloor \log_2 S_1 \rfloor\right)\right):0 \quad (2\text{-}5)$$

$$v_y = S_5 > 0? \text{ clip3}\left(-th'_{BIO}, th'_{BIO},\right.$$

$$\left.-\left((S_6 \cdot 2^{n_b - n_a} - ((v_x S_{2,m}) << n_{S_2} + v_x S_{2,s})/2) >> \lfloor \log_2 S_5 \rfloor\right)\right):0$$

where $S_{2,m} = S_2 >> n_{S_2}$, $S_{2,s} = S_2 \& (2^{n_{S_2}} - 1)$, $$th'_{BIO} = 2^{max(5, BD-7)}. \lfloor \cdot \rfloor$$

is the floor function, and $n_{S_2} = 12$.

Based on the motion refinement and the gradients, the following adjustment is calculated for each sample in the 4×4 subblock:

$$b(x, y) = rnd \quad (2\text{-}6)$$

$$\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial t}\right) + 1\right)/2\right)$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + o_{offset}\right) >> \text{shift} \quad (2\text{-}7)$$

Figure 9:
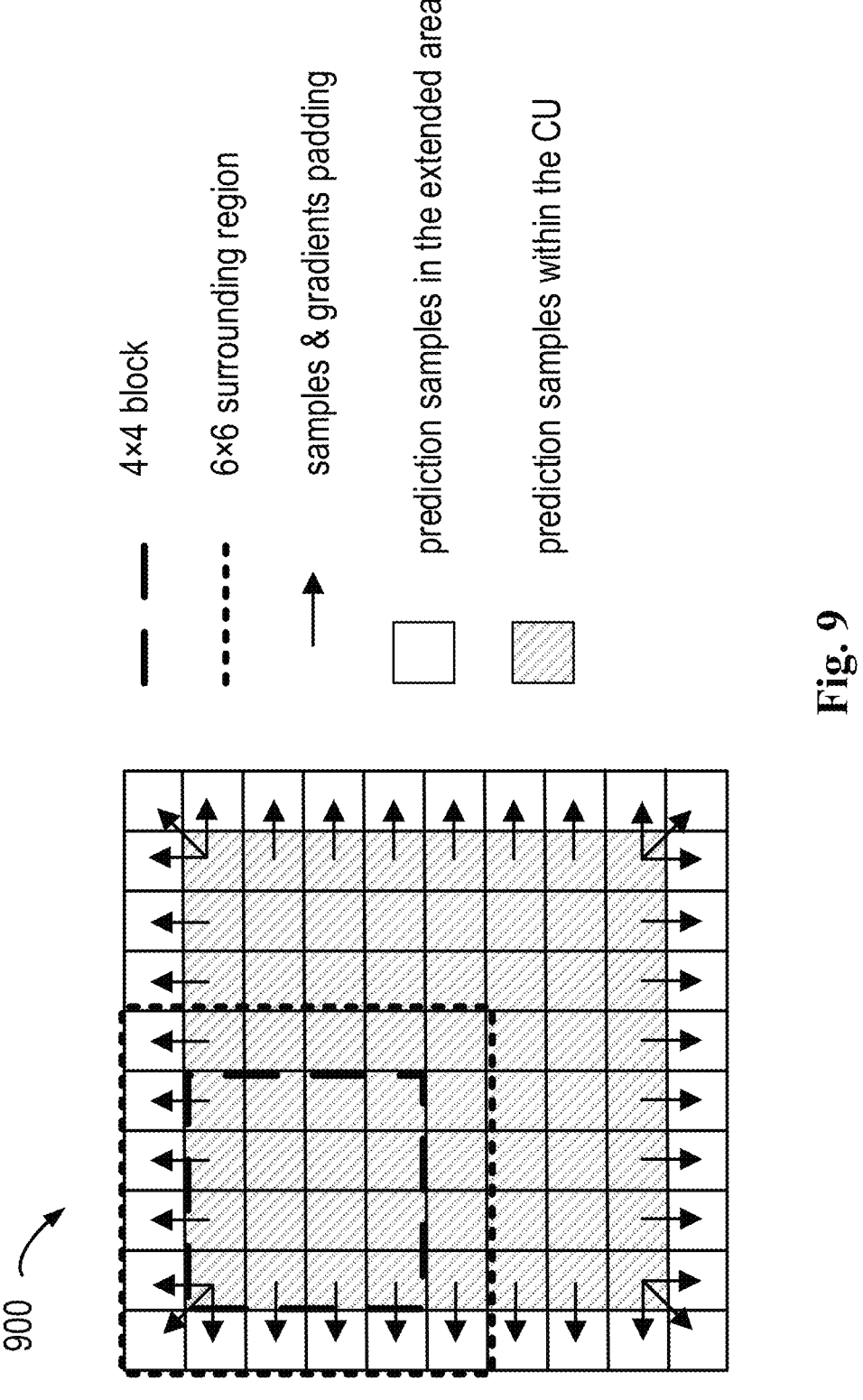
FIG. 9 illustrates an example diagram showing extended CU region used in BDOF.

These values are selected such that the multipliers in the BDOF process do not exceed 15-bit, and the maximum bit-width of the intermediate parameters in the BDOF process is kept within 32-bit. In order to derive the gradient values, some prediction samples $I^{(k)}(i,j)$ in list k (k=0, 1) outside of the current CU boundaries need to be generated. FIG. 9 illustrates an example diagram 900 showing extended CU region used in BDOF. As depicted in FIG. 9, the BDOF in VVC uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

2.1.2.3. Symmetric MVD Coding (SMVD)

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1) At slice level, variables BiDirPredFlag, RefIdxSymL0 and RefIdxSymL1 are derived as follows:

If mvd_l1_zero_flag is 1, BiDirPredFlag is set equal to 0.

Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.

2) At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$
\begin{cases}
(mvx_0, mvy_0) = (mvpx_0 + mvdx_0, mvpy_0 + mvdy_0) \\
(mvx_1, mvy_1) = (mvpx_1 - mvdx_0, mvpy_1 - mvdy_0)
\end{cases}
\quad (2\text{-}8)
$$

Figure 10:
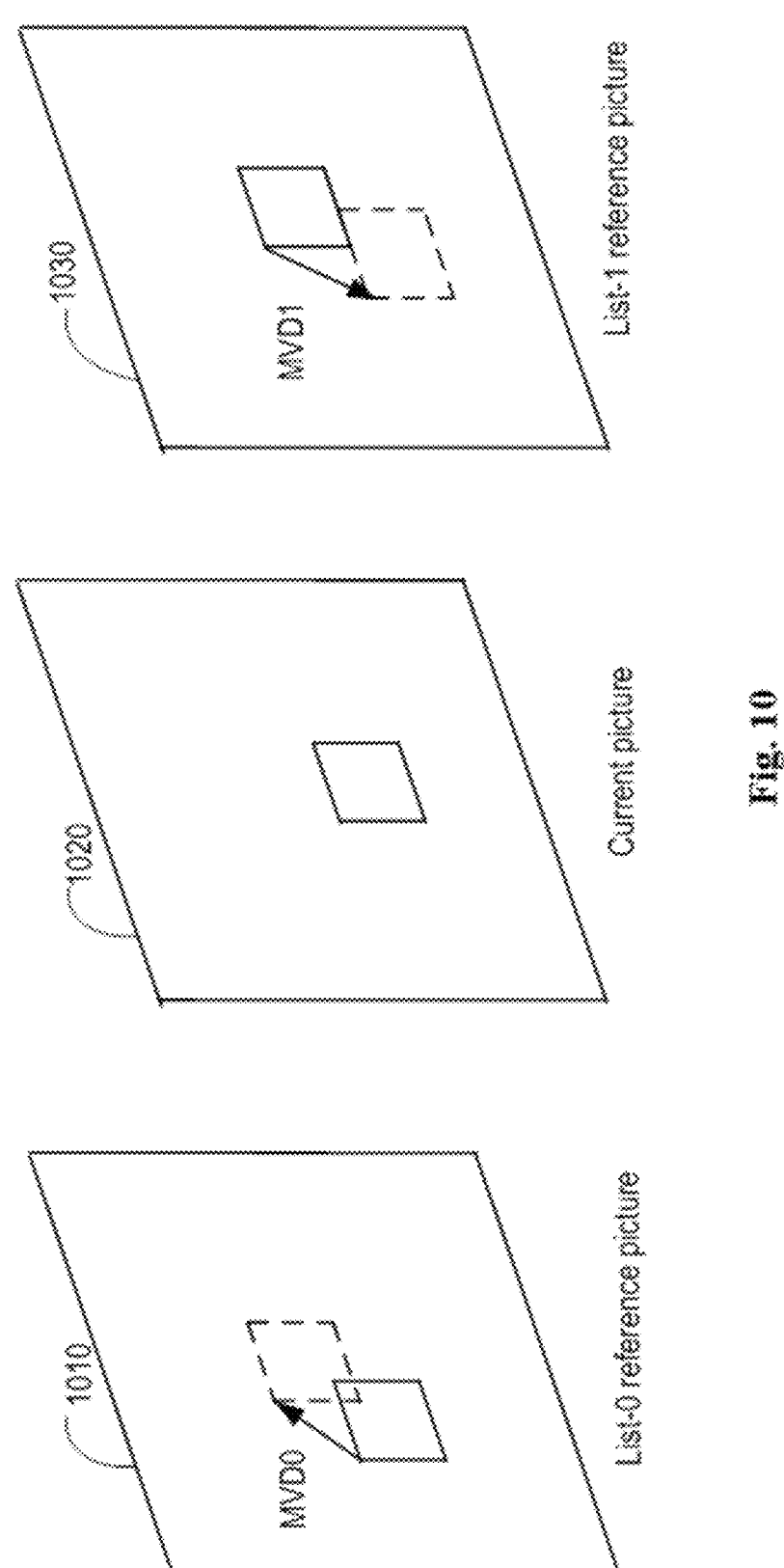
FIG. 10 illustrates an example diagram showing an illustration for symmetrical MVD mode.

FIG. 10 illustrates an example diagram showing an illustration for symmetrical MVD mode. FIG. 10 illustrates a list0 reference picture 1010, a current picture 1020 and a list1 reference picture 1030. In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

2.1.3. Affine Motion Compensated Prediction

Figure 11A:
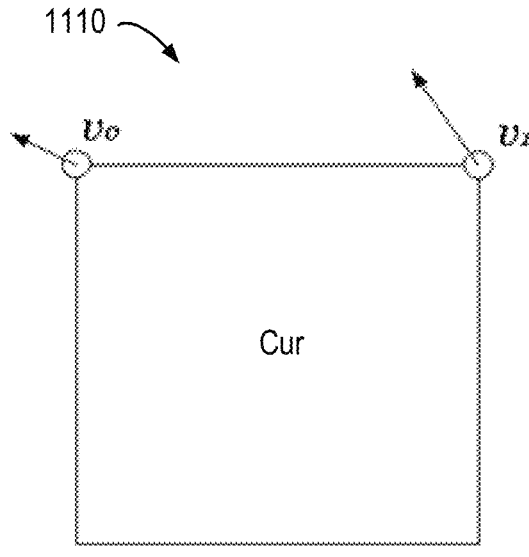
FIG. 11A and FIG. 11B illustrate examples of control point based affine motion model.
Figure 11B:
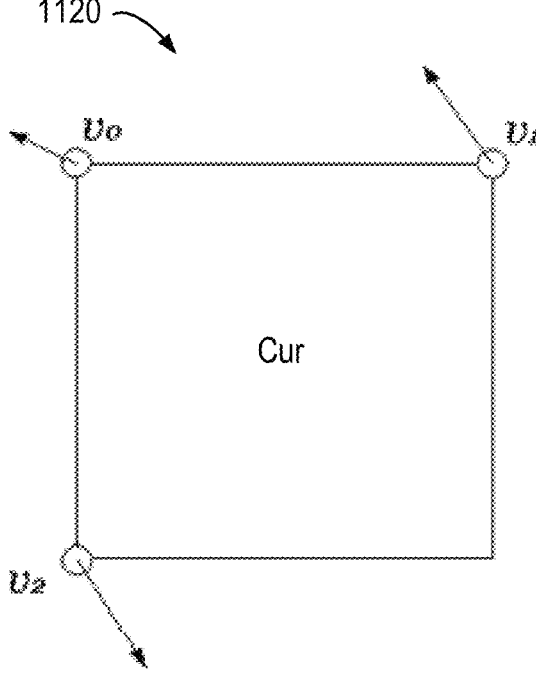

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. FIG. 11A illustrates an example control point based affine motion model 1110 (4-parameter). FIG. 11B illustrates an example control point based affine motion model 1120 (6-parameter). As shown in FIG. 11A, the affine motion field of the block is described by motion information of two control point (4-parameter). Alternatively, as shown in FIG. 11B, the affine motion field of the block is described by motion information of three control point motion vectors (6-parameter).

For 4-parameter affine motion model, motion vector at sample location (x,y) in a block is derived as:

$$
\begin{cases}
mv_x = \dfrac{mv_{1x} - mv_{0x}}{W}x + \dfrac{mv_{0y} - mv_{1y}}{W}y + mv_{0x} \\
mv_y = \dfrac{mv_{1y} - mv_{0y}}{W}x + \dfrac{mv_{1x} - mv_{0x}}{W}y + mv_{0y}
\end{cases}
\quad (2\text{-}9)
$$

For 6-parameter affine motion model, motion vector at sample location (x,y) in a block is derived as:

$$
\begin{cases}
mv_x = \dfrac{mv_{1x} - mv_{0x}}{W}x + \dfrac{mv_{2x} - mv_{0x}}{H}y + mv_{0x} \\
mv_y = \dfrac{mv_{1y} - mv_{0y}}{W}x + \dfrac{mv_{2y} - mv_{0y}}{H}y + mv_{0y}
\end{cases}
\quad (2\text{-}10)
$$

Where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figures 12, 13:
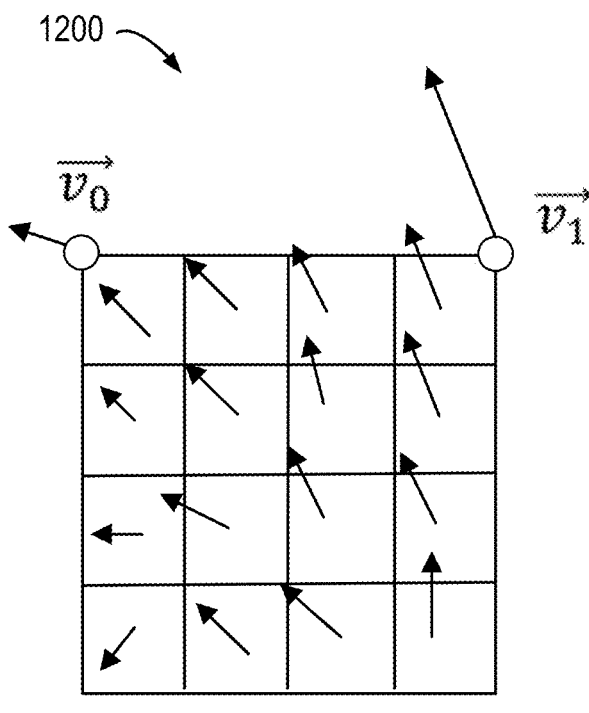
FIG. 12 illustrates an example diagram showing an affine MVF per subblock.
FIG. 13 illustrates an example diagram showing locations of inherited affine motion predictors.

In order to simplify the motion compensation prediction, block based affine transform prediction is applied. FIG. 12 illustrates an example diagram 1200 showing an affine MVF per subblock. To derive motion vector of each 4×4 luma subblock, the motion vector of the center sample of each subblock, as shown in FIG. 12, is calculated according to above equations, and rounded to $\frac{1}{16}$ fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

2.1.3.1. Affine Merge Prediction

AF_MERGE mode can be applied for CUs with both width and height larger than or equal to 8. In this mode CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs, Constructed affine merge candidates CPMVPs that are derived using the translational MVs of the neighbour CUs, Zero MVs.

Figure 14:
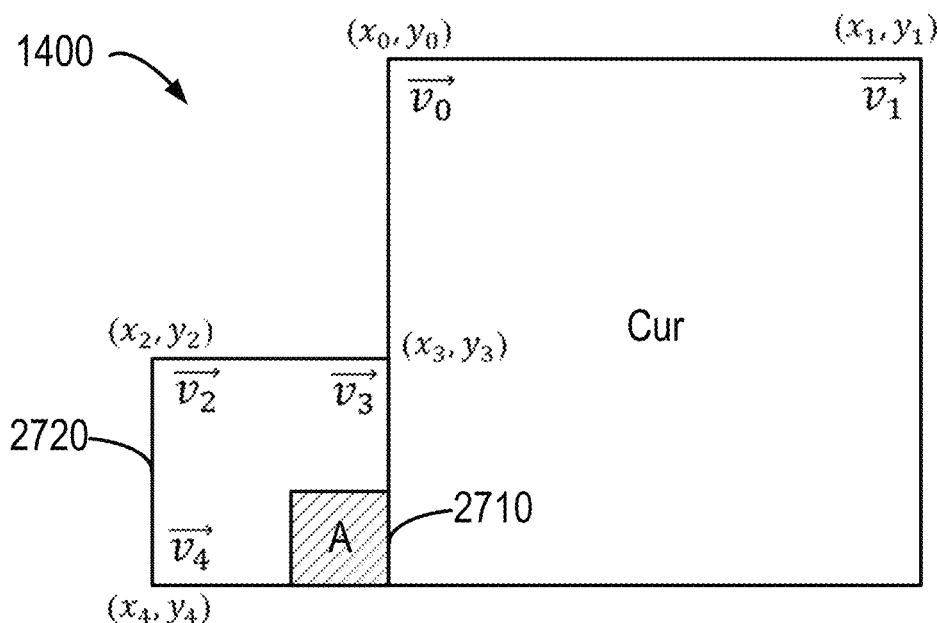
FIG. 14 illustrates an example diagram showing a control point motion vector inheritance.

In VVC, there are maximum two inherited affine candidates, which are derived from affine motion model of the neighboring blocks, one from left neighboring CUs and one from above neighboring CUs. FIG. 13 illustrates an example diagram 1300 showing locations of inherited affine motion predictors. The candidate blocks are shown in FIG. 13. For the left predictor, the scan order is A0->A1, and for the above predictor, the scan order is B0->B1->B2. Only the first inherited candidate from each side is selected. No pruning check is performed between two inherited candidates. When a neighboring affine CU is identified, its control point motion vectors are used to derived the CPMVP candidate in the affine merge list of the current CU. FIG. 14 illustrates an example diagram 1400 showing a control point motion vector inheritance As shown in FIG. 14, if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 15:
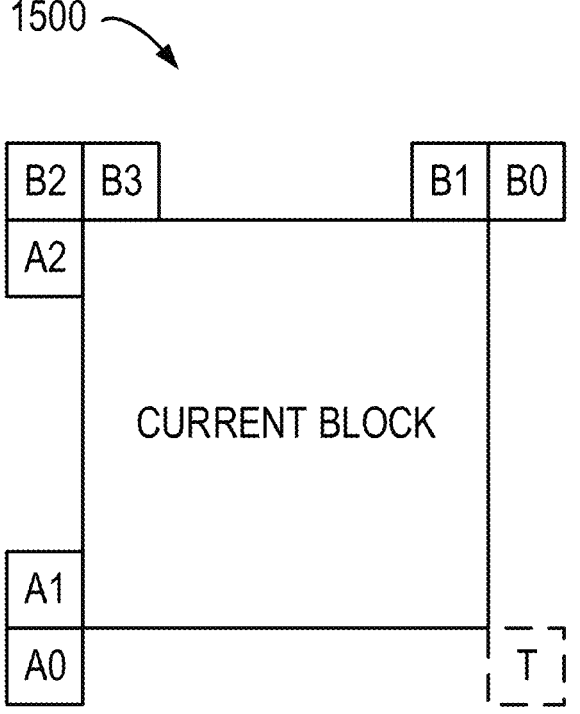
FIG. 15 illustrates an example diagram showing locations of Candidates position for constructed affine merge mode.

Constructed affine candidate means the candidate is constructed by combining the neighbor translational motion information of each control point. FIG. 15 illustrates an example diagram 1500 showing locations of Candidates position for constructed affine merge mode. The motion information for the control points is derived from the specified spatial neighbors and temporal neighbor shown in FIG. 15. $CPMV_k$ (k=1, 2, 3, 4) represents the k-th control point. For $CPMV_1$, the B2->B3->A2 blocks are checked and the MV of the first available block is used. For $CPMV_2$, the B1->B0 blocks are checked and for $CPMV_3$, the A1->A0 blocks are checked. For TMVP is used as $CPMV_4$ if it's available.

After MVs of four control points are attained, affine merge candidates are constructed based on those motion information. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.1.3.2. Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs, Constructed affine AMVP candidates CPMVPs that are derived using the translational MVs of the neighbour CUs, Translational MVs from neighboring CUs, Zero MVs.

The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Constructed AMVP candidate is derived from the specified spatial neighbors shown in FIG. 15. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $mv_i$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

2.1.3.3. Affine Motion Information Storage

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and deblocking.

To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right subblock MVs in the line buffer instead of the CPMVs are used for the affine MVP derivation.

Figure 16:
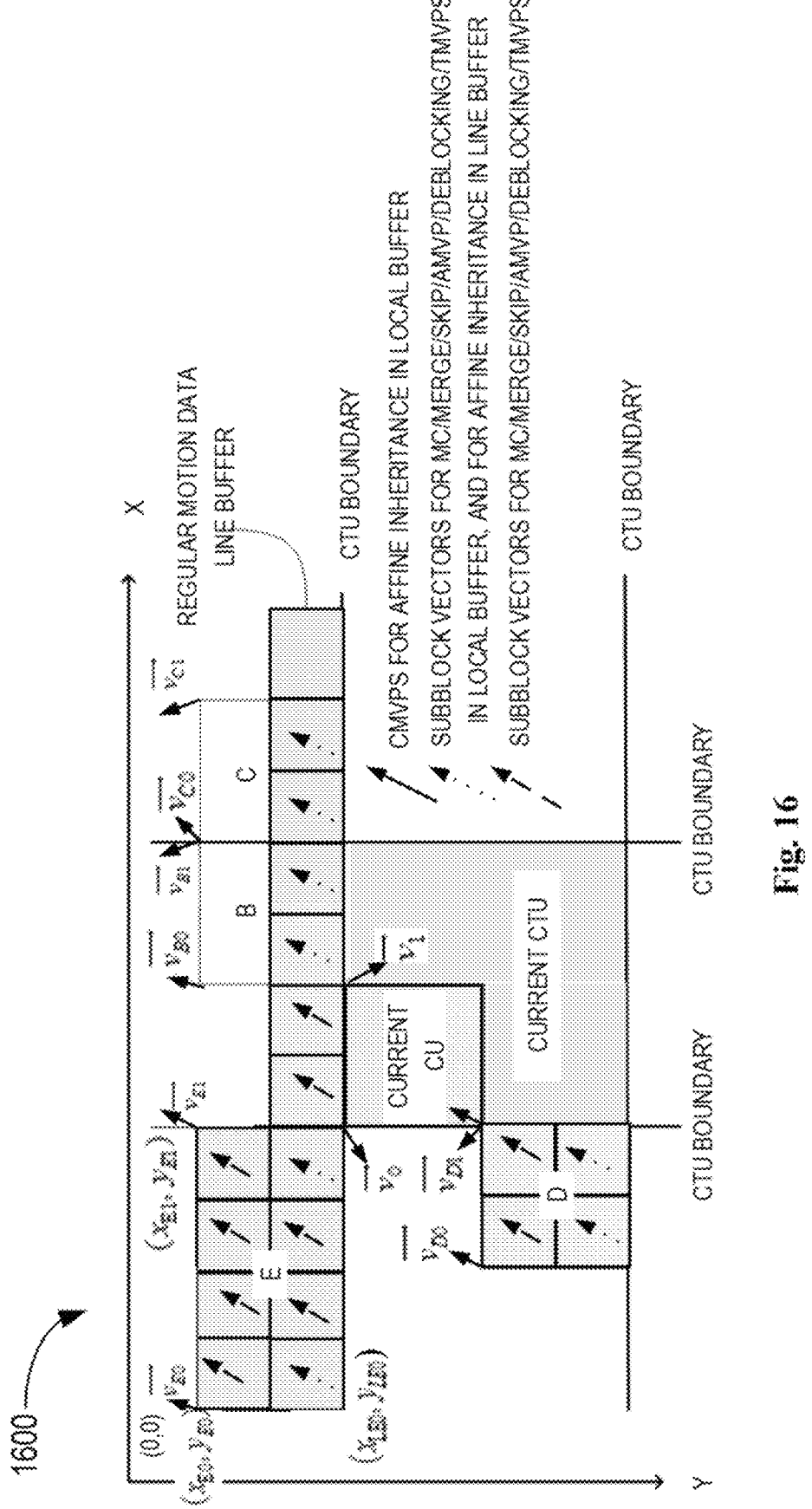
FIG. 16 illustrates an example diagram illustrating an illustration of motion vector usage for proposed combined method.

In this way, the CPMVs are only stored in local buffer. If the candidate CU is 6-parameter affine coded, the affine model is degraded to 4-parameter model. FIG. 16 illustrates an example diagram 1600 illustrating an illustration of motion vector usage for proposed combined method. As shown in FIG. 16, along the top CTU boundary, the bottom-left and bottom right subblock motion vectors of a CU are used for affine inheritance of the CUs in bottom CTUs.

2.1.3.4. Prediction Refinement with Optical Flow for Affine Mode (PROF)

Figure 17:
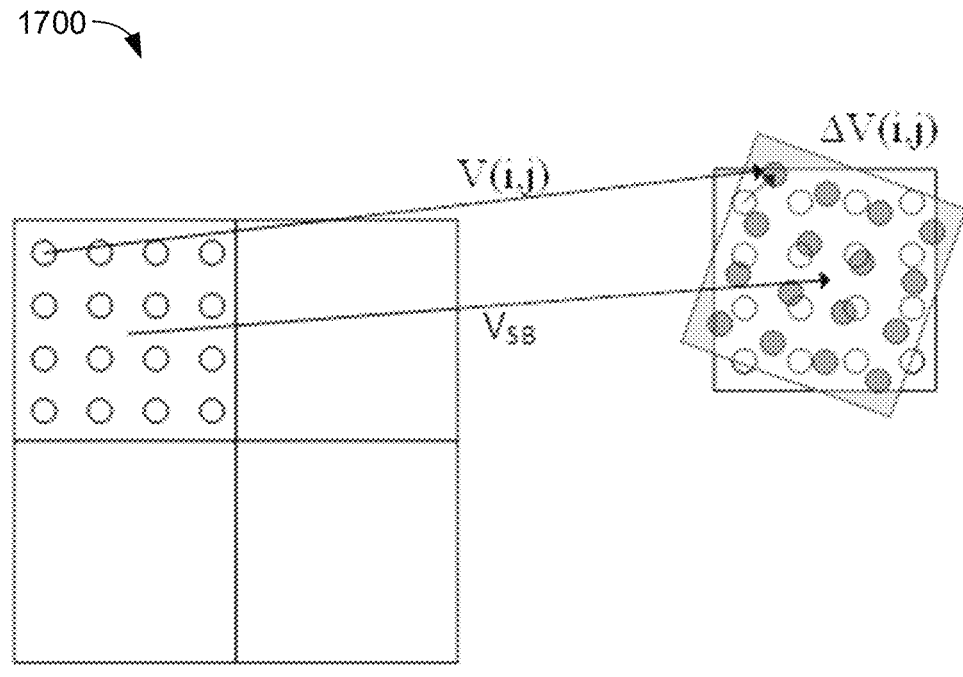
FIG. 17 illustrates an example diagram illustrating a Subblock MV $V_{SB}$ and pixel $\Delta v(i,j)$ (arrow)

Subblock based affine motion compensation can save memory access bandwidth and reduce computation complexity compared to pixel based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. FIG. 17 illustrates an example diagram 1700 illustrating a Subblock MV $V_{SB}$ and pixel $\Delta v(i,j)$ (arrow). The PROF is described as following four steps:

Step 1) The subblock-based affine motion compensation is performed to generate subblock prediction I(i,j).

Step 2) The spatial gradients $g_x(i,j)$ and $g_y(i,j)$ of the subblock prediction are calculated at each sample location using a 3-tap filter [−1, 0, 1]. The gradient calculation is exactly the same as gradient calculation in BDOF.

$$g_x(i, j) = \left(I(i+1, j) >> \text{shift1}\right) - \left(I(i-1, j) >> \text{shift1}\right) \qquad (2\text{-}11)$$

$$g_y(i, j) = \left(I(i, j+1) >> \text{shift1}\right) - \left(I(i, j-1) >> \text{shift1}\right) \qquad (2\text{-}12)$$

shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Step 3) The luma prediction refinement is calculated by the following optical flow equation.

$$\Delta I(i, j) = g_x(i, j) * \Delta v_x(i, j) + g_y(i, j) * \Delta v_y(i, j) \qquad (2\text{-}13)$$

where the $\Delta v(i,j)$ is the difference between sample MV computed for sample location $(i,j)$, denoted by $v(i,j)$, and the subblock MV of the subblock to which sample $(i,j)$ belongs, as shown in FIG. 17. The $\Delta v(i,j)$ is quantized in the unit of $\frac{1}{32}$ luma sample precision.

Since the affine model parameters and the sample location relative to the subblock center are not changed from subblock to subblock, $\Delta v(i,j)$ can be calculated for the first subblock, and reused for other subblocks in the same CU. Let $dx(i,j)$ and $dy(i,j)$ be the horizontal and vertical offset from the sample location $(i,j)$ to the center of the subblock $(x_{SB}, y_{SB})$, $\Delta v(x,y)$ can be derived by the following equation.

$$\begin{cases} dx(i, j) = i - x_{SB} \\ dy(i, j) = j - y_{SB} \end{cases} \qquad (2\text{-}14)$$

$$\begin{cases} \Delta v_x(i, j) = C * dx(i, j) + D * dy(i, j) \\ \Delta v_y(i, j) = E * dx(i, j) + F * dy(i, j) \end{cases} \qquad (2\text{-}15)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively. For 4-parameter affine model, $$\begin{cases} C = F = \dfrac{v_{1x} - v_{0x}}{w} \\ E = -D = \dfrac{v_{1y} - v_{0y}}{w} \end{cases} \qquad (2\text{-}16)$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \qquad (2\text{-}17)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement $\Delta I(i,j)$ is added to the subblock prediction $I(i,j)$. The final prediction I' is generated as the following equation.

$$I'(i, j) = I(i, j) + \Delta I(i, j)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.1.4. Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 18A:
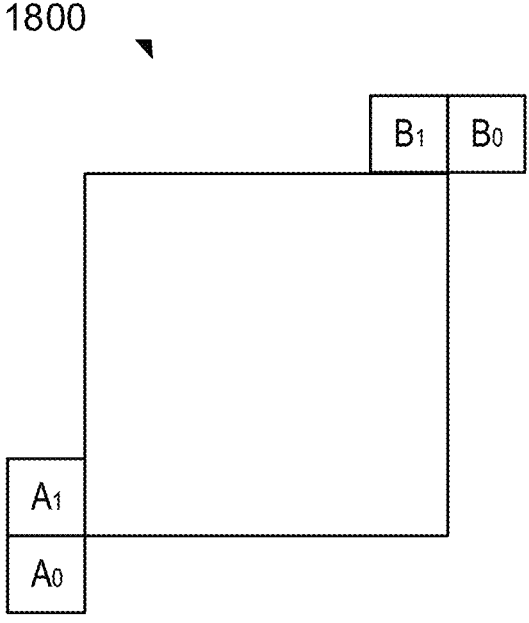
FIG. 18A illustrates an example diagram illustrating spatial neighboring blocks used by ATVMP.
Figure 18B:
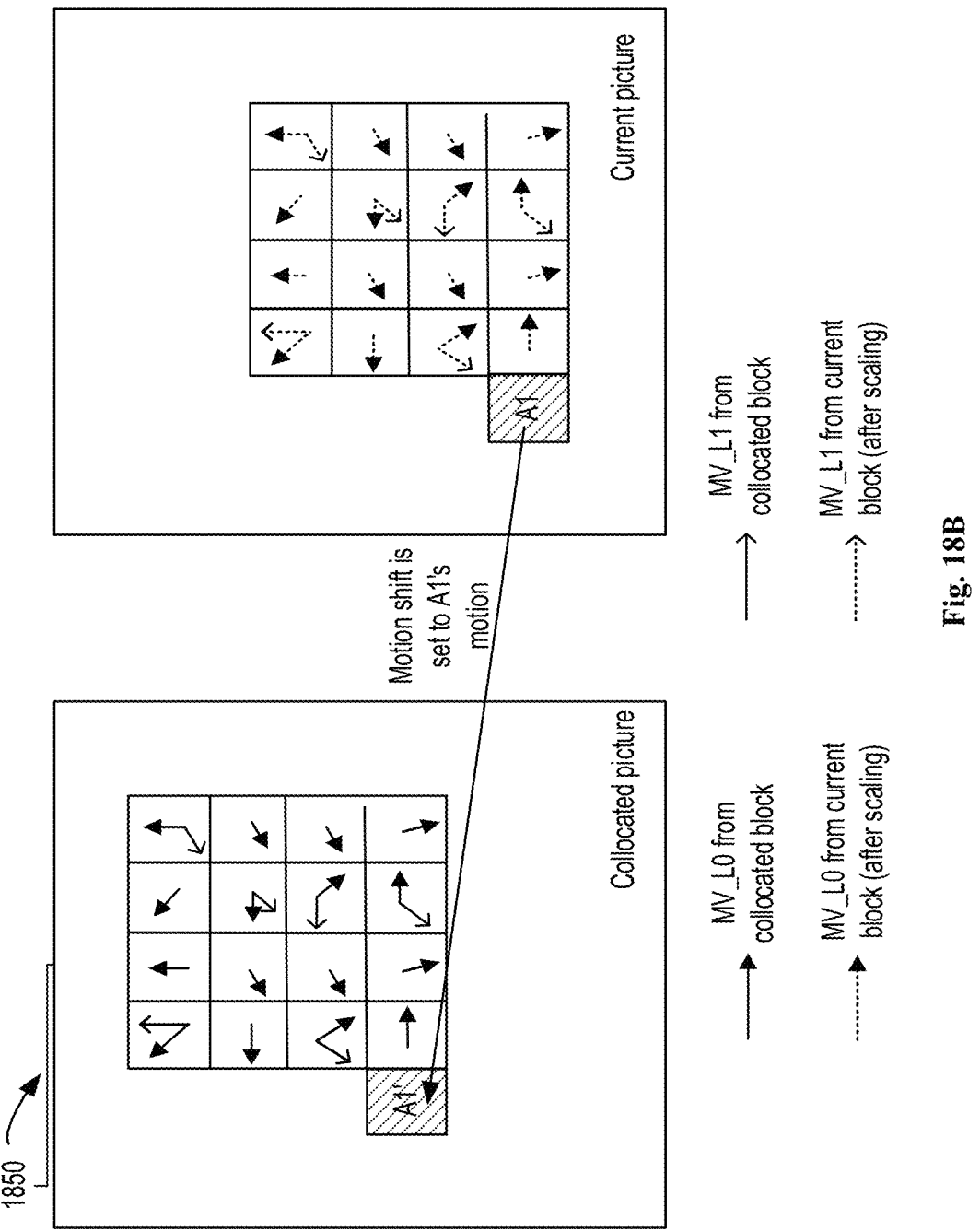
FIG. 18B illustrates an example diagram illustrating the SbTMVP process in VVC.

The SbTVMP process is illustrated in FIG. 18A and FIG. 18B. FIG. 18A illustrates an example diagram 1800 illustrating spatial neighboring blocks used by ATVMP. FIG. 18B illustrates an example diagram 1850 illustrating deriving sub-CU motion field by applying a motion shift from spatial neighbor and scaling the motion information from the corresponding collocated sub-CUs. SbTMVP predicts the motion vectors of the sub-CUs within the current CU in two steps. In the first step, the spatial neighbor A1 in FIG. 18A is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e. added to the current block's coordinates) to obtain sub-CU level motion information (motion vectors and reference indices) from the collocated picture as shown in FIG. 18B. The example in FIG. 18B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTVMP candidate and affine merge candidates is used for the signalling of subblock based merge mode. The SbTVMP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8. The encoding logic of the additional SbTMVP merge candidate is the same as for the other merge candidates, that is, for each CU in P or B slice, an additional RD check is performed to decide whether to use the SbTMVP candidate.

2.1.5. Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.
  Affine AMVP mode: quarter-luma-sample, integer-luma-sample or $\frac{1}{16}$ luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred. For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate half-luma-sample or other MVD precisions (interger or four-luma sample) is used for normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for normal AMVP CU. In the case of affine AMVP CU, the second flag is used to indicate whether integer-luma-sample or $\frac{1}{16}$ luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check four times for each MVD resolution, in VTM13, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For affine AMVP mode, if affine inter mode is not selected after checking rate-distortion costs of affine merge/skip mode, merge/skip mode, quarter-luma-sample MVD precision normal AMVP mode and quarter-luma-sample MVD precision affine AMVP mode, then $\frac{1}{16}$ luma-sample MV precision and 1-pel MV precision affine inter modes are not checked. Furthermore affine parameters obtained in quarter-luma-sample MV precision affine inter mode is used as starting search point in $\frac{1}{16}$ luma-sample and quarter-luma-sample MV precision affine inter modes.

2.1.6. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) >> 3 \qquad (2\text{-}18)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3, 4, 5\}$) are used.

At the encoder, fast search algorithms are applied to find the weight index without significantly increasing the encoder complexity. These algorithms are summarized as follows. When combined with AMVR, unequal weights are only conditionally checked for 1-pel and 4-pel motion vector precisions if the current picture is a low-delay picture.
  When combined with affine, affine ME will be performed for unequal weights if and only if the affine mode is selected as the current best mode.
  When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIP mode, the BCW index of the current CU is set to 2, e.g., equal weight.

2.1.7. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order.

The distances (i.e. POC difference) from two reference pictures to the current picture are same.

Both reference pictures are short-term reference pictures.

The CU is not coded using affine mode or the SbTMVP merge mode.

CU has more than 64 luma samples.

Both CU height and CU width are larger than or equal to 8 luma samples.

BCW weight index indicates equal weight.

WP is not enabled for the current CU.

CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0, 1, of the two prediction signals are computed by directly calculating the difference between two neighboring samples, i.e., $$\frac{\partial I^{(k)}}{\partial x}(i, j) = \left( \left( I^{(k)}(i+1, j) >> \text{shift1} \right) - \left( I^{(k)}(i-1, j) >> \text{shift1} \right) \right) \quad (2\text{-}19)$$

$$\frac{\partial I^{(k)}}{\partial y}(i, j) = \left( \left( I^{(k)}(i, j+1) >> \text{shift1} \right) - \left( I^{(k)}(i, j-1) >> \text{shift1} \right) \right)$$

where $I^{(k)}(i,j)$ are the sample value at coordinate (i,j) of the prediction signal in list k, k=0, 1, and shift1 is calculated based on the luma bit depth, bitDepth, as shift1=max(6, bitDepth−6). Then, the auto- and cross-correlation of the gradients, $S_1$, $S_2$, $S_3$, $S_5$ and $S_6$, are calculated as $$S_1 = \Sigma_{(i,j)\in\Omega} \text{ Abs}(\psi_x(i, j)), S_3 = \Sigma_{(i,j)\in\Omega} \theta(i, j)\cdot\text{Sign}(\psi_x(i, j)) \quad (2\text{-}20)$$

$$S_2 = \sum_{(i,j)\in\Omega} \psi_x(i, j)\cdot\text{Sign}(\psi_y(i, j))$$

$$S_5 = \Sigma_{(i,j)\in\Omega} \text{ Abs}(\psi_y(i, j)), S_6 = \Sigma_{(i,j)\in\Omega} \theta(i, j)\cdot\text{Sign}(\psi_y(i, j))$$

where $$\psi_x(i, j) = \left( \frac{\partial I^{(1)}}{\partial x}(i, j) + \frac{\partial I^{(0)}}{\partial x}(i, j) \right) >> n_a \quad (2\text{-}21)$$

$$\psi_y(i, j) = \left( \frac{\partial I^{(1)}}{\partial y}(i, j) + \frac{\partial I^{(0)}}{\partial y}(i, j) \right) >> n_a$$

$$\theta(i, j) = \left( I^{(1)}(i, j) >> n_b \right) - \left( I^{(0)}(i, j) >> n_b \right)$$

where $\Omega$ is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0? \text{ clip3}\left(-th'_{BIO}, th'_{BIO}, -\left((S_3 \cdot 2^{n_b-n_a}) >> \lfloor\log_2 S_1\rfloor\right)\right):0 \quad (2\text{-}22)$$

$$v_y = S_5 > 0? \text{ clip3}\left(-th'_{BIO}, th'_{BIO}, \right.$$

$$\left. -\left((S_6 \cdot 2^{n_b-n_a} - \left((v_x S_{2,m}) << n_{S_2} + v_x S_{2,s}\right)/2\right) >> \lfloor\log_2 S_5\rfloor\right):0$$

where $S_{2,m} = S_2 >> n_{S_2}$, $S_{2,s} = S_2 \& (2^{n_{S_2}} - 1)$, $$th'_{BIO} = 2^{max(5,BD-7)}. \lfloor\cdot\rfloor$$

is the floor function, and $n_{S_2}=12$. Based on the motion refinement and the gradients, the following adjustment is calculated for each sample in the 4×4 subblock:

$$b(x, y) = rnd \left( \left( \left( v_x \left( \frac{\partial I^{(1)}(x, y)}{\partial x} - \frac{\partial I^{(0)}(x, y)}{\partial x} \right) + v_y \left( \frac{\partial I^{(1)}(x, y)}{\partial y} - \frac{\partial I^{(0)}(x, y)}{\partial y} \right) + 1 \right) \bigg/ 2 \right) \right)$$ (2–23)

Finally, the BDOF samples of the CU are calculated by adjusting the bi-prediction samples as follows:

$$pred_{BDOF}(x, y) = \left( I^{(0)}(x, y) + I^{(1)}(x, y) + b(x, y) + o_{offset} \right) >> shift$$ (2–24)

These values are selected such that the multipliers in the BDOF process do not exceed 15-bit, and the maximum bit-width of the intermediate parameters in the BDOF process is kept within 32-bit.

Figure 19:
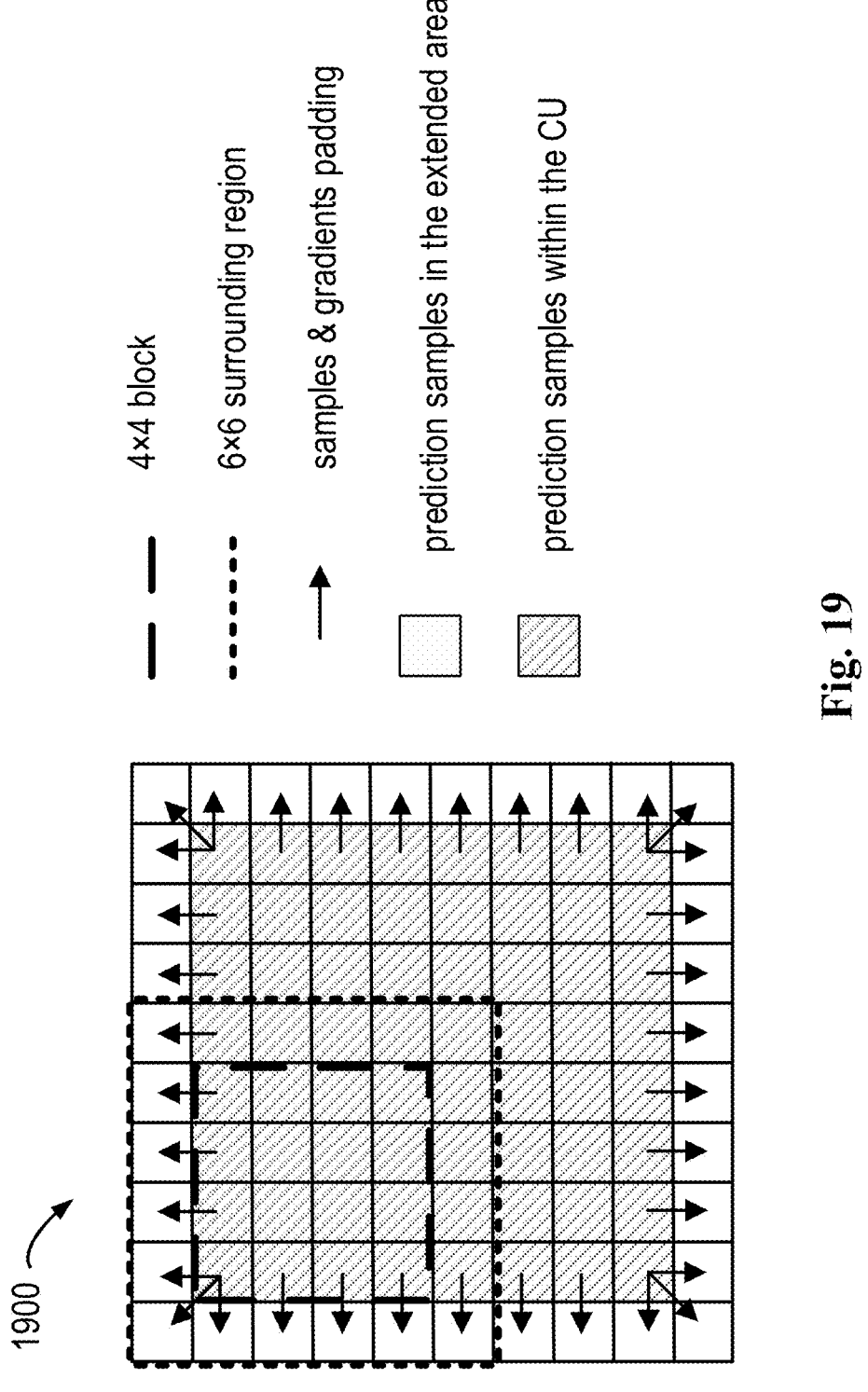
FIG. 19 illustrates an example diagram showing an extended CU region used in BDOF.

In order to derive the gradient values, some prediction samples $I^{(k)}(i,j)$ in list k (k=0, 1) outside of the current CU boundaries need to be generated. FIG. 19 illustrates an example diagram 1900 showing an extended CU region used in BDOF. As depicted in FIG. 19, the BDOF in VVC uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1)), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CUP mode, BDOF is also disabled.

2.1.8. Decoder Side Motion Vector Refinement (DMVR)

Figure 20:
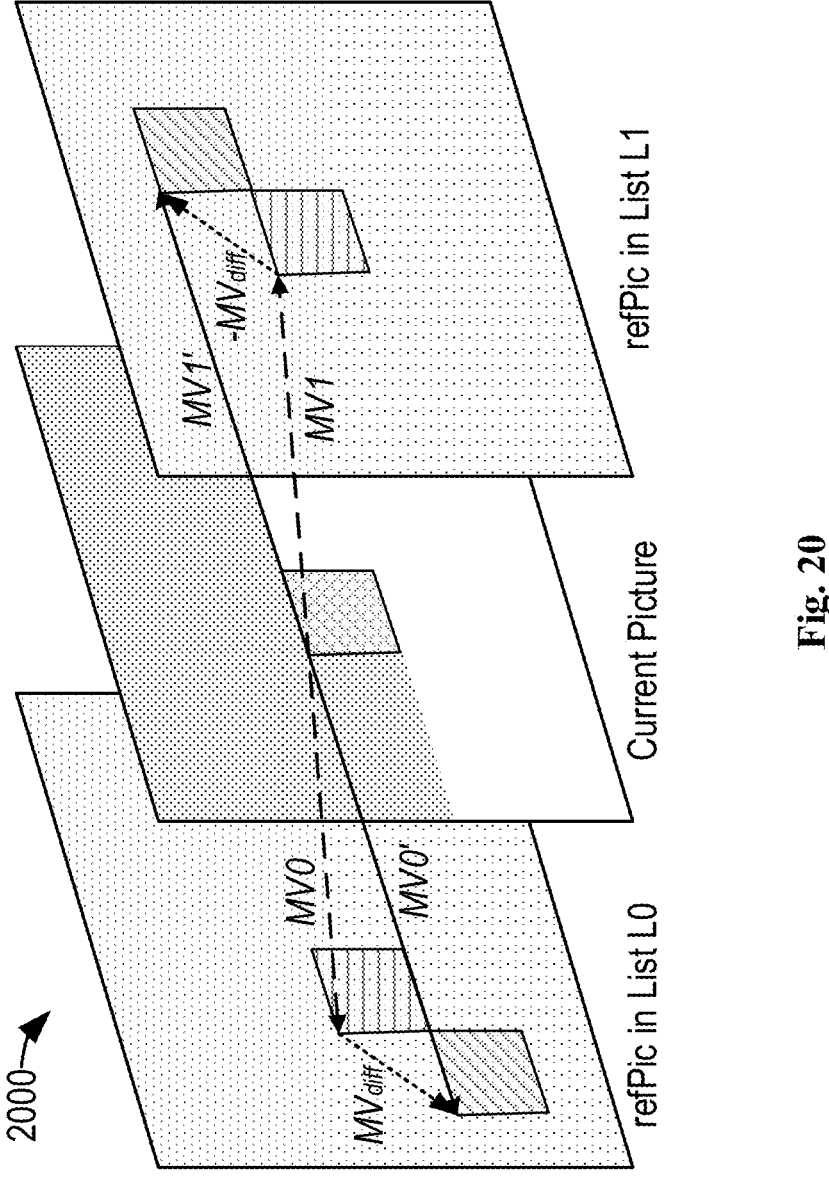
FIG. 20 illustrates an example diagram showing a decoding side motion vector refinement.

In order to increase the accuracy of the MVs of the merge mode, a bilateral-matching based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 20 illustrates an example diagram 2000 showing a decoding side motion vector refinement. As illustrated in FIG. 20, the SAD between the red blocks based on each MV candidate around the initial MV is calculated. The MV candidate with the lowest SAD becomes the refined MV and used to generate the bi-predicted signal.

In VVC, the DMVR can be applied for the CUs which are coded with following modes and features:

CU level merge mode with bi-prediction MV.
    One reference picture is in the past and another reference picture is in the future with respect to the current picture.
    The distances (i.e. POC difference) from two reference pictures to the current picture are same.
    Both reference pictures are short-term reference pictures.
    CU has more than 64 luma samples.
    Both CU height and CU width are larger than or equal to 8 luma samples.
    BCW weight index indicates equal weight.
    WP is not enabled for the current block.
    CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding. The additional features of DMVR are mentioned in the following sub-clauses.

2.1.8.1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + MV\_offset$$ (2–25)
$$MV1' = MV1 - MV\_offset$$ (2–26)

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$W(x, y) = A(x - x_{min})^2 + B(y - y_{min})^2 + C \qquad (2\text{-}27)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))) \qquad (2\text{-}28)$$

$$y_{min} = (E(0, -1) - E(0, 1))/(2((E(0, -1) + E(0, 1) - 2E(0, 0))) \qquad (2\text{-}29)$$

The value of $x_{min}$ and $y_{min}$ are automatically constrained to be between −8 and 8 since all cost values are positive and the smallest value is E(0,0). This corresponds to half peal offset with $\frac{1}{16}$th-pel MV accuracy in VVC. The computed fractional $(x_{min}, y_{min})$ are added to the integer distance refinement MV to get the sub-pixel accurate refinement delta MV.

2.1.8.2. Bilinear-Interpolation and Sample Padding

In VVC, the resolution of the MVs is $\frac{1}{16}$ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.1.8.3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.1.9. Combined Inter and Intra Prediction (CIIP)

Figure 21:
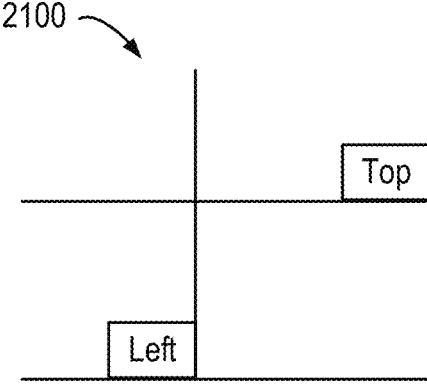
FIG. 21 illustrates an example diagram showing top and left neighboring blocks used in CIIP weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signaled to indicate if the combined inter/intra prediction (CUP) mode is applied to the current CU. As its name indicates, the CUP prediction combines an inter prediction signal with an intra prediction signal. The inter prediction signal in the CUP mode Pinter is derived using the same inter prediction process applied to regular merge mode; and the intra prediction signal $P_{intra}$ is derived following the regular intra prediction process with the planar mode. FIG. 21 illustrates an example diagram 2100 showing top and left neighboring blocks used in CUP weight derivation. Then, the intra and inter prediction signals are combined using weighted averaging, where the weight value is calculated depending on the coding modes of the top and left neighbouring blocks (depicted in FIG. 21) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CUP prediction is formed as follows:

$$P_{CIIP} = ((4 - wt) * P_{inter} + wt * P_{intra} + 2) >> 2 \qquad (2\text{-}30)$$

2.1.10. Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8.

Figure 22:
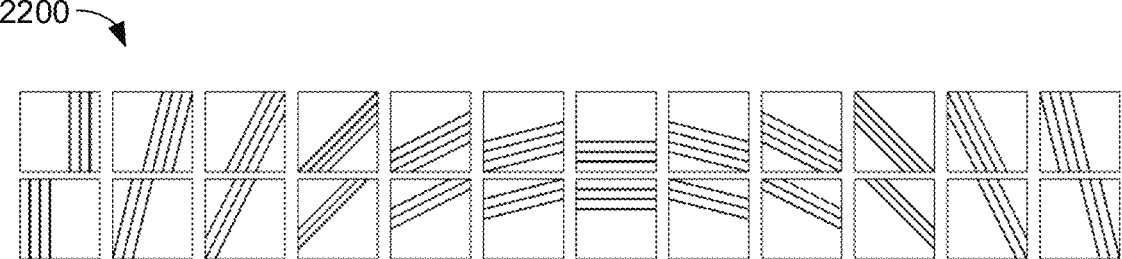
FIG. 22 illustrates an example diagram showing examples of the GPM splits grouped by identical angles.

FIG. 22 illustrates an example diagram 2200 showing examples of the GPM splits grouped by identical angles. When this mode is used, a CU is split into two parts by a geometrically located straight line (FIG. 22). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. Finally, the motion field of a CU predicted using the geometric partition modes is stored.

2.1.10.1. Uni-Prediction Candidate List Construction

Figure 23:
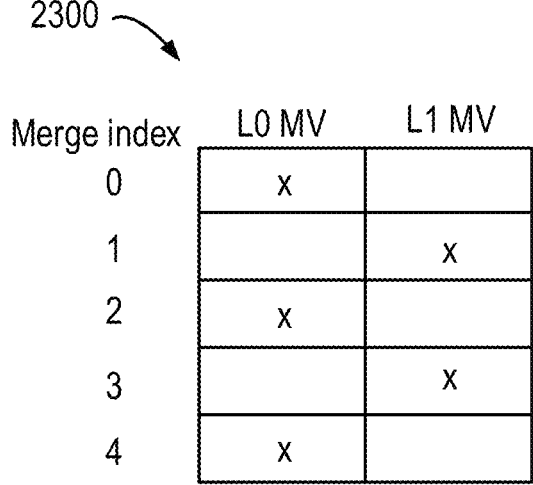
FIG. 23 illustrates an example diagram showing uni-prediction MV selection for geometric partitioning mode.

The uni-prediction candidate list is derived directly from the merge candidate list constructed according to the extended merge prediction process. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. FIG. 23 illustrates an example diagram 2300 showing uni-prediction MV selection for geometric partitioning mode. These motion vectors are marked with "x" in FIG. 23. In case a corresponding LX motion vector of the n-the extended merge candidate does not exist, the L(1−X) motion vector of the same candidate is used instead as the uni-prediction motion vector for geometric partitioning mode.

2.1.10.2. Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x,y) to the partition edge are derived as:

$$d(x, y) = (2x + 1 - w)\cos(\varphi_i) + (2y + 1 - h)\sin(\varphi_i) - \rho_j$$

$$\rho_j = \rho_{x,j}\cos(\varphi_i) + \rho_{y,j}\sin(\varphi_i)$$

$$\rho_{x,j} = \begin{cases} 0 & i \% 16 = 8 \text{ or } (i \% 16 \neq 0 \text{ and } h \geq w) \\ \pm(j \times w) >> 2 & \text{otherwise} \end{cases}$$

$$\rho_{y,j} = \begin{cases} \pm(j \times h) >> 2 & i \% 16 = 8 \text{ or } (i \% 16 \neq 0 \text{ and } h \geq w) \\ 0 & \text{otherwise} \end{cases}$$

where i,j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx \ ? \ 32 + d(x, y):32 - d(x, y)$$

$$w_0(x, y) = \frac{\text{Clip3}(0, 8, (wIdxL(x, y) + 4) >> 3)}{8}$$

$$w_1(x, y) = 1 - w_0(x, y)$$

Figure 24:
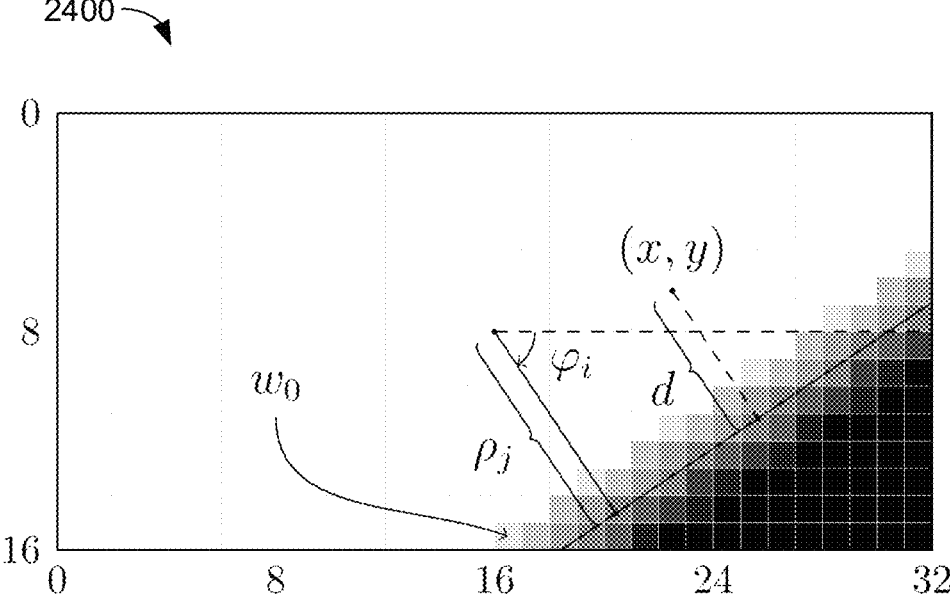
FIG. 24 illustrates an example diagram showing an exemplified generation of a bending weight $w_o$ using geometric partitioning mode.

FIG. 24 illustrates an example diagram 2400 showing an exemplified generation of a bending weight $w_0$ using geometric partitioning mode. The partIdx depends on the angle index i. One example of weigh $w_0$ is illustrated in FIG. 24.

2.1.10.3. Motion Field Storage for Geometric Partitioning Mode

Mv1 from the first part of the geometric partition, Mv2 from the second part of the geometric partition and a combined My of Mv1 and Mv2 are stored in the motion filed of a geometric partitioning mode coded CU.

The stored motion vector type for each individual position in the motion filed are determined as:

$$sType = abs(motionIdx) < 32 \ ? \ 2:(motionIdx \leq 0 \ ? \ (1 - partIdx):partIdx)$$

where motionIdx is equal to d(4x+2, 4y+2). The partIdx depends on the angle index i. If sType is equal to 0 or 1, Mv0 or Mv1 are stored in the corresponding motion field, otherwise if sType is equal to 2, a combined My from Mv0 and Mv2 are stored. The combined My are generated using the following process:

1) If Mv1 and Mv2 are from different reference picture lists (one from L0 and the other from L1), then Mv1 and Mv2 are simply combined to form the bi-prediction motion vectors.

2) Otherwise, if Mv1 and Mv2 are from the same list, only uni-prediction motion Mv2 is stored.

2.1.11. Local Illumination Compensation (LIC)

LIC is an inter prediction technique to model local illumination variation between current block and its prediction block as a function of that between current block template and reference block template. The parameters of the function can be denoted by a scale α and an offset β, which forms a linear equation, that is, α*p[x]+β to compensate illumination changes, where p[x] is a reference sample pointed to by MV at a location x on reference picture. Since α and β can be derived based on current block template and reference block template, no signaling overhead is required for them, except that an LIC flag is signaled for AMVP mode to indicate the use of LIC.

The local illumination compensation is used for uni-prediction inter CUs with the following modifications.

Intra neighbor samples can be used in LIC parameter derivation;

LIC is disabled for blocks with less than 32 luma samples;

For both non-subblock and affine modes, LIC parameter derivation is performed based on the template block samples corresponding to the current CU, instead of partial template block samples corresponding to first top-left 16×16 unit;

Samples of the reference block template are generated by using MC with the block MV without rounding it to integer-pel precision.

2.1.12. Non-Adjacent Spatial Candidate

Figure 25:
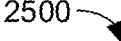
FIG. 25 illustrates an example diagram showing spatial neighboring blocks used to derive the spatial merge candidates.

The non-adjacent spatial merge candidates are inserted after the TMVP in the regular merge candidate list. FIG. 25 illustrates an example diagram 2500 showing spatial neighboring blocks used to derive the spatial merge candidates. The pattern of spatial merge candidates is shown in FIG. 25. The distances between non-adjacent spatial candidates and current coding block are based on the width and height of current coding block. The line buffer restriction is not applied.

2.1.13. Template Matching (TM)

Figure 26:
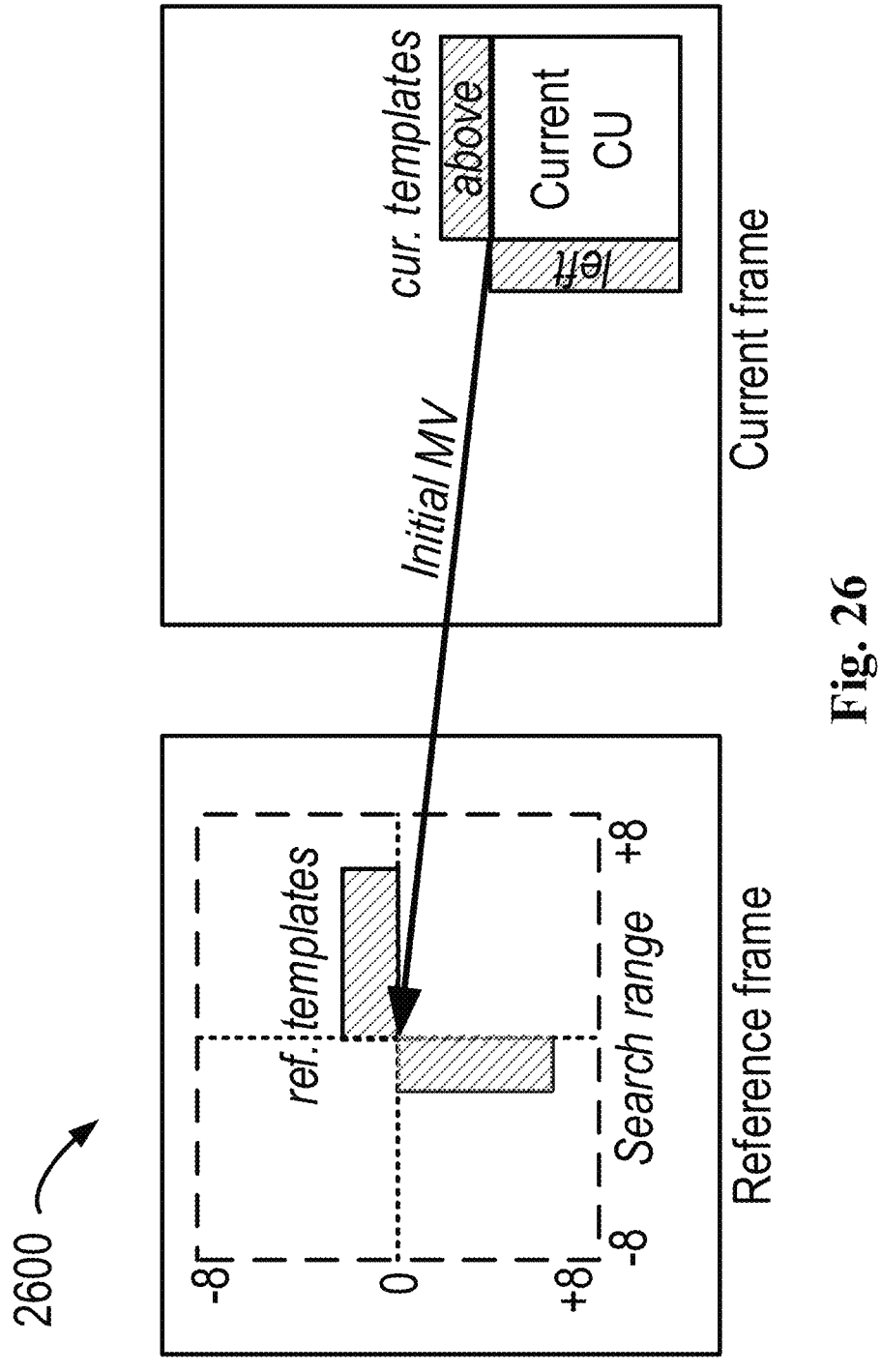
FIG. 26 illustrates an example diagram showing template matching performs on a search area around initial MV.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. FIG. 26 illustrates an example diagram 2600 showing template matching performs on a search area around initial MV. As illustrated in FIG. 26, a better MV is searched around the initial motion of the current CU within a [−8, +8]-pel search range. The template matching method is used with the following modifications: search step size is determined based on AMVR mode and TM can be cascaded with bilateral matching process in merge modes.

In AMVP mode, an MVP candidate is determined based on template matching error to select the one which reaches the minimum difference between the current block template and the reference block template, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 3. This search process ensures that the MVP candidate still keeps the same MV precision as indicated by the AMVR mode after TM process.

TABLE 3

Search patterns of AMVR and merge mode with AMVR.

| Search pattern | AMVR mode | | | | Merge mode | |
| | 4-pel | Full-pel | Half-pel | Quarter-pel | AltIF = 0 | AltIF = 1 |
|---|---|---|---|---|---|---|
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 3 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

2.1.14. Multi-Pass Decoder-Side Motion Vector Refinement (mpDMVR)

A multi-pass decoder-side motion vector refinement is applied. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

2.1.14.1. First Pass—Block Based Bilateral Matching MV Refinement

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$MV0\_pass1 = MV0 + deltaMV$$

$$MV1\_pass1 = MV1 - deltaMV$$

2.1.14.2. Second Pass—Subblock Based Bilateral Matching MV Refinement

In the second pass, a refined MV is derived by applying BM to a 16×16 grid subblock. For each subblock, a refined MV is searched around the two MVs (MV0_pass1 and MVL_pass1), obtained on the first pass, in the reference picture list L0 and L1. The refined MVs (MV0_pass2 (sbIdx2) and MVL_pass2(sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 27:
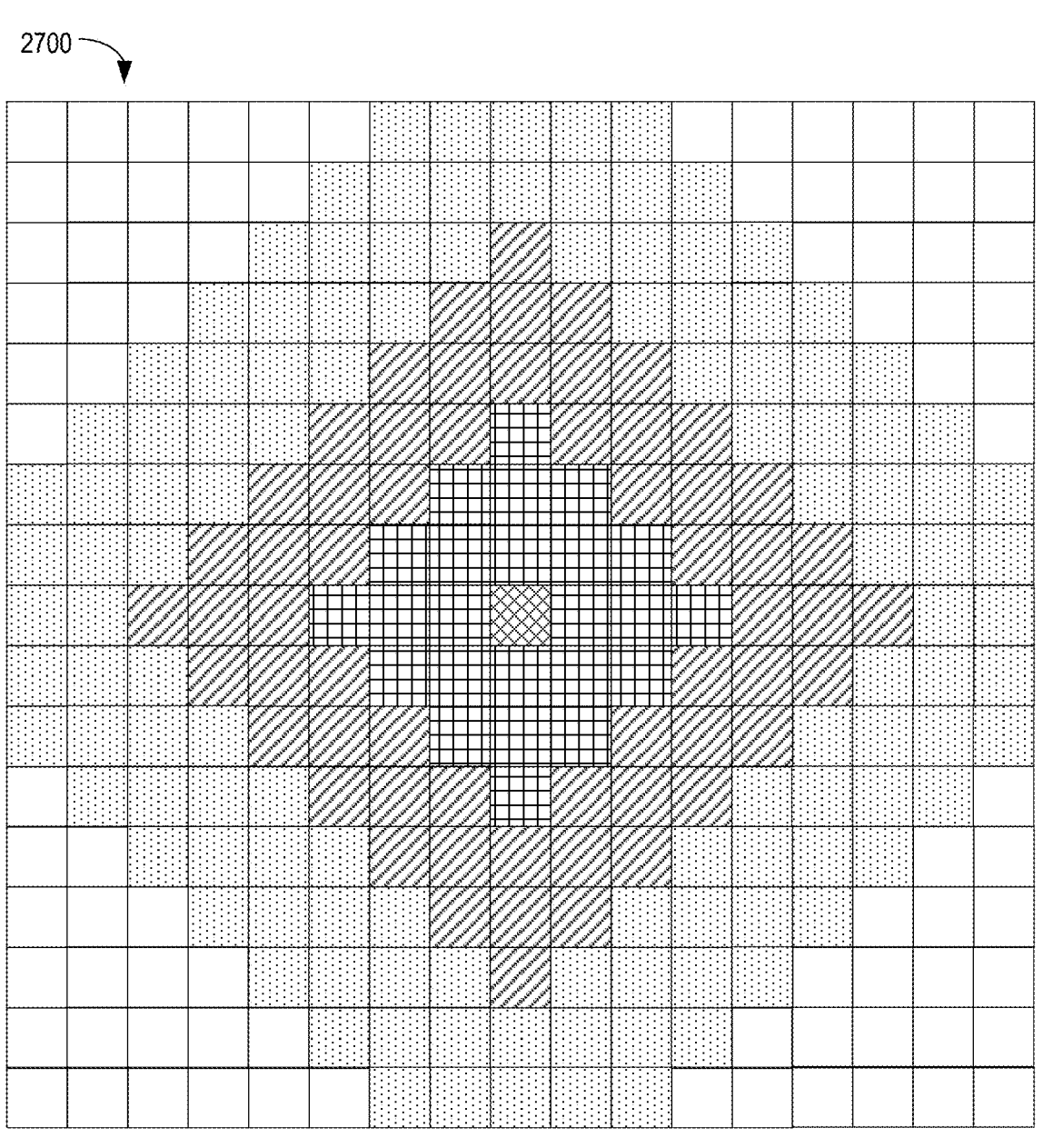
FIG. 27 illustrates an example diagram showing diamond regions in the search area.

The bilateral matching cost is calculated by applying a cost factor to the SATD cost between two reference subblocks, as: bilCost=satdCost*costFactor. FIG. 27 illustrates an example diagram 2700 showing diamond regions in the search area. The search area (2*sHor+1)*(2*sVer+1) is divided up to 5 diamond shape search regions shown on FIG. 27. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined. The existing VVC DMVR fractional sample refinement is further applied to derive the final deltaMV(sbIdx2). The refined MVs at second pass is then derived as:

$$MV0\_pass2(sbIdx2) = MV0\_pass1 + deltaMV(sbIdx2)$$

$$MV1\_pass2(sbIdx2) = MV1\_pass1 - deltaMV(sbIdx2)$$

2.1.14.3. Third Pass—Subblock Based Bi-Directional Optical Flow MV Refinement

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to $\frac{1}{16}$ sample precision and clipped between −32 and 32.

The refined MVs (MV0_pass3(sbIdx3) and MVL_pass3 (sbIdx3)) at third pass are derived as:

$$MV0\_pass3(sbIdx3) = MV0\_pass2(sbIdx2) + bioMV$$

$$MV1\_pass3(sbIdx3) = MV0\_pass2(sbIdx2) - bioMV$$

2.1.15. OBMC

When OBMC is applied, top and left boundary pixels of a CU are refined using neighboring block's motion information with a weighted prediction.

Conditions of not applying OBMC are as follows:
When OBMC is disabled at SPS level,
When current block has intra mode or IBC mode,
When current block applies LIC,
When current luma block area is smaller or equal to 32.

A subblock-boundary OBMC is performed by applying the same blending to the top, left, bottom, and right subblock boundary pixels using neighboring subblocks' motion information. It is enabled for the subblock based coding tools:
Affine AMVP modes;
Affine merge modes and subblock-based temporal motion vector prediction (SbTMVP);
Subblock-based bilateral matching.

2.1.16. Sample-Based BDOF

In the sample-based BDOF, instead of deriving motion refinement (Vx, Vy) on a block basis, it is performed per sample.

The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

2.1.17. Interpolation

Figure 28:
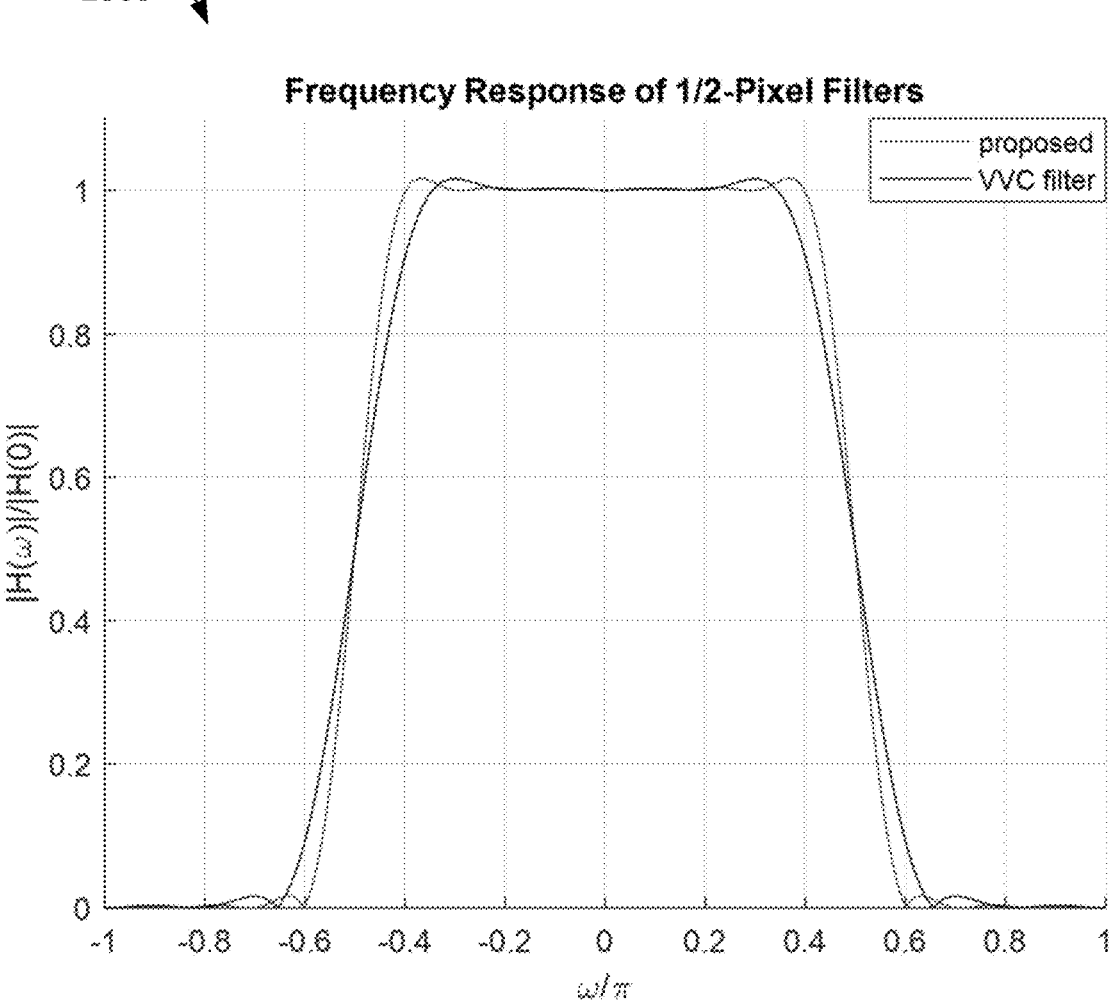
FIG. 28 illustrates an example diagram showing frequency responses of the interpolation filter and the VVC interpolation filter at half-pel phase.

The κ-tap interpolation filter used in VVC is replaced with a 12-tap filter. The interpolation filter is derived from the sinc function of which the frequency response is cut off at Nyquist frequency, and cropped by a cosine window function. Table 4 gives the filter coefficients of all 16 phases. FIG. 28 illustrates an example diagram 2800 showing frequency responses of the interpolation filter and the VVC interpolation filter at half-pel phase. FIG. 28 compares the frequency responses of the interpolation filters with the VVC interpolation filter, all at half-pel phase.

TABLE 4

Filter coefficients of the 12-tap interpolation filter

| | | | | | | | | | | | | |
|---|---|---|---|---|---|---|---|---|---|---|---|---|
| $\frac{1}{16}$ | −1 | 2 | −3 | 6 | −14 | 254 | 16 | −7 | 4 | −2 | 1 | 0 |
| $\frac{2}{16}$ | −1 | 3 | −7 | 12 | −26 | 249 | 35 | −15 | 8 | −4 | 2 | 0 |
| $\frac{3}{16}$ | −2 | 5 | −9 | 17 | −36 | 241 | 54 | −22 | 12 | −6 | 3 | −1 |
| $\frac{4}{16}$ | −2 | 5 | −11 | 21 | −43 | 230 | 75 | −29 | 15 | −8 | 4 | −1 |
| $\frac{5}{16}$ | −2 | 6 | −13 | 24 | −48 | 216 | 97 | −36 | 19 | −10 | 4 | −1 |
| $\frac{6}{16}$ | −2 | 7 | −14 | 25 | −51 | 200 | 119 | −42 | 22 | −12 | 5 | −1 |
| $\frac{7}{16}$ | −2 | 7 | −14 | 26 | −51 | 181 | 140 | −46 | 24 | −13 | 6 | −2 |
| $\frac{8}{16}$ | −2 | 6 | −13 | 25 | −50 | 162 | 162 | −50 | 25 | −13 | 6 | −2 |
| $\frac{9}{16}$ | −2 | 6 | −13 | 24 | −46 | 140 | 181 | −51 | 26 | −14 | 7 | −2 |
| $\frac{10}{16}$ | −1 | 5 | −12 | 22 | −42 | 119 | 200 | −51 | 25 | −14 | 7 | −2 |
| $\frac{11}{16}$ | −1 | 4 | −10 | 19 | −36 | 97 | 216 | −48 | 24 | −13 | 6 | −2 |
| $\frac{12}{16}$ | −1 | 4 | −8 | 15 | −29 | 75 | 230 | −43 | 21 | −11 | 5 | −2 |
| $\frac{13}{16}$ | −1 | 3 | −6 | 12 | −22 | 54 | 241 | −36 | 17 | −9 | 5 | −2 |
| $\frac{14}{16}$ | 0 | 2 | −4 | 8 | −15 | 35 | 249 | −26 | 12 | −7 | 3 | −1 |
| $\frac{15}{16}$ | 0 | 1 | −2 | 4 | −7 | 16 | 254 | −14 | 6 | −3 | 2 | −1 |

2.1.18. Multi-Hypothesis Prediction (MHP)

In the multi-hypothesis inter prediction mode, one or more additional motion-compensated prediction signals are signaled, in addition to the conventional bi prediction signal. The resulting overall prediction signal is obtained by sample-wise weighted superposition. With the bi prediction signal $p_{bi}$ and the first additional inter prediction signal/hypothesis $h_3$, the resulting prediction signal $p_3$ is obtained as follows:

$$p_3 = (1 - \alpha)p_{bi} + \alpha h_3$$

The weighting factor $\alpha$ is specified by the new syntax element add_hyp_weight_idx, according to the following mapping:

| add_hyp_weight_idx | $\alpha$ |
| --- | --- |
| 0 | $\frac{1}{4}$ |
| 1 | $-\frac{1}{8}$ |

Analogously to above, more than one additional prediction signal can be used. The resulting overall prediction signal is accumulated iteratively with each additional prediction signal.

$$p_{n+1} = (1 - \alpha_{n+1})p_n + \alpha_{n+1}h_{n+1}$$

The resulting overall prediction signal is obtained as the last $p_n$ (i.e., the $p_n$ having the largest index n). Within this EE, up to two additional prediction signals can be used (i.e., n is limited to 2). The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode.

Combination of MHP and BDOF is possible, however the BDOF is only applied to the bi-prediction signal part of the prediction signal (i.e., the ordinary first two hypotheses).

2.1.19. Adaptive Reordering of Merge Candidates with Template Matching (ARMC-TM)

The merge candidates are adaptively reordered with template matching (TM). The reordering method is applied to regular merge mode, template matching (TM) merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered.

The template matching cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 29:
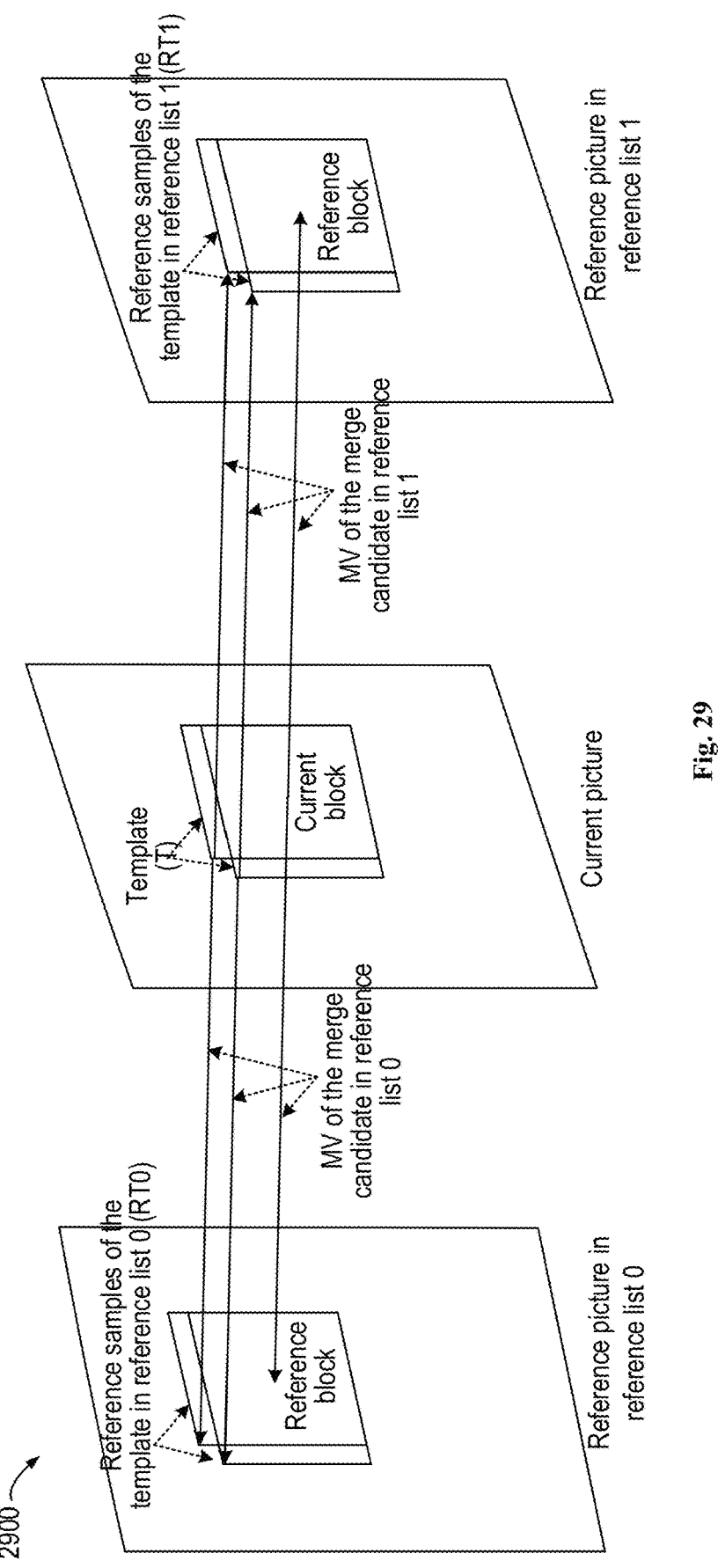
FIG. 29 illustrates an example diagram showing template and reference samples of the template in reference pictures.
Figure 30:
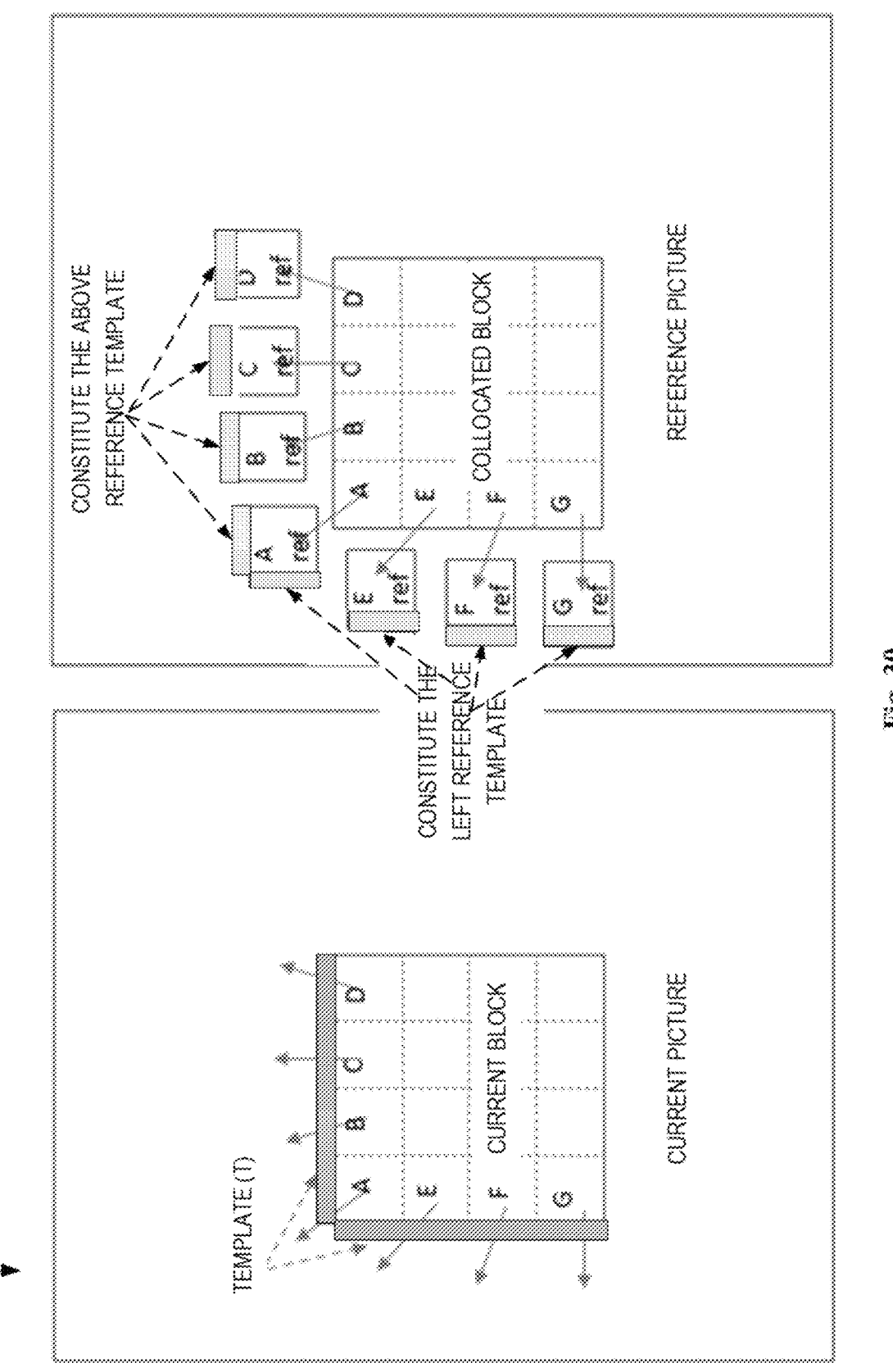
FIG. 30 illustrates an example diagram showing template and reference samples of the template for block with sub-block motion using the motion information of the subblocks of the current block.

FIG. 29 illustrates an example diagram 2900 showing template and reference samples of the template in reference pictures. When a merge candidate utilizes bi-directional prediction, the reference samples of the template of the merge candidate are also generated by bi-prediction as shown in FIG. 29. FIG. 30 illustrates an example diagram 3000 showing template and reference samples of the template for block with sub-block motion using the motion information of the subblocks of the current block. For subblock-based merge candidates with subblock size equal to Wsub×Hsub, the above template comprises several sub-templates with the size of Wsub×1, and the left template comprises several sub-templates with the size of 1×Hsub. As shown in FIG. 30, the motion information of the subblocks in the first row and the first column of current block is used to derive the reference samples of each sub-template.

2.1.20. Geometric Partitioning Mode (GPM) with Merge Motion Vector Differences (MMVD)

GPM in VVC is extended by applying motion vector refinement on top of the existing GPM uni-directional MVs. A flag is first signaled for a GPM CU, to specify whether this mode is used. If the mode is used, each geometric partition of a GPM CU can further decide whether to signal MVD or not. If MVD is signaled for a geometric partition, after a GPM merge candidate is selected, the motion of the partition is further refined by the signaled MVDs information. All other procedures are kept the same as in GPM.

The MVD is signaled as a pair of distance and direction, similar as in MMVD. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD). In addition, when pic_fpel_mmvd_enabled_flag is equal to 1, the MVD is left shifted by 2 as in MMVD.

2.1.21. Geometric Partitioning Mode (GPM) with Template Matching (TM)

Template matching is applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 5. The motion is then refined by minimizing the difference between the current template and the template in the reference picture using the same search pattern of merge mode with half-pel interpolation filter disabled.

TABLE 5

Template for the 1st and 2nd geometric partitions, where A represents using above samples, L represents using left samples, and L + A represents using both left and above samples.

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |

| Partition angle | 16 | 18 | 19 | 20 | 21 | 24 | 27 | 28 | 29 | 30 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |

A GPM candidate list is constructed as follows:

1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.
2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.
3. Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

2.1.22. GPM with Inter and Intra Prediction (GPM Inter-Intra)

With the GPM inter-intra, pre-defined intra prediction modes against geometric partitioning line can be selected in addition to merge candidates for each non-rectangular split region in the GPM-applied CU. In the proposed method, whether intra or inter prediction mode is determined for each GPM-separated region with a flag from the encoder. When the inter prediction mode, a uni-prediction signal is generated by MVs from the merge candidate list. On the other hand, when the intra prediction mode, a uni-prediction signal is generated from the neighboring pixels for the intra prediction mode specified by an index from the encoder. The variation of the possible intra prediction modes is restricted by the geometric shapes. Finally, the two uni-prediction signals are blended with the same way of ordinary GPM.

2.1.23. Adaptive Decoder Side Motion Vector Refinement (Adaptive DMVR)

Adaptive decoder side motion vector refinement method consists of the two new merge modes introduced to refine MV only in one direction, either L0 or L1, of the bi prediction for the merge candidates that meet the DMVR conditions. The multi-pass DMVR process is applied for the selected merge candidate to refine the motion vectors, however either MVD0 or MVD1 is set to zero in the 1st pass (i.e. PU level) DMVR.

Like the regular merge mode, merge candidates for the proposed merge modes are derived from the spatial neighboring coded blocks, TMVPs, non-adjacent blocks, HMVPs, and pair-wise candidate. The difference is that only those meet DMVR conditions are added into the candidate list. The same merge candidate list is used by the two proposed merge modes and merge index is coded as in regular merge mode.

2.1.24. Bilateral Matching AMVP-MERGE Mode (AMVP-MERGE)

In the AMVP-merge mode, the bi-directional predictor is composed of an AMVP predictor in one direction and a merge predictor in the other direction.

AMVP part of the proposed mode is signaled as a regular uni-directional AMVP, i.e. reference index and MVD are signaled, and it has a derived MVP index if template matching is used (TM_AMVP) or MVP index is signaled when template matching is disabled. Merge index is not signalled, and merge predictor is selected from the candidate list with smallest template or bilateral matching cost. When the selected merge predictor and the AMVP predictor satisfy DMVR condition, which is there is at least one reference picture from the past and one reference picture from the future relatively to the current picture and the distances from two reference pictures to the current picture are the same, the bilateral matching MV refinement is applied for the merge MV candidate and AMVP MVP as a starting point. Otherwise, if template matching functionality is enabled, template matching MV refinement is applied to the merge predictor or the AMVP predictor which has a higher template matching cost.

The third pass which is 8×8 sub-PU BDOF refinement of the multi-pass DMVR is enabled to AMVP-merge mode coded block.

3. Decoder Side MHP Data Derivation

1. In one example, a piece of prediction data (e.g., coding information such as prediction index, prediction direction, reference index, motion vectors, etc) of a video unit (e.g., PU/CU) may be implicitly derived (rather than signaling in the bitstream) based on coded information.
   a. For example, the implicit derivation/determination method may be based on decoder side template matching, which takes a first template in the current picture and a second template in the reference picture into account.

i. For example, the first template in the current picture is constructed from neighboring samples adjacent to the current video unit.

ii. For example, a cost (such as SAD, SATD, SSE) between the two templates may be used as a criterion to fulfill the implicit derivation process.

b. For example, the implicit derivation/determination method may be based on decoder side bilateral matching, which takes a first reference unit in the first reference picture and a second reference unit in the second reference picture into account.

i. For example, a cost (such as SAD, SATD, SSE) between the two reference units may be used as a criterion to fulfill the implicit derivation process.

c. In one example, a piece of AMVP prediction data may be implicitly derived based on coded information.

i. For example, the AMVP prediction data may refer to a normal AMVP prediction, or a AMVP based base hypothesis, or an AMVP based additional hypothesis.

ii. For example, predictor/candidate index (such as AMVP index) of an AMVP based prediction/hypothesis may be implicitly derived based on coded information.

1. For example, a template may be firstly constructed for each possible AMVP predictor/candidate, and then a template matching cost may be calculated (between the template of current video unit and the template of the predictor) for each AMVP predictor/candidate. Finally, the predictor with minimum distortion may be determined as the implicitly derived predictor/candidate.

iii. For example, reference index (such as AMVP reference index) of a hypothesis may be implicitly derived based on coded information.

1. For example, distortions/costs may be calculated from different reference pictures—based on neighboring samples coded prior to the current video unit, or reference samples in the reference pictures—then the reference index with minimum cost may be determined.

d. In one example, a piece of MERGE prediction data may be implicitly derived based on coded information.

i. For example, the MERGE prediction data may refer to a normal MERGE prediction, or a variant MERGE prediction (such as GEO, CIIP, Affine Merge, Subblock Merge, SbTMVP, MMVD, TM merge, etc), or a MERGE based base hypothesis, or an MERGE based additional hypothesis.

ii. For example, predictor/candidate index (such as Merge index) of a Merge based prediction/hypothesis may be implicitly derived based on coded information.

1. For example, a template may be firstly constructed for each possible Merge predictor/candidate, and then a template matching cost may be calculated (between the template of current video unit and the template of the predictor) for each Merge predictor/candidate. Finally, the predictor with minimum distortion may be determined as the implicitly derived predictor/candidate.

e. In one example, a piece of multiple hypothesis data may be implicitly derived based on coded information.

i. For example, the hypothesis may be an additional hypothesis, or a base hypothesis.

ii. For example, the multiple hypothesis data may refer to coding information of an additional hypothesis.

iii. For example, the multiple hypothesis data may refer to coding information of a base hypothesis.

iv. For example, weight index/value of a hypothesis may be implicitly derived based on coded information.

1. For example, the coded information may refer to mode information or sample values of neighboring coded video units.

v. For example, how to predict an additional hypothesis may be implicitly derived.

1. For example, whether an additional hypothesis is coded based on AMVP or Merge may be implicitly determined (rather than signaling in the bitstream) based on coded information.

vi. In one example, whether to use the implicitly derivation method may be signaled.

1. Alternatively, whether to use the implicitly derivation method may depend on coding information such as block dimensions and/or coding modes.

2. In one example, prediction of a hypothesis may be generated based on virtual constructed motion data, which is not identical to any motion data in the original MHP candidate lists.

a. For example, prediction of an additional hypothesis may be generated based on virtual constructed motion data.

b. For example, the virtual constructed motion may be based on an AMVP-MERGE candidate list.

i. For example, the AMVP-MERGE candidate list may be generated based on at least one AMVP motion candidate information and at least one MERGE motion candidate information.

ii. For example, the AMVP-MERGE candidate list may be reordered.

iii. For example, the motion candidates in the AMVP-MERGE motion candidate list may be refined.

c. For example, the virtual constructed motion may be based on a bi-directional virtual motion candidate.

i. For example, the bi-directional virtual motion candidate may be generated based on a certain AMVP candidate list.

ii. For example, the bi-directional virtual motion candidate may be generated based on a certain MERGE candidate list, such as regular merge candidate list, or MMVD candidate list, or TM merge list, or GEO merge list, or CIIP merge list, or subblock merge list, etc.

iii. For example, the bi-directional virtual motion candidate may be generated based on a reordered motion candidate list.

iv. For example, the bi-directional virtual motion candidate may be further refined.

d. For example, the virtual constructed motion may be based on a uni-directional virtual motion candidate.

i. For example, the uni-directional virtual motion candidate may be generated based on a certain AMVP candidate list.

ii. For example, the uni-directional virtual motion candidate may be generated based on a certain MERGE candidate list, such as regular merge candidate list, or MMVD candidate list, or TM merge list, or GEO merge list, or CIIP merge list, or subblock merge list, etc.

iii. For example, the uni-directional virtual motion candidate may be generated based on a reordered motion candidate list.

iv. For example, the uni-directional virtual motion candidate may be further refined.

e. For example, prediction of a base hypothesis may be generated based on virtual constructed motion data.

i. For example, an AMVP-MERGE coded block may be perceived as a base hypothesis, and at least one additional hypothesis may be applied to it. Finally, the final prediction of the AMVP-MERGE coded block is generated by blending the base hypothesis and additional hypotheses together.

3. In one example, bi-predicted and/or uni-predicted additional hypothesis may be allowed for a multiple hypothesis prediction unit.

a. For example, at most M (such as M=1) bi-directional coded additional hypothesis is allowed for a multiple hypothesis prediction unit.

i. For example, the bi-directional hypothesis may be generated based on a virtual generated prediction list (such as AMVP-MERGE list).

ii. For example, the bi-directional hypothesis may be generated based on a bi-directional candidate from a certain merge list.

iii. For example, the bi-directional hypothesis may be generated based on a bi-directional candidate from a certain AMVP list.

b. For example, at most N (such as M=2) uni-directional coded additional hypotheses are allowed for a multiple hypothesis prediction unit.

c. For example, both uni-predicted additional hypothesis and bi-predicted additional hypothesis may be allowed for a multiple hypothesis prediction unit.

d. For example, only bi-predicted additional hypothesis may be allowed for a multiple hypothesis prediction unit.

e. For example, only uni-predicted additional hypothesis may be allowed for a multiple hypothesis prediction unit.

4. Problems

There are several issues in the existing video coding techniques, which would be further improved for higher coding gain.

1. In ECM-3.0, regular AMVP and affine AMVP candidate list may be used to generate an MHP additional hypothesis, however, the affine AMVP candidate list does not include non-adjacent spatial candidates, and TM candidates. This may be further optimized.

a. Furthermore, in ECM-3.0, if an additional hypothesis of an MHP coded block is AMVP based, an MVP index is signalled in the bitstream indicating which motion vector predictor is selected to generate the AMVP based additional hypothesis. However, such MVP index may not necessarily be signalled.

b. Furthermore, in ECM-3.0, if an additional hypothesis of an MHP coded block is MERGE based, a merge candidate index is signalled in the bitstream indicating which merge candidate is selected to generate the MERGE based additional hypothesis. However, such merge index may not necessarily be signalled.

2. In ECM-3.0, the LIC may be used to MHP coded blocks only if the base hypothesis of an MHP coded block is uni-prediction merge and the base is LIC coded. However, the LIC for MHP may be further designed.

3. In ECM-3.0, the existing template matching mechanism refines bi-predicted motion vectors without iterative searching, i.e., it firstly removes the high frequency of one direction (L0 or L1) from the current template, then searches the final motion vector from the other direction (L1 or L0) reference pictures, and then terminate. This process may be suboptimal.

4. In ECM-3.0, the existing BDOF (and/or its variants) based prediction refinement may apply to regular merge mode, regular TM merge mode, adaptive DMVR mode, AMVP-MERGE mode, regular AMVP mode, MMVD mode, but it is not allowed to be applied to other coding modes such like SMVD, CIP, MHP, GPM, etc. It may be further improved for higher coding gain.

a. Additionally, the relationship between DMVR and BDOF may be further considered.

5. In ECM-3.0, the existing PROF is applied to refine the 4×4 luma sub-block affine predictions, which may be suboptimal.

5. Detailed Description

The detailed embodiments below should be considered as examples to explain general concepts. These embodiments should not be interpreted in a narrow way. Furthermore, these embodiments can be combined in any manner.

The terms 'video unit' or 'coding unit' or 'block' may represent a coding tree block (CTB), a coding tree unit (CTU), a coding block (CB), a CU, a PU, a TU, a PB, a TB.

In this disclosure, regarding "a block coded with mode N", here "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIP, GPM, GEO, TPM, MMVD, BCW, HMVP, SbTMVP, and etc.).

In the following discussion, the AMVP mode may be regular AMVP mode, affine-AMVP mode, and/or SMVD mode, and/or AMVP-MERGE mode.

It is noted that the terminologies mentioned below are not limited to the specific ones defined in existing standards. Any variance of the coding tool is also applicable.

5.1. To tackle the first problem, the following methods are proposed:

a. For example, affine prediction list generation may be built based on non-adjacent spatial and/or temporal collocated candidates.

i. For example, non-adjacent spatial candidates may be used for Affine coded block/hypothesis, wherein the non-adjacent spatial candidates refer to the motion of non-adjacent neighboring blocks in the current picture.

1. For example, the determination rule to identify the positions of non-adjacent neighboring blocks may be the same as regular merge/AMVP prediction list generation.

2. For example, a new rule may be defined to identify the positions of non-adjacent neighboring blocks for affine (such as affine AMVP, affine merge, affine MMVD, affine MHP) coded blocks.

3. For example, at least one non-adjacent spatial candidate may be included in the affine prediction list.

4. For example, more than one non-adjacent spatial candidate may be included in the affine prediction list.

5. For example, the positions of multiple non-adjacent neighboring blocks may be contiguous/continuous (e.g., one neighbor adjacent to another neighbor).

6. For example, the positions of multiple non-adjacent neighboring blocks may be scattered within the non-adjacent region (e.g., one neighbor not adjacent to another neighbor).

ii. For example, temporal collocated motion candidates may be used for Affine coded block/hypothesis, wherein the temporal collocated candidate refer to motion derived from a temporal collocated coding block in the reference frame.

1. For example, suppose the top-left position of the current block relative to the current picture is (x,y), the top-left position of the temporal collocated block relative to the reference picture may be (x,y) as well.

2. For example, suppose the top-left position of the current block relative to the current picture is (x,y), the top-left position of the temporal collocated block relative to the reference picture may be (x+offset1,y+offset2), wherein offset1 and offset2 are variables (such as predefined by a rule).

3. For example, at least one temporal collocated motion candidate may be included in the affine prediction list.

4. For example, more than one temporal collocated motion candidate may be included in the affine prediction list.

iii. For example, an optimal affine AMVP candidate may be selected based on decoder side methods (such as through TM or DMVR cost).

iv. For example, MVP index may not be signaled for affine AMVP coded blocks (either as a single coding block, or as a hypothesis of an MHP coded block).

v. For example, the claimed affine prediction list (and/or affine candidate) may be used for Affine MERGE coded block.

vi. For example, the claimed affine prediction list (and/or affine candidate) may be used for Affine MMVD coded block.

vii. For example, the claimed affine prediction list (and/or affine candidate) may be used for affine AMVP/MERGE/MMVD coded single block.

viii. For example, the claimed affine prediction list (and/or affine candidate) may be used for affine AMVP/MERGE/MMVD coded MHP hypothesis.

b. For example, which additional hypothesis is used for an MHP coded block may be implicitly derived by a decoder side method.

c. For example, which AMVP based additional hypothesis is used for an MHP coded block may be derived by a TM or DMVR based method.

i. For example, the AMVP based additional hypothesis may be regular AMVP and/or affined AMVP.

ii. For example, MVP index of an AMVP based additional hypothesis may not be signaled in the bitstream.

iii. For example, an optimal MVP candidate may be derived based on TM cost (e.g., by comparing the difference between the template identified by the available MVP candidates and the template of neighboring samples of current block).

iv. For example, an optimal MVP candidate may be derived based on DMVR cost (e.g., by comparing the difference between the prediction block identified by the available MVP candidates and the prediction block identified by the base hypothesis).

d. For example, which MERGE based additional hypothesis is used for an MHP coded block may be derived by a TM or DMVR based method.

i. For example, candidate index of a merge based additional hypothesis may not be signaled in the bitstream.

ii. For example, an optimal merge candidate may be derived based on TM cost (e.g., by comparing the difference between the template identified by the available merge candidates and the template of neighboring samples of current block).

iii. For example, an optimal merge candidate may be derived based on DMVR cost (e.g., by comparing the difference between the prediction block identified by the available merge candidates and the prediction block identified by the base hypothesis).

5.2. To Tackle the Second Problem, the Following Methods are Proposed:

a. For example, LIC may be used to an MHP base hypothesis but not used to MHP additional hypothesis.

b. For example, LIC may be used to an MHP additional hypothesis but not used to MHP base hypothesis.

c. For example, LIC may be used to one additional hypothesis but not used to another MHP base hypothesis.

d. For example, LIC may be used to all MHP hypotheses including base hypothesis and all additional hypotheses.

e. For example, LIC may be used to MHP coded block (base and/or additional hypothesis) even if the MHP base hypothesis is AMVP coded (either uni-prediction or bi-prediction).

f. For example, LIC may be used to MHP coded block (base and/or additional hypothesis) even if the MHP base hypothesis is merge coded bi-prediction.

g. For example, whether to use LIC to an MHP coded block may be signalled in the bitstream.

i. For example, it may be conditionally signaled based on the coding information such as the prediction mode, inter prediction direction, block dimensions, etc.

ii. For example, whether to use LIC to an MHP base hypothesis may be signaled, and the usage of MHP additional hypothesis may be inferred to be the same as the base hypothesis.

iii. For example, whether to use LIC to an MHP base hypothesis may be inherited from a pre-defined rule, and the usage of MHP additional hypothesis may be signaled in the bitstream.

iv. For example, whether to use LIC for MHP base hypothesis and whether to use LIC for MHP additional hypothesis may be signaled independently.

v. Alternatively, whether to use LIC for MHP base hypothesis and additional hypothesis may be signaled coherently, such that LIC may or may not be applied to all MHP hypotheses.

5.3. To Tackle the Third Problem, the Following Methods are Proposed:

a. For example, more than one round of search (i.e., iterative search) may be applied for the template matching based bi-direction motion refinement.

i. In one example, suppose tplCur, tplRefD, tplRef1 represent the template in the current picture, the template in the L0 reference picture, the template in the L1 reference picture, respectively. An iterative search process may be conducting a first search in one direction such as minimizing the difference between tplCur and tplRefD, followed by a second search in the other direction such as minimizing the difference between tplCur and tplRef1.

ii. In one example, the outcome of a template matching based bi-direction motion refinement may be the original mv0 (before template matching refinement) plus delta0, and the original mv1 (before template matching refinement) plus delta1, wherein delta0 and delta1 may be different.

iii. In one example, in one searching round, the MV under consideration (denoted as rMV0) of a first reference picture such as in reference list 0 is fixed, and the MV (denoted as rMV1) of a second reference picture such as in reference list 1 is further refined.

1) In one example, suppose a reference template sample referred by rMV0 is denoted by sT0[k] wherein k stands for a position in the template, an associated reference template sample referred by rMV1 is denoted by sT1[k] and an associated template sample in the template of the current block is denoted by cT[k], then the cost D[k] for position k may be derived by sT0[k], sT1[k] and cT[k].

a. In one example, $D[k]=|(sT0[k]+sT1[k])/2-cT[k]|$.

b. In one example, $D[k]=|sT0[k]+sT1[k]-2\times cT[k]|$.

c. In one example, $H[k]=2\times cT[k]-sT0[k]$ may be pre-calculated and stored when rMV1 is under searching but rMV0 is fixed. $D[k]=|H[k]-sT1[k]|$.

2) In one example, the total cost of the template may be calculated by accumulated D[k] for all valid k-s.

5.4. To Tackle the Fourth Problem, the Following Methods are Proposed:

b. For example, a BDOF (and/or its variants such as sample based BDOF, BDOF with motion vector refinement, etc.) process may be applied to one or more of the following modes.

i. SMVD mode (with and/or without AMVR, with and/or without half-pel interpolation).

ii. Affine AMVP mode, Affine MMVD mode, Affine Merge mode.

iii. CIIP mode (and/or its variants, e.g., regular CIIP, CIIP-PDPC, CUP-TM, etc).

iv. GPM mode (and/or its variants, e.g., regular GPM, GPM-TM, GPM-MMVD, GPM-Inter-Intra, etc).

v. sbTMVP mode.

vi. MHP mode (and/or its variants, e.g., MHP base hypothesis, and/or MHP additional hypothesis, etc).

c. Additionally, furthermore, a BDOF may be applied for prediction sample value refinement.

d. Additionally, furthermore, a BDOF may be applied for subblock based motion vector refinement.

i. For example, the BDOF refined motion field may not be used as motion candidates for further blocks in the current picture.

ii. Alternatively, the BDOF refined motion field may be used as motion candidates for further blocks in the current picture.

e. Additionally, furthermore, a BDOF process may be applied for a video unit which is coded by un-equal weighted prediction.

i. For example, the un-equal weighted prediction may be BCW with unequal weights for the two directional (inter) predictions.

ii. For example, the un-equal weighted prediction may be MHP with unequal weights for blending multiple (inter) hypothesis from different prediction directions.

iii. For example, the un-equal weighted prediction may be GPM with unequal weights for the two directional (inter) predictions from the two GPM partitions.

iv. For example, the un-equal weighted prediction may be CIIP with unequal weights for the inter and intra predictions.

f. Additionally, furthermore, a BDOF process may be cascaded with a second prediction blending process in addition to a first prediction blending process.

i. For example, the first prediction blending process may be the regular bi-prediction averaging process.

ii. For example, the second prediction blending process may be OBMC (e.g., CU/PU based OBMC, and/or subblock based OBMC).

iii. For example, the second prediction blending process may be LIC.

iv. For example, the second prediction blending process may be weighted prediction.

g. Additionally, furthermore, a BDOF process may be adaptively applied to a video unit.

i. For example, whether the BDOF process is applied to the video unit may be signaled (e.g., a syntax element such as a video unit level flag) in the bitstream.

ii. Alternatively, a BDOF process may be always applied to a video unit under certain pre-defined conditions.

1) In one example, if certain pre-defined conditions are met for a video unit, the BDOF process is applied without any syntax signaling.

h. Additionally, furthermore, a BDOF process may be applied to chroma component.

5.5. To Tackle the Fifth Problem, the Following Methods are Proposed:

a. For example, PROF may be applied to refine the M×N luma predictions.

i. For example, M multiplies N is smaller than 16.

ii. For example, M is smaller than 4, and N is smaller than 4.

iii. For example, at least one of M and N is unequal to 4.

iv. For example, the value of M and/or N may be predefined.

v. For example, the value of M and/or N may be adaptively determined by the block shape/dimensions.

1) For example, for a 32×8 block, PROF may be applied for each 8×2 subblocks.

b. For example, a sample-based PROF may be used for a video unit to refine the prediction sample values.

c. For example, a sample-based PROF may be applied for affine prediction mode.

d. For example, the sample-based PROF may generate different refinement delta for every prediction sample.

e. Additionally, furthermore, a PROF process may be applied to chroma component.

General Claims 5.6. Whether to and/or how to apply the disclosed methods above may be signaled at sequence level/group of pictures level/picture level/slice level/tile group level, such as in sequence header/picture header/SPS/VPS/DPS/DCI/PPS/APS/slice header/tile group header.

5.7. Whether to and/or how to apply the disclosed methods above may be signaled at PB/TB/CB/PU/TU/CU/VPDU/CTU/CTU row/slice/tile/sub-picture/other kinds of region contain more than one sample or pixel.

5.8. Whether to and/or how to apply the disclosed methods above may be dependent on coded information, such as block size, colour format, single/dual tree partitioning, colour component, slice/picture type.

Figure 31:
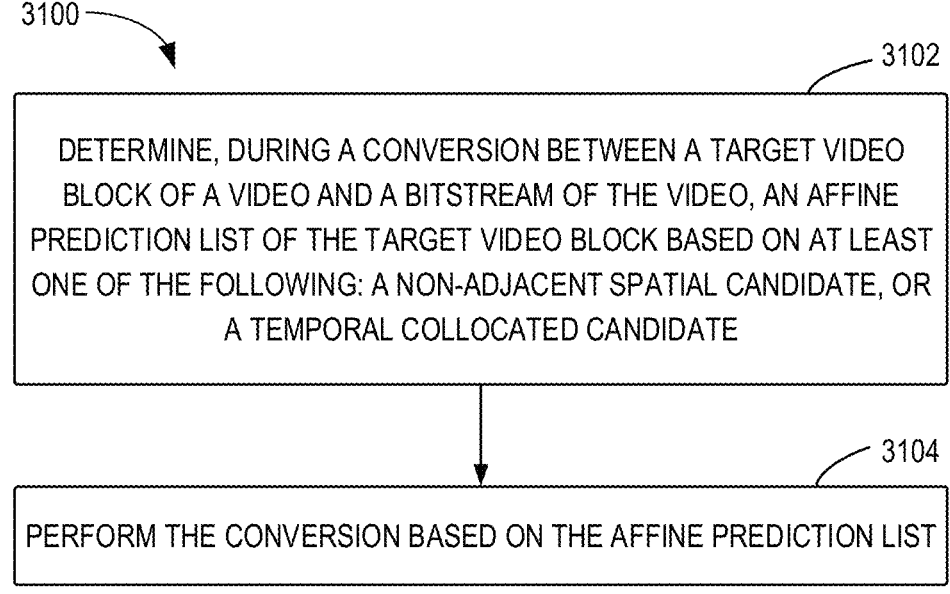
FIG. 31 illustrates a flowchart of a method for video processing in accordance with some embodiments of the present disclosure.

FIG. 31 illustrates a flowchart of a method 3100 for video processing in accordance with some embodiments of the present disclosure. The method 3100 is implemented during a conversion between a target video block of a video and a bitstream of the video. As shown in FIG. 31, at block 3102, an affine prediction list of the target video block is determined based on at least one of the following: a non-adjacent spatial candidate, or a temporal collocated candidate. At block 3104, the conversion is performed based on the affine prediction list. In some embodiments, the conversion between the target video block and the bitstream may include encoding the target video block into the bitstream. Alternatively, or in addition, the conversion may include decoding the target video block from the bitstream.

In this way, the affine prediction list can be determined based on the non-adjacent spatial candidate or the temporal collocated candidate. Compared with the conventional solution, it can advantageously improve the coding effectiveness and coding efficiency.

In some embodiments, the non-adjacent spatial candidate comprises a motion of a non-adjacent neighboring block in a current picture. By way of example, the target video block may comprise one of: an affine coded block or a hypothesis. That is, non-adjacent spatial candidates may be used for affine coded block or hypothesis. The non-adjacent spatial candidates refer to the motion of non-adjacent neighboring blocks in the current picture.

In some embodiments, the method 3100 further comprising determining a position of the non-adjacent neighboring block by using a determination rule for regular merge prediction list generation or for advanced motion vector predication (AMVP) prediction list generation.

Alternatively, or in addition, in some example embodiments, the method 3100 further comprising: determining a rule for determining a position of the non-adjacent neighboring block for an affine coded block; and determining a position of the non-adjacent neighboring block by using the rule.

By way of example, the affine coded block may comprise one of the following: an affine advanced motion vector predication (AMVP) coded block, an affine merge coded block, an affine merge mode with motion vector difference (MMVD) coded block, or an affine multi-hypothesis prediction (MHP) coded block.

In some embodiments, the affine prediction list comprises at least one non-adjacent spatial candidate. Alternatively, or in addition, in some embodiments, the affine prediction list comprises a plurality of non-adjacent spatial candidates.

In some embodiments, positions of a plurality of non-adjacent neighboring blocks of the target video block are contiguous or continuous. For example, a first non-adjacent neighboring block of the plurality of non-adjacent neighboring blocks may be adjacent to a second non-adjacent neighboring block of the plurality of non-adjacent neighboring blocks.

Alternatively, or in addition, in some embodiments, positions of a plurality of non-adjacent neighboring blocks of the target video block are scattered within a non-adjacent region of the target video block. For example, a first non-adjacent neighboring block of the plurality of non-adjacent neighboring blocks may be non-adjacent to a second non-adjacent neighboring block of the plurality of non-adjacent neighboring blocks.

In some embodiments, the temporal collocated candidate comprises a motion determined from a temporal collocated block in a reference frame. By way of example, the target video block may comprise one of: an affine coded block or a hypothesis. In other words, temporal collocated motion candidates may be used for affine coded block or hypothesis. The temporal collocated candidates refer to motion derived from a temporal collocated coding block in the reference frame.

In some embodiments, a first top-left position of the temporal collocated block relative to a reference picture may be the same as a second top-left position of the target video block relative to a current picture.

Alternatively, or in addition, in some embodiments, a first top-left position of the temporal collocated block relative to a reference picture may be different from a second top-left position of the target video block relative to a current picture. By way of example, a difference between the first top-left position and the second top-left position may comprise a first offset in a first direction and a second offset in a second direction. For example, suppose the top-left position of the target video block or the current block relative to the current picture is (x,y), the top-left position of the temporal collocated block relative to the reference picture may be (x+offset1, y+offset2). In some embodiments, the first and second offsets are predefined by a rule. For example, offset1 and offset2 may be predefined by a rule.

In some embodiments, the affine prediction list comprises at least one temporal collocated candidate. Alternatively, or in addition, in some embodiments, the affine prediction list comprises a plurality of temporal collocated candidates.

In some embodiments, the method 3100 further comprising: determining an optimal affine advanced motion vector predication (AMVP) candidate based on a decoder side method. By way of example, the decoder side method may comprise a temporal matching (TM) cost-based method, or a decoder side motion vector refinement (DMVR) cost-based method.

In some embodiments, the method 3100 further comprising: refining a control point motion vector (CPMV) of an affine coded block based on a TM cost or a DMVR cost.

In some embodiments, the method 3100 further comprising: using at least one of: the affine prediction list or an affine candidate of the target video block for an affine merge coded block.

In some embodiments, the method 3100 further comprising: using at least one of: the affine prediction list or an affine candidate of the target video block for an affine merge mode with motion vector difference (MMVD) coded block.

In some embodiments, the method 3100 further comprising: using at least one of: the affine prediction list or an affine candidate of the target video block for one of the following: an affine advanced motion vector predication (AMVP) coded single block, an affine merge coded single block, or an affine merge mode with motion vector difference (MMVD) coded single block.

In some embodiments, the method 3100 further comprising: using at least one of: the affine prediction list or an affine candidate of the target video block for one of the following: an affine advanced motion vector predication (AMVP) multi-hypothesis prediction (MHP) hypothesis, an affine merge MHP hypothesis, or an affine merge mode with motion vector difference (MMVD) MHP hypothesis.

In some embodiments, a motion vector prediction (MVP) index may not be included in the bitstream for an affine advanced motion vector predication (AMVP) coded block. That is, the MVP index may not be signaled in the bitstream.

In some embodiments, the affine AMVP coded block may comprise one of the following: a single coding block, or a hypothesis of a multi-hypothesis prediction (MHP) coded block.

In some embodiments, the method 3100 further comprising: determining an additional hypothesis for a multi-hypothesis prediction (MHP) coded block by a decoder side method.

In some embodiments, an affine advanced motion vector predication (AMVP)-based additional hypothesis for the MHP coded block may be determined by a template matching (TM) cost-based method or a decoder side motion vector refinement (DMVR) cost-based method.

By way of example, the AMVP-based additional hypothesis may comprise at least one of the following: a regular AMVP, or an affine AMVP.

In some embodiments, a motion vector prediction (MVP) index of the AMVP-based additional hypothesis is not included in the bitstream. That is, the MVP index of the AMVP-based additional hypothesis may not be signaled in the bitstream.

In some embodiments, a merge-based additional hypothesis for the MHP coded block may be determined by a template matching (TM) cost-based method or a decoder side motion vector refinement (DMVR) cost-based method.

In some embodiments, a candidate index of the merge-based additional hypothesis is not included in the bitstream. That is, the candidate index of the merge-based additional hypothesis may not be signaled in the bitstream.

In some embodiments, the method 3100 further comprising: determining an optimal merge candidate based on a TM cost.

In some embodiments, the optimal merge candidate may be determining by comparing a difference between a template identified by an available merge candidate and a further template of neighboring samples of the target video block.

In some embodiments, the method 3100 further comprising: determining an optimal merge candidate based on a DMVR cost.

In some embodiments, the optimal merge candidate may be determining by comparing a difference between a prediction block identified by an available merge candidate and a further prediction block identified by the base hypothesis.

In some embodiments, the method 3100 further comprising: determining an optimal motion vector prediction (MVP) candidate of the target video block based on a template matching (TM) cost.

In some embodiments, the optimal MVP candidate may be determined by comparing a difference between a template identified by an available MVP candidate and a further template of neighboring samples of the target video block.

In some embodiments, the method 3100 further comprising: determining an optimal motion vector prediction (MVP) candidate of the target video block based on a decoder side motion vector refinement (DMVR) cost.

In some embodiments, the optimal MVP candidate may be determined by comparing a difference between a prediction block identified by an available MVP candidate and a further prediction block identified by a base hypothesis.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, an affine prediction list of a target video block of the video is determined based on at least one of the following: a non-adjacent spatial candidate, or a temporal collocated candidate. The bitstream is generated based on the affine prediction list.

According to embodiments of the present disclosure, a method for storing a media presentation of a media is proposed. In the method, an affine prediction list of a target video block of the video is determined based on at least one of the following: a non-adjacent spatial candidate, or a temporal collocated candidate. The bitstream is generated based on the affine prediction list. The bitstream is stored in a non-transitory computer-readable recording medium.

FIG. 32 illustrates a flowchart of a method 3200 for video processing in accordance with some embodiments of the present disclosure. The method 3200 is implemented during a conversion between a target video block of a video and a bitstream of the video. As shown in FIG. 32, at block 3202, at least one multi-hypothesis prediction (MHP) hypothesis of the target video block is determined. At block 3204, a local illumination compensation (LIC) is applied to the at least one MHP hypothesis. At block 3206, the conversion is performed based on the applying. In some embodiments, the conversion may include encoding the target video block into the bitstream. Alternatively, or in addition, the conversion may include decoding the target video block from the bitstream.

In this way, the at least one MHP hypothesis can be compensated by the LIC. The coding effectiveness and coding efficiency can be thus improved.

In some embodiments, the target video block comprises a MHP coded block. By way of example, the MHP coded block may comprise at least one of the following: an MHP base hypothesis, or an MHP additional hypothesis.

In some embodiments, the MHP base hypothesis comprises a merge coded bi-prediction. That is, LIC may be used to MHP coded block (base and/or additional hypothesis) even if the MHP base hypothesis is merge coded bi-prediction.

In some embodiments, the MHP base hypothesis comprises an advanced motion vector predication (AMVP) coded uni-prediction or an AMVP coded bi-prediction.

In some embodiments, at block 3404, the LIC may be applied to an MHP base hypothesis instead of an MHP additional hypothesis.

In some embodiments, at block 3404, the LIC may be applied to an MHP additional hypothesis instead of an MHP base hypothesis.

In some embodiments, at block 3404, the LIC may be applied to an additional hypothesis instead of another MHP base hypothesis.

In some embodiments, at block 3404, the LIC may be applied to an MHP base hypothesis and at least one MHP additional hypothesis.

In some embodiments, the method 3200 further comprising: including an indication of applying the LIC to the MHP coded block in the bitstream. In other words, whether to use LIC to an MHP coded block may be signaled in the bitstream.

In some embodiments, the method 3200 further comprising: determining whether to including the indication of applying the LIC in the bitstream based on coding information. By way of example, the coding information may comprise at least one of the following: a prediction mode, an inter prediction direction, or a block dimension.

In some embodiments, the indication may indicate whether to applying the LIC to an MHP base hypothesis.

In some embodiments, a usage of an MHP additional hypothesis is the same as the MHP base hypothesis.

In some embodiments, a first indication indicating whether to applying the LIC to an MHP base hypothesis and a second indication indicating whether to applying the LIC to an MHP additional hypothesis may be included in the bitstream independently.

In some embodiments, a first indication and a second indication may be included coherently in the bitstream. The first indication indicates whether to applying the LIC to an MHP base hypothesis. The second indication indicates whether to applying the LIC to an MHP additional hypothesis.

In some embodiments, the LIC may be applied to a partial or all MHP hypotheses. Alternatively, in some embodiments, the LIC may not be applied to all MHP hypotheses.

In some embodiments, the method 3200 further comprising: determining whether to applying the LIC to an MHP base hypothesis based on a pre-defined rule.

In some embodiments, the method 3200 further comprising: including a usage of an MHP additional hypothesis in the bitstream. That is, the usage of the MHP additional hypothesis may be signaled in the bitstream.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, at least one multi-hypothesis prediction (MHP) hypothesis of a target video block of the video is determined. A local illumination compensation (LIC) is applied to the at least one MHP hypothesis. The bitstream is generated based on the applying.

According to embodiments of the present disclosure, a method for storing a media presentation of a media is proposed. In the method, at least one multi-hypothesis prediction (MHP) hypothesis of a target video block of the video is determined. A local illumination compensation (LIC) is applied to the at least one MHP hypothesis. The bitstream is generated based on the applying. The bitstream is stored in a non-transitory computer-readable recording medium.

FIG. 33 illustrates a flowchart of a method 3300 for video processing in accordance with some embodiments of the present disclosure. The method 3300 is implemented during a conversion between a target video block of a video and a bitstream of the video. As shown in FIG. 33, at block 3302, a motion candidate of the target video block is determined. At block 3304, a plurality of rounds of search for a template matching-based bi-direction motion refinement is performed on the motion candidate. In this way, the motion candidate can be refined by performing a plurality of rounds of search for refinement. The coding effectiveness and coding efficiency can be thus improved.

At block 3306, the conversion is performed based on the performing. In some embodiments, the conversion may include encoding the target video block into the bitstream. Alternatively, or in addition, the conversion may include decoding the target video block from the bitstream.

In some embodiments, the plurality of rounds of search comprises an iterative search.

In some embodiments, at block 3304, a first search in a first direction may be performed to minimizing a first difference between a first template in a current picture and a second template in a first reference picture. In addition, a second search in a second direction may be performed to minimizing a second difference between the first template and a third template in a second reference picture.

In some embodiments, at block 3304, a first adjusted motion vector and a second adjusted motion vector may be obtained by performing the plurality of rounds of search for template matching-based bi-direction motion refinement on the motion candidate. The first adjusted motion vector may be a first offset greater than a first original motion vector. The second adjusted motion vector may be a second offset greater than a second original motion vector. The second offset may be different from the first offset.

In some embodiments, the first and second motion vectors may be determined without a template matching refinement.

In some embodiments, at block 3304, in one of the plurality of rounds of search, a first motion vector of a first reference picture may be determined to be fixed. A second motion vector of a second reference picture may be refined. In some embodiments, the first reference picture may be in a first reference list, and the second reference picture may be in a second reference list.

In some embodiments, the method 3300 further comprising: determining a cost for a given position in a template by using one of the following metrics:

$$D[k] = |(sT0[k] + sT1[k])/2 - cT[k]|,$$

$$D[k] = |sT0[k] + sT1[k] - 2 \times cT[k]|, \text{ or}$$

$$H[k] = 2 \times cT[k] - sT0[k] \text{ and } D[k] = |H[k] - sT1[k]|,$$

wherein D[k] represents the cost for a given position k in the template, sT0[k] represents a reference template sample referred by a first motion vector in the given position k, sT1[k] represents an associated reference template sample referred by a second motion vector in the given position k, cT[k] represents an associated template sample in the template of the target video block in the given position k, and H[k] represents an intermediate result for the given position k.

In some embodiments, H[k] may be pre-calculated and stored. The first motion vector may be fixed and the second motion vector may be under searching.

In some embodiments, the method 3300 further comprising: determining a total cost for the template by accumulating the cost D[k] at each valid position k in the template.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, a motion candidate of a target video block of the video is determined. A plurality of rounds of search for a template matching-based bi-direction motion refinement is performed on the motion candidate. The bitstream is generated based on the performing.

According to embodiments of the present disclosure, a method for storing a media presentation of a media is proposed. In the method, a motion candidate of a target video block of the video is determined. A plurality of rounds of search for a template matching-based bi-direction motion refinement is performed on the motion candidate. The bitstream is generated based on the performing. The bitstream is stored in a non-transitory computer-readable recording medium.

Figure 34:
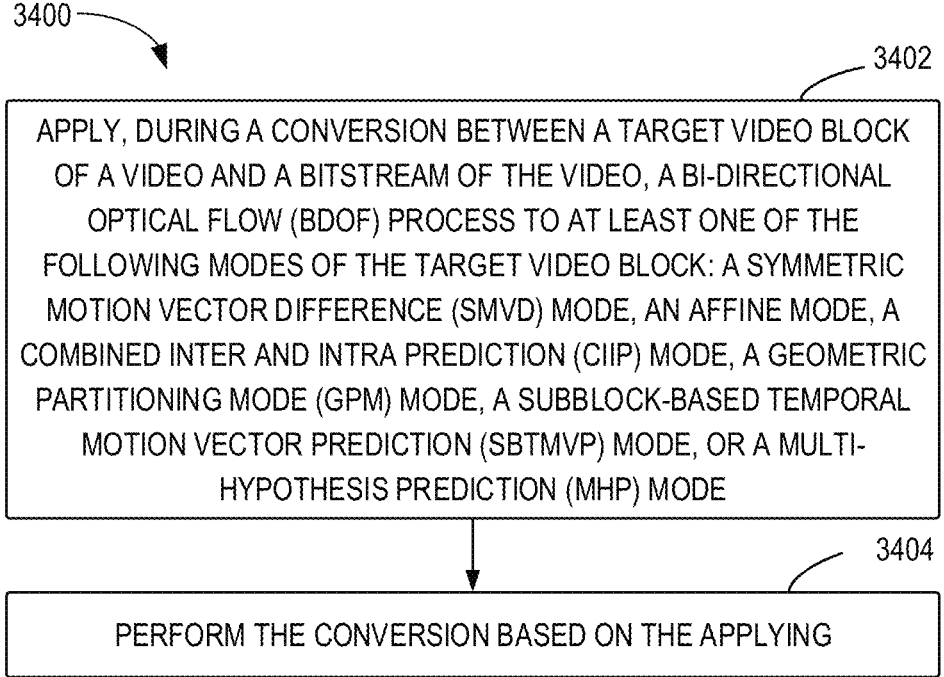
FIG. 34 illustrates another flowchart of a method for video processing in accordance with some embodiments of the present disclosure.

FIG. 34 illustrates a flowchart of a method 3400 for video processing in accordance with some embodiments of the present disclosure. The method 3400 is implemented during a conversion between a target video block of a video and a bitstream of the video. As shown in FIG. 34, at block 3402, a bi-directional optical flow (BDOF) process is applied to at least one of the following modes of the target video block: a symmetric motion vector difference (SMVD) mode, an affine mode, a combined inter and intra prediction (CUP) mode, a geometric partitioning mode (GPM) mode, a sub-block-based temporal motion vector prediction (SbTMVP) mode, or a multi-hypothesis prediction (MHP) mode. In this way, the BDOF process is applied to a plurality of coding modes. The coding effectiveness and coding efficiency can be thus improved.

At block 3404, the conversion is performed based on the applying. In some embodiments, the conversion may include encoding the target video block into the bitstream. Alternatively, or in addition, the conversion may include decoding the target video block from the bitstream.

In some embodiments, the BDOF process may comprise at least one of the following: a sample based BDOF process, a BDOF with motion vector refinement, or a variant of the BDOF process.

In some embodiments, the SMVD mode may comprise at least one of the following: a SMVD mode with adaptive motion vector resolution (AMVR), a SMVD mode without AMVR, a SMVD mode with half-pel interpolation, or a SMVD mode without half-pel interpolation.

In some embodiments, the affine mode may comprise at least one of the following: an affine advanced motion vector prediction (AMVP) mode, an affine merge mode with motion vector difference (MMVD) mode, or an affine merge mode.

In some embodiments, the CUP mode may comprise at least one of the following: a regular CIP mode, a CIIP-position dependent intra prediction combination (CUP-PDPC) mode, a CUP-template matching (CIIP-TM) mode, or a variant of the CUP mode.

In some embodiments, the GPM mode may comprise at least one of the following: a regular GPM mode, a GPM-template matching (GPM-TM) mode, a GPM-motion vector difference (GPM-MMVD) mode, a GPM-Inter-Intra mode, or a variant of the GPM mode.

In some embodiments, the MHP mode may comprise at least one of the following: an MHP base hypothesis, an MHP additional hypothesis, or a variant of the MHP mode.

In some embodiments, the method 3400 further comprising: applying the BDOF process for a prediction sample value refinement.

In some embodiments, the method 3400 further comprising: applying the BDOF process for a subblock-based motion vector refinement.

In some embodiments, a BDOF refined motion field may not be used as a motion candidate for a further block in a current picture.

In some embodiments, a BDOF refined motion field may be used as a motion candidate for a further block in a current picture.

In some embodiments, the method 3400 further comprising: applying the BDOF process for a video unit coded by an un-equal weighted prediction. By way of example, the un-equal weighted prediction may comprise one of the following: a bi-prediction with coding unit (CU)-level weight (BCW) with unequal weights for two directional inter predictions, an MHP with unequal weights for blending multiple inter hypothesis from different prediction directions, a GPM with unequal weights for the two directional inter predictions from two GPM partitions, or a CIIP with unequal weights for inter and intra predictions.

In some embodiments, the method 3400 further comprising: cascading the BDOF process with a second prediction blending process in addition to a first prediction blending process. By way of example, the first prediction blending process may comprise a regular bi-prediction averaging process. By way of example, the second prediction blending process may comprise one of the following: an overlapped block motion compensation (OBMC) process, a local illumination compensation (LIC) process, or a weighted prediction.

In some embodiments, the OBMC process may comprise at least one of the following: a coding unit (CU)-based or prediction unit (PU)-based OBMC process, or a subblock-based OBMC.

In some embodiments, the method 3400 further comprising: applying the BDOF process to a video unit adaptively.

In some embodiments, the method 3400 further comprising: including an indication of applying the BDOF process to the video unit in the bitstream. That is, the indication of applying the BDOF process may be signaled in the bitstream.

In some embodiments, the indication comprises a syntax element. By way of example, the syntax element may comprise a video unit level flag.

In some embodiments, the BDOF process may be applied to the video unit under a pre-defined condition. In some embodiments, if the pre-defined condition is met for the video unit, the BDOF process may be applied to the video unit without including an indication of the BDOF process in the bitstream.

In some embodiments, the method 3400 further comprising: applying the BDOF process to a chroma component.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, a bi-directional optical flow (BDOF) process is applied to at least one of the following modes of a target video block of the video: a symmetric motion vector difference (SMVD) mode, an affine mode, a combined inter and intra prediction (CIIP) mode, a geometric partitioning mode (GPM) mode, a sub-block-based temporal motion vector prediction (SbTMVP) mode, or a multi-hypothesis prediction (MHP) mode. The bitstream is generated based on the applying.

According to embodiments of the present disclosure, a method for storing a media presentation of a media is proposed. In the method, a bi-directional optical flow (BDOF) process is applied to at least one of the following modes of a target video block of the video: a symmetric motion vector difference (SMVD) mode, an affine mode, a combined inter and intra prediction (CIIP) mode, a geometric partitioning mode (GPM) mode, a subblock-based temporal motion vector prediction (SbTMVP) mode, or a multi-hypothesis prediction (MHP) mode. The bitstream is generated based on the applying. The bitstream is stored in a non-transitory computer-readable recording medium.

Figure 35:
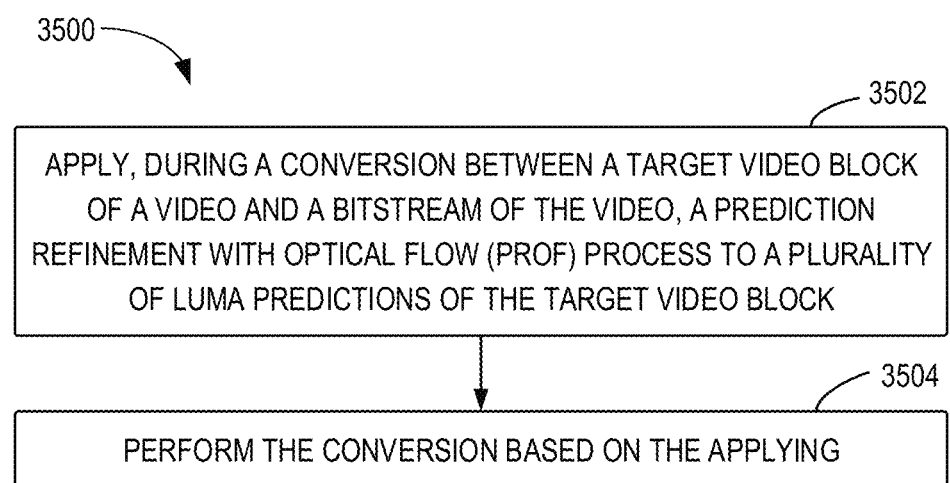
FIG. 35 illustrates another flowchart of a method for video processing in accordance with some embodiments of the present disclosure.

FIG. 35 illustrates a flowchart of a method 3500 for video processing in accordance with some embodiments of the present disclosure. The method 3500 is implemented during a conversion between a target video block of a video and a bitstream of the video. As shown in FIG. 35, at block 3502, a prediction refinement with optical flow (PROF) process is applied to a plurality of luma predictions of the target video block. At block 3504, the conversion is performed based on the applying. In some embodiments, the conversion may include encoding the target video block into the bitstream. Alternatively, or in addition, the conversion may include decoding the target video block from the bitstream.

In this way, the luma predictions of the target video block can be refined by the PROF process. The coding effectiveness and coding efficiency can be thus improved.

In some embodiments, the plurality of luma predictions comprises M times N luma predictions. M and N are positive integers.

In some embodiments, M times N may be smaller than 16.

In some embodiments, M may be smaller than 4, and N may be smaller than 4.

In some embodiments, at least one of M or N may be unequal to 4.

In some embodiments, at least one of a value of M or a value of N may be pre-defined.

In some embodiments, the method 3500 further comprising: determining at least one of a value of M or a value of N based on a shape or a dimension of the target video block.

In some embodiments, the target video block may comprise a 32 times 8 block. In some embodiments, at block 3502, the PROF process may be applied for each 8 times 2 subblocks of the target video block. In other words, for a 32×8 block, PROF may be applied for each 8×2 subblocks.

In some embodiments, the method 3500 further comprising: applying the PROF process to a chroma component of the target video block. That is, the PROF process may be applied to chroma component.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, a prediction refinement with optical flow (PROF) process is applied to a plurality of luma predictions of a target video block of the video. The bitstream is generated based on the applying.

According to embodiments of the present disclosure, a method for storing a media presentation of a media is proposed. In the method, a prediction refinement with optical flow (PROF) process is applied to a plurality of luma predictions of a target video block of the video. The bitstream is generated based on the applying. The bitstream is stored in a non-transitory computer-readable recording medium.

Figure 36:
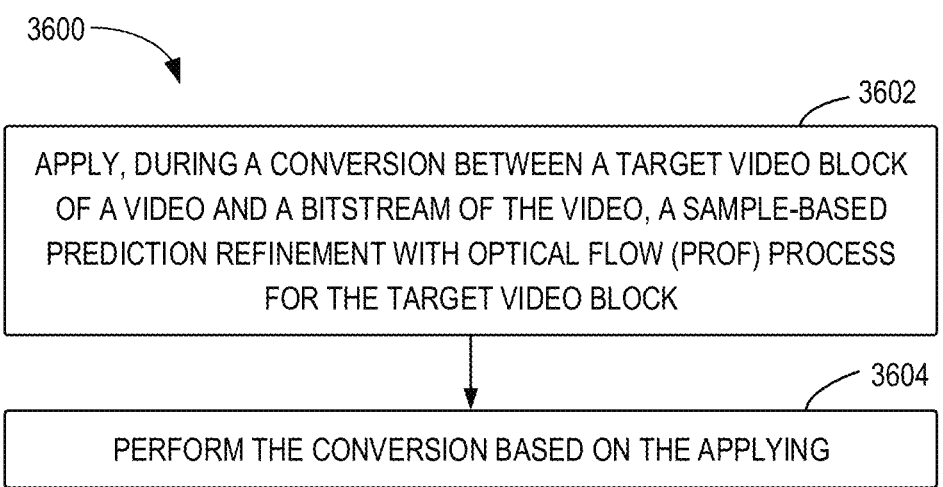
FIG. 36 illustrates another flowchart of a method for video processing in accordance with some embodiments of the present disclosure.

FIG. 36 illustrates a flowchart of a method 3600 for video processing in accordance with some embodiments of the present disclosure. The method 3600 is implemented during a conversion between a target video block of a video and a bitstream of the video. As shown in FIG. 36, at block 3602, a sample-based prediction refinement with optical flow (PROF) process is applied for the target video block. At block 3604, the conversion is performed based on the applying. In some embodiments, the conversion may include encoding the target video block into the bitstream. Alternatively, or in addition, the conversion may include decoding the target video block from the bitstream.

In this way, the target video block is refined by the sample-based PROF process. The coding effectiveness and coding efficiency can be thus improved.

In some embodiments, at block 3602, the sample-based PROF process may be applied to refine prediction sample values of the target video block.

In some embodiments, at block 3602, the sample-based PROF process may be applied for an affine prediction mode.

In some embodiments, at block 3602, the sample-based PROF process may be applied to generate different refinement delta for a plurality of prediction samples.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, a sample-based prediction refinement with optical flow (PROF) process is applied for a target video block of the video. The bitstream is generated based on the applying.

According to embodiments of the present disclosure, a method for storing a media presentation of a media is proposed. In the method, a sample-based prediction refinement with optical flow (PROF) process is applied for a target video block of the video. The bitstream is generated based on the applying. The bitstream is stored in a non-transitory computer-readable recording medium.

It is to be understood that the above method 3100, method 3200, method 3300, method 3400, method 3500 and/or method 3600 may be used in combination or separately. Any suitable combination of these methods may be applied. Scope of the present disclosure is not limited in this regard.

In some embodiments, information on applying the methods 3100, 3200, 3300, 3400, 3500 and/or 3600 may be included in the bitstream. For example, the information may comprise at least one of: whether to apply the methods 3100, 3200, 3300, 3400, 3500 and/or 3600, or how to apply the methods 3100, 3200, 3300, 3400, 3500 and/or 3600. In other words, whether to and/or how to apply the methods 3100, 3200, 3300, 3400, 3500 and/or 3600 may be signaled in the bitstream.

In some embodiments, the information may be included at one of: a sequence level, a group of pictures level, a picture level, a slice level, or a tile group level.

In some embodiments, the information may be included in a sequence header, a picture header, a sequence parameter set (SPS), a Video Parameter Set (VPS), a decoded parameter set (DPS), Decoding Capability Information (DCI), a Picture Parameter Set (PPS), an Adaptation Parameter Set (APS), a slice header, or a tile group header.

In some embodiments, the information may be included in a region containing a plurality of samples or a plurality of pixels.

In some embodiments, the region comprises one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, or a subpicture.

In some embodiments, the information may be determined based on coded information. By way of example, the coded information may comprise at least one of: a block size, a colour format, a single or dual tree partitioning, a colour component, a slice type, or a picture type.

By using these methods 3100, 3200, 3300, 3400, 3500 and 3600 separately or in combination, the coding effectiveness and coding efficiency can be improved.

Implementations of the present disclosure can be described in view of the following clauses, the features of which can be combined in any reasonable manner.

Clause 1. A method for video processing, comprising: determining, during a conversion between a target video block of a video and a bitstream of the video, an affine prediction list of the target video block based on at least one of the following: a non-adjacent spatial candidate, or a temporal collocated candidate; and performing the conversion based on the affine prediction list.

Clause 2. The method of clause 1, wherein the non-adjacent spatial candidate comprises a motion of a non-adjacent neighboring block in a current picture.

Clause 3. The method of clause 1 or clause 2, wherein the target video block comprises one of: an affine coded block or a hypothesis.

Clause 4. The method of clause 3, further comprising: determining a position of the non-adjacent neighboring block by using a determination rule for regular merge prediction list generation or for advanced motion vector predication (AMVP) prediction list generation.

Clause 5. The method of clause 3, further comprising: determining a rule for determining a position of the non-adjacent neighboring block for an affine coded block; and determining a position of the non-adjacent neighboring block by using the rule.

Clause 6. The method of clause 5, wherein the affine coded block comprises one of the following: an affine advanced motion vector predication (AMVP) coded block, an affine merge coded block, an affine merge mode with motion vector difference (MMVD) coded block, or an affine multi-hypothesis prediction (MHP) coded block.

Clause 7. The method of any of clauses 1-6, wherein the affine prediction list comprises at least one non-adjacent spatial candidate.

Clause 8. The method of any of clauses 1-6, wherein the affine prediction list comprises a plurality of non-adjacent spatial candidates.

Clause 9. The method of any of clauses 1-8, wherein positions of a plurality of non-adjacent neighboring blocks of the target video block are contiguous or continuous.

Clause 10. The method of clause 9, wherein a first non-adjacent neighboring block of the plurality of non-adjacent neighboring blocks is adjacent to a second non-adjacent neighboring block of the plurality of non-adjacent neighboring blocks.

Clause 11. The method of any of clauses 1-8, wherein positions of a plurality of non-adjacent neighboring blocks of the target video block are scattered within a non-adjacent region of the target video block.

Clause 12. The method of clause 11, wherein a first non-adjacent neighboring block of the plurality of non-adjacent neighboring blocks is non-adjacent to a second non-adjacent neighboring block of the plurality of non-adjacent neighboring blocks.

Clause 13. The method of clause 1, wherein the temporal collocated candidate comprises a motion determined from a temporal collocated block in a reference frame.

Clause 14. The method of clause 13, wherein the target video block comprises one of: an affine coded block or a hypothesis.

Clause 15. The method of clause 13 or clause 14, wherein a first top-left position of the temporal collocated block relative to a reference picture is the same as a second top-left position of the target video block relative to a current picture.

Clause 16. The method of clause 13 or clause 14, wherein a first top-left position of the temporal collocated block relative to a reference picture is different from a second top-left position of the target video block relative to a current picture.

Clause 17. The method of clause 16, wherein a difference between the first top-left position and the second top-left position comprises a first offset in a first direction and a second offset in a second direction.

Clause 18. The method of clause 17, wherein the first and second offsets are predefined by a rule.

Clause 19. The method of any of clauses 13-18, wherein the affine prediction list comprises at least one temporal collocated candidate.

Clause 20. The method of any of clauses 13-18, wherein the affine prediction list comprises a plurality of temporal collocated candidates.

Clause 21. The method of any of clauses 1-20, further comprising: determining an optimal affine advanced motion vector predication (AMVP) candidate based on a decoder side method.

Clause 22. The method of clause 21, wherein the decoder side method comprises: a temporal matching (TM) cost-based method, or a decoder side motion vector refinement (DMVR) cost-based method.

Clause 23. The method of clause 22, further comprising: refining a control point motion vector (CPMV) of an affine coded block based on a TM cost or a DMVR cost.

Clause 24. The method of any of clauses 1-23, further comprising: using at least one of: the affine prediction list or an affine candidate of the target video block for an affine merge coded block.

Clause 25. The method of any of clauses 1-24, further comprising: using at least one of: the affine prediction list or an affine candidate of the target video block for an affine merge mode with motion vector difference (MMVD) coded block.

Clause 26. The method of any of clauses 1-25, further comprising: using at least one of: the affine prediction list or an affine candidate of the target video block for one of the following: an affine advanced motion vector predication (AMVP) coded single block, an affine merge coded single block, or an affine merge mode with motion vector difference (MMVD) coded single block.

Clause 27. The method of any of clauses 1-26, further comprising: using at least one of: the affine prediction list or an affine candidate of the target video block for one of the following: an affine advanced motion vector predication (AMVP) multi-hypothesis prediction (MHP) hypothesis, an affine merge MHP hypothesis, or an affine merge mode with motion vector difference (MMVD) MHP hypothesis.

Clause 28. The method of any of clauses 1-27, wherein a motion vector prediction (MVP) index is not included in the bitstream for an affine advanced motion vector predication (AMVP) coded block.

Clause 29. The method of clause 28, wherein the affine AMVP coded block comprises one of the following: a single coding block, or a hypothesis of a multi-hypothesis prediction (MHP) coded block.

Clause 30. The method of any of clauses 1-29, further comprising: determining an additional hypothesis for a multi-hypothesis prediction (MHP) coded block by a decoder side method.

Clause 31. The method of clause 30, wherein determining an addition hypothesis comprises: determining an affine advanced motion vector predication (AMVP)-based additional hypothesis for the MHP coded block by a template matching (TM) cost-based method or a decoder side motion vector refinement (DMVR) cost-based method.

Clause 32. The method of clause 31, wherein the AMVP-based additional hypothesis comprises at least one of the following: a regular AMVP, or an affine AMVP.

Clause 33. The method of clause 31 or clause 32, wherein a motion vector prediction (MVP) index of the AMVP-based additional hypothesis is not included in the bitstream.

Clause 34. The method of clause 30, wherein determining an addition hypothesis comprises: determining a merge-based additional hypothesis for the MHP coded block by a template matching (TM) cost-based method or a decoder side motion vector refinement (DMVR) cost-based method.

Clause 35. The method of clause 34, wherein a candidate index of the merge-based additional hypothesis is not included in the bitstream.

Clause 36. The method of clause 34 or clause 35, further comprising: determining an optimal merge candidate based on a TM cost.

Clause 37. The method of clause 36, wherein determining an optimal merge candidate based on a TM cost comprises: determining the optimal merge candidate by comparing a difference between a template identified by an available merge candidate and a further template of neighboring samples of the target video block.

Clause 38. The method of clause 34 or clause 35, further comprising: determining an optimal merge candidate based on a DMVR cost.

Clause 39. The method of clause 38, wherein determining an optimal merge candidate based on a TM cost comprises: determining the optimal merge candidate by comparing a difference between a prediction block identified by an available merge candidate and a further prediction block identified by the base hypothesis.

Clause 40. The method of any of clauses 1-39, further comprising: determining an optimal motion vector prediction (MVP) candidate of the target video block based on a template matching (TM) cost.

Clause 41. The method of clause 40, wherein determining an optimal MVP candidate based on the TM cost comprises: determining the optimal MVP candidate by comparing a difference between a template identified by an available MVP candidate and a further template of neighboring samples of the target video block.

Clause 42. The method of any of clauses 1-39, further comprising: determining an optimal motion vector prediction (MVP) candidate of the target video block based on a decoder side motion vector refinement (DMVR) cost.

Clause 43. The method of clause 42, wherein an optimal MVP candidate based on the DMVR cost comprises: determining the optimal MVP candidate by comparing a difference between a prediction block identified by an available MVP candidate and a further prediction block identified by a base hypothesis.

Clause 44. A method for video processing, comprising: determining, during a conversion between a target video block of a video and a bitstream of the video, at least one multi-hypothesis prediction (MHP) hypothesis of the target video block; applying a local illumination compensation (LIC) to the at least one MHP hypothesis; and performing the conversion based on the applying.

Clause 45. The method of clause 44, wherein the target video block comprises a MHP coded block.

Clause 46. The method of clause 45, wherein the MHP coded block comprises at least one of the following: an MHP base hypothesis, or an MHP additional hypothesis.

Clause 47. The method of clause 45 or clause 46, wherein the MHP base hypothesis comprises a merge coded bi-prediction.

Clause 48. The method of clause 45 or clause 46, wherein the MHP base hypothesis comprises an advanced motion vector predication (AMVP) coded uni-prediction or an AMVP coded bi-prediction.

Clause 49. The method of clause 44, wherein applying a LIC to the at least one MHP hypothesis comprises: applying the LIC to an MHP base hypothesis instead of an MHP additional hypothesis.

Clause 50. The method of clause 44, wherein applying a LIC to the at least one MHP hypothesis comprises: applying the LIC to an MHP additional hypothesis instead of an MHP base hypothesis.

Clause 51. The method of clause 44, wherein applying a LIC to the at least one MHP hypothesis comprises: applying the LIC to an additional hypothesis instead of another MHP base hypothesis.

Clause 52. The method of clause 44, wherein applying a LIC to the at least one MHP hypothesis comprises: applying the LIC to an MHP base hypothesis and at least one MHP additional hypothesis.

Clause 53. The method of any of clauses 44-52, further comprising: including an indication of applying the LIC to the MHP coded block in the bitstream.

Clause 54. The method of clause 53, further comprising: determining whether to including the indication of applying the LIC in the bitstream based on coding information.

Clause 55. The method of clause 54, wherein the coding information comprises at least one of the following: a prediction mode, an inter prediction direction, or a block dimension.

Clause 56. The method of any of clauses 53-55, wherein the indication indicates whether to applying the LIC to an MHP base hypothesis.

Clause 57. The method of clause 56, wherein a usage of an MHP additional hypothesis is the same as the MHP base hypothesis.

Clause 58. The method of any of clauses 53-57, wherein including an indication of applying the LIC to the MHP coded block in the bitstream comprises: including a first indication indicating whether to applying the LIC to an MHP base hypothesis; and including a second indication indicating whether to applying the LIC to an MHP additional hypothesis independently.

Clause 59. The method of any of clauses 53-57, wherein including an indication of applying the LIC to the MHP coded block in the bitstream comprises: including a first indication and a second indication coherently in the bitstream, the first indication indicating whether to applying the LIC to an MHP base hypothesis, the second indication indicating whether to applying the LIC to an MHP additional hypothesis.

Clause 60. The method of clause 59, wherein the LIC is applied to a partial or all MHP hypotheses.

Clause 61. The method of clause 59, wherein the LIC is not applied to all MHP hypotheses.

Clause 62. The method of any of clauses 44-52, further comprising: determining whether to applying the LIC to an MHP base hypothesis based on a pre-defined rule.

Clause 63. The method of clause 63, further comprising: including a usage of an MHP additional hypothesis in the bitstream.

Clause 64. A method for video processing, comprising: determining, during a conversion between a target video block of a video and a bitstream of the video, a motion candidate of the target video block; performing a plurality of rounds of search for a template matching-based bi-direction motion refinement on the motion candidate; and performing the conversion based on the performing.

Clause 65. The method of clause 64, wherein the plurality of rounds of search comprise an iterative search.

Clause 66. The method of clause 64 or clause 65, wherein performing a plurality of rounds of search comprises: performing a first search in a first direction to minimizing a first difference between a first template in a current picture and a second template in a first reference picture; and performing a second search in a second direction to minimizing a second difference between the first template and a third template in a second reference picture.

Clause 67. The method of any of clauses 64-66, wherein performing a plurality of rounds of search comprises: obtaining a first adjusted motion vector and a second adjusted motion vector by performing the plurality of rounds of search for template matching-based bi-direction motion refinement on the motion candidate, the first adjusted motion vector being a first offset greater than a first original motion vector, and the second adjusted motion vector being a second offset greater than a second original motion vector, the second offset being different from the first offset.

Clause 68. The method of clause 67, wherein the first and second motion vectors are determined without a template matching refinement.

Clause 69. The method of any of clauses 64-68, wherein performing a plurality of rounds of search comprises: in one of the plurality of rounds of search, determining a first motion vector of a first reference picture to be fixed; and refining a second motion vector of a second reference picture.

Clause 70. The method of clause 69, wherein the first reference picture is in a first reference list, and the second reference picture is in a second reference list.

Clause 71. The method of any of clauses 64-70, further comprising: determining a cost for a given position in a template by using one of the following metrics: $D[k]=|(sT[k]+sT1[k])/2-cT[k]|$, $D[k]=|sT0[k]+sT1[k]-2 \times cT[k]|$, or $H[k]=2 \times cT[k]-sT0[k]$ and $D[k]=|H[k]-sT1[k]|$, wherein $D[k]$ represents the cost for a given position k in the template, $sT0[k]$ represents a reference template sample referred by a first motion vector in the given position k, $sT1[k]$ represents an associated reference template sample referred by a second motion vector in the given position k, $cT[k]$ represents an associated template sample in the template of the target video block in the given position k, and $H[k]$ represents an intermediate result for the given position k.

Clause 72. The method of clause 71, wherein $H[k]$ is pre-calculated and stored, the first motion vector is fixed and the second motion vector is under searching.

Clause 73. The method of clause 71 or clause 72, further comprising: determining a total cost for the template by accumulating the cost $D[k]$ at each valid position k in the template.

Clause 74. A method for video processing, comprising: applying, during a conversion between a target video block of a video and a bitstream of the video, a bi-directional optical flow (BDOF) process to at least one of the following modes of the target video block: a symmetric motion vector difference (SMVD) mode, an affine mode, a combined inter and intra prediction (CIIP) mode, a geometric partitioning mode (GPM) mode, a subblock-based temporal motion vector prediction (SbTMVP) mode, or a multi-hypothesis prediction (MHP) mode; and performing the conversion based on the applying.

Clause 75. The method of clause 74, wherein the BDOF process comprises at least one of the following: a sample based BDOF process, a BDOF with motion vector refinement, or a variant of the BDOF process.

Clause 76. The method of clause 74 or clause 75, wherein the SMVD mode comprises at least one of the following: a SMVD mode with adaptive motion vector resolution (AMVR), a SMVD mode without AMVR, a SMVD mode with half-pel interpolation, or a SMVD mode without half-pel interpolation.

Clause 77. The method of any of clauses 74-76, wherein the affine mode comprises at least one of the following: an affine advanced motion vector prediction (AMVP) mode, an affine merge mode with motion vector difference (MMVD) mode, or an affine merge mode.

Clause 78. The method of any of clauses 74-77, wherein the CIIP mode comprises at least one of the following: a regular CIIP mode, a CIIP-position dependent intra prediction combination (CIIP-PDPC) mode, a CIIP-template matching (CUP-TM) mode, or a variant of the CIIP mode.

Clause 79. The method of any of clauses 74-78, wherein the GPM mode comprises at least one of the following: a regular GPM mode, a GPM-template matching (GPM-TM) mode, a GPM-motion vector difference (GPM-MMVD) mode, a GPM-Inter-Intra mode, or a variant of the GPM mode.

Clause 80. The method of any of clauses 74-79, wherein the MHP mode comprises at least one of the following: an MHP base hypothesis, an MHP additional hypothesis, or a variant of the MHP mode.

Clause 81. The method of any of clauses 74-80, further comprising: applying the BDOF process for a prediction sample value refinement.

Clause 82. The method of any of clauses 74-81, further comprising: applying the BDOF process for a subblock-based motion vector refinement.

Clause 83. The method of any of clauses 74-82, wherein a BDOF refined motion field is not used as a motion candidate for a further block in a current picture.

Clause 84. The method of any of clauses 74-82, wherein a BDOF refined motion field is used as a motion candidate for a further block in a current picture.

Clause 85. The method of any of clauses 74-84, further comprising: applying the BDOF process for a video unit coded by an un-equal weighted prediction.

Clause 86. The method of clause 85, wherein the un-equal weighted prediction comprises one of the following: a bi-prediction with coding unit (CU)-level weight (BCW) with unequal weights for two directional inter predictions, an MHP with unequal weights for blending multiple inter hypothesis from different prediction directions, a GPM with unequal weights for the two directional inter predictions from two GPM partitions, or a CIIP with unequal weights for inter and intra predictions.

Clause 87. The method of any of clauses 74-86, further comprising: cascading the BDOF process with a second prediction blending process in addition to a first prediction blending process.

Clause 88. The method of clause 87, wherein the first prediction blending process comprises a regular bi-prediction averaging process.

Clause 89. The method of clause 87 or clause 88, wherein the second prediction blending process comprises one of the following: an overlapped block motion compensation (OBMC) process, a local illumination compensation (LIC) process, or a weighted prediction.

Clause 90. The method of clause 89, wherein the OBMC process comprises at least one of the following: a coding unit (CU)-based or prediction unit (PU)-based OBMC process, or a subblock-based OBMC.

Clause 91. The method of any of clauses 74-90, further comprising: applying the BDOF process to a video unit adaptively.

Clause 92. The method of clause 91, further comprising: including an indication of applying the BDOF process to the video unit in the bitstream.

Clause 93. The method of clause 92, wherein the indication comprises a syntax element.

Clause 94. The method of clause 93, wherein the syntax element comprises a video unit level flag.

Clause 95. The method of clause 91, wherein applying the BDOF process to a video unit adaptively comprises: applying the BDOF process to the video unit under a pre-defined condition.

Clause 96. The method of clause 95, wherein applying the BDOF process to the video unit under a pre-defined condition comprises: if the pre-defined condition is met for the video unit, applying the BDOF process to the video unit without including an indication of the BDOF process in the bitstream.

Clause 97. The method of any of clause 74-96, further comprising: applying the BDOF process to a chroma component.

Clause 98. A method for video processing, comprising: applying, during a conversion between a target video block of a video and a bitstream of the video, a prediction refinement with optical flow (PROF) process to a plurality of luma predictions of the target video block; and performing the conversion based on the applying.

Clause 99. The method of clause 98, wherein the plurality of luma predictions comprises M times N luma predictions, M and N being positive integers.

Clause 100. The method of clause 98 or clause 99, wherein M times N is smaller than 16.

Clause 101. The method of any of clauses 98-100, wherein M is smaller than 4, and N is smaller than 4.

Clause 102. The method of any of clauses 98-101, wherein at least one of M or N is unequal to 4.

Clause 103. The method of any of clauses 98-102, wherein at least one of a value of M or a value of N is pre-defined.

Clause 104. The method of any of clauses 98-102, further comprising: determining at least one of a value of M or a value of N based on a shape or a dimension of the target video block.

Clause 105. The method of any of clauses 98-104, wherein the target video block comprises a 32 times 8 block, and wherein applying the PROF process to the plurality of luma predictions of the target video block comprises: applying the PROF process for each 8 times 2 subblocks of the target video block.

Clause 106. The method of any of clauses 98-105, further comprising: applying the PROF process to a chroma component of the target video block.

Clause 107. A method for video processing, comprising: applying, during a conversion between a target video block of a video and a bitstream of the video, a sample-based prediction refinement with optical flow (PROF) process for the target video block; and performing the conversion based on the applying.

Clause 108. The method of clause 107, wherein applying the sample-based PROF process comprises: applying the sample-based PROF process to refine prediction sample values of the target video block.

Clause 109. The method of clause 107 or clause 108, wherein applying the sample-based PROF process comprises: applying the sample-based PROF process for an affine prediction mode.

Clause 110. The method of any of clauses 107-109, wherein applying the sample-based PROF process comprises: applying the sample-based PROF process to generate different refinement delta for a plurality of prediction samples.

Clause 111. The method of any of clauses 1-110, further comprising: including information on applying the method in the bitstream.

Clause 112. The method of clause 111, wherein the information comprises at least one of: whether to apply the method, or how to apply the method.

Clause 113. The method of clause 111 or clause 112, wherein the information is included at one of: a sequence level, a group of pictures level, a picture level, a slice level, or a tile group level.

Clause 114. The method of any of clauses 111-113, wherein the information is included in a sequence header, a picture header, a sequence parameter set (SPS), a Video Parameter Set (VPS), a decoded parameter set (DPS), Decoding Capability Information (DCI), a Picture Parameter Set (PPS), an Adaptation Parameter Set (APS), a slice header, or a tile group header.

Clause 115. The method of any of clauses 111-114, wherein the information is included in a region containing a plurality of samples or a plurality of pixels.

Clause 116. The method of clause 115, wherein the region comprises one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, or a subpicture.

Clause 117. The method of any of clauses 111-116, further comprising: determining the information based on coded information.

Clause 118. The method of clause 117, wherein the coded information comprises at least one of: a block size, a colour format, a single or dual tree partitioning, a colour component, a slice type, or a picture type.

Clause 119. The method of any of clauses 1-118, wherein the conversion includes encoding the target video block into the bitstream.

Clause 120. The method of any of clauses 1-118, wherein the conversion includes decoding the target video block from the bitstream.

Clause 121. An apparatus for processing video data comprising a processor and a non-transitory memory with instructions thereon, wherein the instructions upon execution by the processor, cause the processor to perform a method in accordance with any of clauses 1-120.

Clause 122. A non-transitory computer-readable storage medium storing instructions that cause a processor to perform a method in accordance with any of clauses 1-120.

Clause 123. A non-transitory computer-readable recording medium storing a bitstream of a video which is generated by a method performed by a video processing apparatus, wherein the method comprises: determining an affine prediction list of a target video block of the video based on at least one of the following: a non-adjacent spatial candidate, or a temporal collocated candidate; and generating the bitstream based on the affine prediction list.

Clause 124. A method for storing a bitstream of a video, comprising: determining an affine prediction list of a target video block of the video based on at least one of the following: a non-adjacent spatial candidate, or a temporal collocated candidate; generating the bitstream based on the affine prediction list; and storing the bitstream in a non-transitory computer-readable recording medium.

Clause 125. A non-transitory computer-readable recording medium storing a bitstream of a video which is generated by a method performed by a video processing apparatus, wherein the method comprises: determining at least one multi-hypothesis prediction (MHP) hypothesis of a target video block of the video; applying a local illumination compensation (LIC) to the at least one MHP hypothesis; and generating the bitstream based on the applying.

Clause 126. A method for storing a bitstream of a video, comprising: determining at least one multi-hypothesis prediction (MHP) hypothesis of a target video block of the video; applying a local illumination compensation (LIC) to the at least one MHP hypothesis; generating the bitstream based on the applying; and storing the bitstream in a non-transitory computer-readable recording medium.

Clause 127. A non-transitory computer-readable recording medium storing a bitstream of a video which is generated by a method performed by a video processing apparatus, wherein the method comprises: determining a motion candidate of a target video block of the video; performing a plurality of rounds of search for a template matching-based bi-direction motion refinement on the motion candidate; and generating the bitstream based on the performing.

Clause 128. A method for storing a bitstream of a video, comprising: determining a motion candidate of a target video block of the video; performing a plurality of rounds of search for a template matching-based bi-direction motion refinement on the motion candidate; generating the bitstream based on the performing; and storing the bitstream in a non-transitory computer-readable recording medium.

Clause 129. A non-transitory computer-readable recording medium storing a bitstream of a video which is generated by a method performed by a video processing apparatus, wherein the method comprises: applying a bi-directional optical flow (BDOF) process to at least one of the following modes of a target video block of the video: a symmetric motion vector difference (SMVD) mode, an affine mode, a combined inter and intra prediction (CIP) mode, a geometric partitioning mode (GPM) mode, a subblock-based temporal motion vector prediction (SbTMVP) mode, or a multi-hypothesis prediction (MHP) mode; and generating the bitstream based on the applying.

Clause 130. A method for storing a bitstream of a video, comprising: applying a bi-directional optical flow (BDOF) process to at least one of the following modes of a target video block of the video: a symmetric motion vector difference (SMVD) mode, an affine mode, a combined inter and intra prediction (CUP) mode, a geometric partitioning mode (GPM) mode, a subblock-based temporal motion vector prediction (SbTMVP) mode, or a multi-hypothesis prediction (MHP) mode; generating the bitstream based on the applying; and storing the bitstream in a non-transitory computer-readable recording medium.

Clause 131. A non-transitory computer-readable recording medium storing a bitstream of a video which is generated by a method performed by a video processing apparatus, wherein the method comprises: applying a prediction refinement with optical flow (PROF) process to a plurality of luma predictions of a target video block of the video; and generating the bitstream based on the applying.

Clause 132. A method for storing a bitstream of a video, comprising: applying a prediction refinement with optical flow (PROF) process to a plurality of luma predictions of a target video block of the video; generating the bitstream based on the applying; and storing the bitstream in a non-transitory computer-readable recording medium.

Clause 133. A non-transitory computer-readable recording medium storing a bitstream of a video which is generated by a method performed by a video processing apparatus, wherein the method comprises: applying a sample-based prediction refinement with optical flow (PROF) process for a target video block of the video; and generating the bitstream based on the applying.

Clause 134. A method for storing a bitstream of a video, comprising: applying a sample-based prediction refinement with optical flow (PROF) process for a target video block of the video; generating the bitstream based on the applying; and storing the bitstream in a non-transitory computer-readable recording medium.

Example Device

Figure 37:
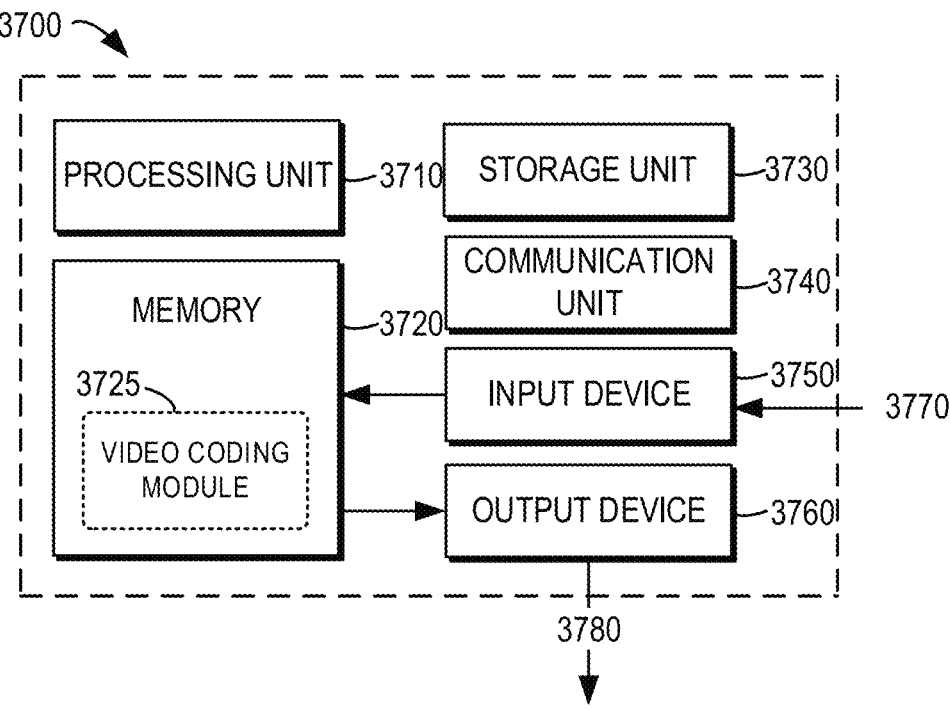
FIG. 37 illustrates a block diagram of a computing device in which various embodiments of the present disclosure can be implemented.

FIG. 37 illustrates a block diagram of a computing device 3700 in which various embodiments of the present disclosure can be implemented. The computing device 3700 may be implemented as or included in the source device 110 (or the video encoder 114 or 200) or the destination device 120 (or the video decoder 124 or 300).

It would be appreciated that the computing device 3700 shown in FIG. 37 is merely for purpose of illustration, without suggesting any limitation to the functions and scopes of the embodiments of the present disclosure in any manner.

As shown in FIG. 37, the computing device 3700 includes a general-purpose computing device 3700. The computing device 3700 may at least comprise one or more processors or processing units 3710, a memory 3720, a storage unit 3730, one or more communication units 3740, one or more input devices 3750, and one or more output devices 3760.

In some embodiments, the computing device 3700 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 3700 can support any type of interface to a user (such as "wearable" circuitry and the like).

The processing unit 3710 may be a physical or virtual processor and can implement various processes based on programs stored in the memory 3720. In a multi-processor system, multiple processing units execute computer executable instructions in parallel so as to improve the parallel processing capability of the computing device 3700. The processing unit 3710 may also be referred to as a central processing unit (CPU), a microprocessor, a controller or a microcontroller.

The computing device 3700 typically includes various computer storage medium. Such medium can be any medium accessible by the computing device 3700, including, but not limited to, volatile and non-volatile medium, or detachable and non-detachable medium. The memory 3720 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 3730 may be any detachable or non-detachable medium and may include a machine-readable medium such as a memory, flash memory drive, magnetic disk or another other media, which can be used for storing information and/or data and can be accessed in the computing device 3700.

The computing device 3700 may further include additional detachable/non-detachable, volatile/non-volatile memory medium. Although not shown in FIG. 37, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 3740 communicates with a further computing device via the communication medium. In addition, the functions of the components in the computing device 3700 can be implemented by a single computing cluster or multiple computing machines that can communicate via communication connections. Therefore, the computing device 3700 can operate in a networked environment using a logical connection with one or more other servers, networked personal computers (PCs) or further general network nodes.

The input device 3750 may be one or more of a variety of input devices, such as a mouse, keyboard, tracking ball, voice-input device, and the like. The output device 3760 may be one or more of a variety of output devices, such as a display, loudspeaker, printer, and the like. By means of the communication unit 3740, the computing device 3700 can further communicate with one or more external devices (not shown) such as the storage devices and display device, with one or more devices enabling the user to interact with the computing device 3700, or any devices (such as a network card, a modem and the like) enabling the computing device 3700 to communicate with one or more other computing devices, if required. Such communication can be performed via input/output (I/O) interfaces (not shown).

In some embodiments, instead of being integrated in a single device, some or all components of the computing device 3700 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 3700 may be used to implement video encoding/decoding in embodiments of the present disclosure. The memory 3720 may include one or more video coding modules 3725 having one or more program instructions. These modules are accessible and executable by the processing unit 3710 to perform the functionalities of the various embodiments described herein.

In the example embodiments of performing video encoding, the input device 3750 may receive video data as an input 3770 to be encoded. The video data may be processed, for example, by the video coding module 3725, to generate an encoded bitstream. The encoded bitstream may be provided via the output device 3760 as an output 3780.

In the example embodiments of performing video decoding, the input device 3750 may receive an encoded bitstream as the input 3770. The encoded bitstream may be processed, for example, by the video coding module 3725, to generate decoded video data. The decoded video data may be provided via the output device 3760 as the output 3780.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
   applying, during a conversion between a target video block of a video and a bitstream of the video, a bi-directional optical flow (BDOF) process to the target video block, wherein the target video block is coded with a geometric partitioning mode (GPM) mode or a subblock-based temporal motion vector prediction (SbTMVP) mode; and
   performing the conversion based on the applying.

2. The method of claim 1, wherein the BDOF process comprises a BDOF with motion vector refinement.

3. The method of claim 1, further comprising:
   applying the BDOF process to a further video block of the video, wherein the further video block is coded with at least one of:
   an affine advanced motion vector prediction (AMVP) mode, an affine merge mode with motion vector difference (MMVD) mode, or an affine merge mode.

4. The method of claim 1, wherein the target video block is coded with the GPM mode, and the GPM mode comprises at least one of the following:

a regular GPM mode, a GPM-template matching (GPM-TM) mode, a GPM-motion vector difference (GPM-MMVD) mode, a GPM-Inter-Intra mode, or a variant of the GPM mode.

5. The method of claim 1, further comprising:

applying the BDOF process for a prediction sample value refinement.

6. The method of claim 1, further comprising:

applying the BDOF process for a subblock-based motion vector refinement.

7. The method of claim 1, wherein a BDOF refined motion field is used as a motion candidate for a further block in a current picture.

8. The method of claim 1, further comprising:

applying the BDOF process for a video unit coded by an un-equal weighted prediction.

9. The method of claim 8, wherein the un-equal weighted prediction comprises one of the following:

a bi-prediction with coding unit (CU)-level weight (BCW) with unequal weights for two directional inter predictions, or a GPM with unequal weights for the two directional inter predictions from two GPM partitions.

10. The method of claim 1, further comprising:

cascading the BDOF process with a second prediction blending process in addition to a first prediction blending process.

11. The method of claim 10, wherein the first prediction blending process comprises a regular bi-prediction averaging process.

12. The method of claim 10, wherein the second prediction blending process comprises one of the following:

a local illumination compensation (LIC) process, or a weighted prediction.

13. The method of claim 1, further comprising:

applying the BDOF process to a video unit adaptively.

14. The method of claim 13, wherein applying the BDOF process to a video unit adaptively comprises:

applying the BDOF process to the video unit under a pre-defined condition.

15. The method of claim 14, wherein applying the BDOF process to the video unit under a pre-defined condition comprises:

if the pre-defined condition is met for the video unit, applying the BDOF process to the video unit without including an indication of the BDOF process in the bitstream.

16. The method of claim 1, wherein the conversion includes encoding the target video block into the bitstream.

17. The method of claim 1, wherein the conversion includes decoding the target video block from the bitstream.

18. An apparatus for processing video data comprising a processor and a non-transitory memory with instructions thereon, wherein the instructions upon execution by the processor, cause the processor to:

apply, during a conversion between a target video block of a video and a bitstream of the video, a bi-directional optical flow (BDOF) process to the target video block, wherein the target video block is coded with a geometric partitioning mode (GPM) mode or a subblock-based temporal motion vector prediction (SbTMVP) mode; and perform the conversion based on the applying.

19. A non-transitory computer-readable storage medium storing instructions that cause a processor to perform a method performed by a video processing apparatus, wherein the method comprises:

applying a bi-directional optical flow (BDOF) process to a target video block of the video, wherein the target video block is coded with a geometric partitioning mode (GPM) mode or a subblock-based temporal motion vector prediction (SbTMVP) mode; and performing the conversion based on the applying.

20. A method for storing a bitstream of a video, comprising:

applying a bi-directional optical flow (BDOF) process to a target video block of the video, wherein the target video block is coded with a geometric partitioning mode (GPM) mode or a subblock-based temporal motion vector prediction (SbTMVP) mode; and generating the bitstream based on the applying; and storing the bitstream in a non-transitory computer-readable recording medium.

* * * * *